United States Patent
Park

(10) Patent No.: US 10,531,513 B2
(45) Date of Patent: *Jan. 7, 2020

(54) APPARATUS AND METHOD FOR TRANSMITTING UPLINK CONTROL INFORMATION THROUGH A PHYSICAL UPLINK CONTROL CHANNEL

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/203,794

(22) Filed: Nov. 29, 2018

(65) Prior Publication Data

US 2019/0104565 A1    Apr. 4, 2019

Related U.S. Application Data

(63) Continuation of application No. 15/230,249, filed on Aug. 5, 2016, now Pat. No. 10,182,467.

(30) Foreign Application Priority Data

Aug. 6, 2015  (KR) .................. 10-2015-0101849
Aug. 6, 2015  (KR) .................. 10-2015-0101850
Aug. 6, 2015  (KR) .................. 10-2015-0101851

(51) Int. Cl.
*H04W 72/04*  (2009.01)
*H04W 76/27*  (2018.01)
(Continued)

(52) U.S. Cl.
CPC .......... *H04W 76/27* (2018.02); *H04L 1/1822* (2013.01); *H04L 5/001* (2013.01); *H04L 5/0053* (2013.01); *H04L 5/0055* (2013.01); *H04L 5/0057* (2013.01)

(58) Field of Classification Search
CPC ............. H04W 72/0446; H04W 88/02; H04W 72/1268; H04W 72/0406; H04W 52/146;
(Continued)

(56) References Cited

U.S. PATENT DOCUMENTS

2013/0121270 A1    5/2013   Chen et al.
2014/0233477 A1    8/2014   Chu
(Continued)

OTHER PUBLICATIONS

3rd Generation Partnership Project; Technical Specification Group Radio Access Network; Evolved Universal Terrestrial Radio Access (E-UTRA); Physical layer procedures (Release 12); 3GPP TS 36.213 V12.6.0, Jun. 2015, pp. 1-241, 3GPP Organizational Partners.

(Continued)

*Primary Examiner* — Khaled M Kassim
*Assistant Examiner* — Najeeb Ansari

(57) ABSTRACT

A method includes configuring serving cells for UE, the serving cells including at least six serving cells configurable for the UE; receiving PUCCH format configuration information for transmitting uplink control information associated with the configured serving cells, the PUCCH format configuration information including configuration information of PUCCH format 4; determining a total number of HARQ-ACK bits, SR bits, and periodic CSI bits to be transmitted in a subframe; selecting, at least based on the determined total number, a PUCCH format to transmit at least one of HARQ-ACK, SR, and periodic CSI, the selected PUCCH format being one of PUCCH formats including the PUCCH format 4 and PUCCH format 3; and transmitting (Continued)

the uplink control information associated with the configured serving cells in the subframe using the selected PUCCH format, the uplink control information associated with the configured serving cells including the at least one of HARQ-ACK, SR, and periodic CSI.

8 Claims, 26 Drawing Sheets

(51) Int. Cl.
*H04L 1/18* (2006.01)
*H04L 5/00* (2006.01)

(58) Field of Classification Search
CPC ............. H04W 52/32; H04W 72/1278; H04W 74/004; H04W 72/0413
See application file for complete search history.

(56) References Cited

U.S. PATENT DOCUMENTS

2014/0349713 A1   11/2014  Yamada
2015/0131564 A1*   5/2015  Seo ..................... H04W 72/04
                                                 370/329
2017/0006491 A1*   1/2017  Chen ..................... H04B 7/024

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331 V12.6.0, Jun. 2015, pp. 1-449, 3GPP Organizational Partners.

"PUCCH format design for CA enhancement", 3GPP TSG RAN WG1 Meeting #81 Fukuoka, Japan, May 25-29, 2015, pp. 1-5.

"New PUCCH format design to support UCI transmission for up to 32 component carriers", 3GPP TSG RAN WG1 Meeting #81 Fukuoka, Japan, May 25-29, 2015, pp. 1-9.

International Search Report for International Patent Application No. PCT/KR2016/008665, dated Oct. 31, 2016.

Written Opinion for International Patent Application No. PCT/KR2016/008665, dated Oct. 31, 2016.

Nokia Networks, "Dynamic adaptation of HARQ-ACK feedback size and PUCCH format", R1-152810, 3GPP TSG RAN WG1 Meeting #81, Fukuoka, Japan, May 25-29, 2015, pp. 1-3, 3GPP.

NEC, "SCell state at PUCCH SCell configuration", R2-151419, 3GPP TSG RAN WG2 Meeting #89bis, Bratislava, Slovakia, Apr. 20-24, 2015, pp. 1-4, 3GPP.

* cited by examiner

FIG.24

$n_{PRB} = N_{RB}^{UL} - 1$

| $m=1$ | $m=0$ |
|---|---|
| $m=3$ | $m=2$ |
|   |   |
| $m=2$ | $m=3$ |
| $m=0$ | $m=1$ |

$n_{PRB} = 0$

ONE SUBFRAME

APPARATUS AND METHOD FOR TRANSMITTING UPLINK CONTROL INFORMATION THROUGH A PHYSICAL UPLINK CONTROL CHANNEL

CROSS-REFERENCE TO RELATED APPLICATIONS

This application is a continuation of U.S. patent application Ser. No. 15/230,249, filed on Aug. 5, 2016, and claims priority from and the benefit of Korean Patent Application Nos. 10-2015-0110849, filed on Aug. 6, 2015, 10-2015-0110850, filed on Aug. 6, 2015, and 10-2015-0110851, filed on Aug. 6, 2015, each of which is hereby incorporated by reference in its entirety.

BACKGROUND

1. Field

The present disclosure relates to a wireless communication system, more particularly, to a method, an apparatus, software, or a recoding medium that stores software, which transmits or receives uplink control information through a Physical Uplink Control Channel (PUCCH) in a wireless communication system.

Furthermore, the present disclosure relates to a wireless communication system, more particularly, to a method, an apparatus, software, or a recoding medium that stores software, which simultaneously transmits or receives uplink acknowledgement information and periodic channel state information (CSI) in a wireless communication system.

2. Discussion of the Background

Hybrid automatic repeat request (HARQ)-acknowledgement information, that is, HARQ-ACK information, which indicates whether a receiving end successfully decodes data transmitted from a transmitting end in a wireless communication system, may be transmitted or fed back from the receiving end to the transmitting end. For example, an error detection code (e.g., a cyclic redundancy check (CRC)) may be added based on a codeword unit, to downlink data that is transmitted from a base station to a terminal. Accordingly, the terminal may generate acknowledgement (ACK)/negative acknowledgment (NACK) information based on a codeword unit, and may transmit the same to the base station through an uplink channel. Similar to the transmission of uplink ACK information which responds to the downlink data transmission, an ACK with respect to uplink data that is transmitted from the terminal to the base station may be transmitted from the base station to the terminal through a downlink channel.

A rank indicator (RI), a precoding matrix index (PMI), channel quality information (CQI), or the like are defined as information that a receiving end feeds back to a transmitting end in a wireless communication system to which a multi-input multi-output (MIMO) technology is applied. The feedback information is generally referred to as channel state information (CSI). For example, a terminal may feed back a preferred RI and/or PMI to a base station, based on a measurement result associated with a downlink channel from the base station. Here, the RI preferred by the terminal may correspond to a downlink transmission rank value that may have the highest transmission rate when it is used by the base station in a given channel state. Also, the PMI preferred by the terminal is an index indicating a precoding matrix appropriate for a channel state measured by the terminal, in a codebook which is the set of precoding matrix candidates. The codebook may be determined in advance and shared by the base station and the terminal. Also, the CQI is calculated based on the RI and/or PMI reported by the terminal, and may correspond to a modulation and coding scheme (MCS) level that is applied to downlink transmission. That is, the CQI may indicate an MCS level that provides an acceptable packet error rate when a predetermined rank value and pre-coder information is applied. A point in time when to report a CSI of the terminal and the range of frequency (or frequency resolution) to be measured may be controlled by the base station. In association with the point in time when to report, a periodic CSI report and aperiodic CSI report may be supported. Generally, the periodic CSI report may be performed through a physical uplink control channel (PUCCH), and the aperiodic CSI report may be performed through a physical uplink shared channel (PUSCH).

In a general wireless communication system (e.g., a system according to 3GPP LTE release 8 or 9), a single frequency band is used. However, in an advanced wireless communication system (e.g., 3GPP LTE release 10, 11, or 12), carrier aggregation (CA) is used to bind a plurality of frequency bands so that effects are provided as if a frequency band having a logically large bandwidth is used. For example, two contiguous or non-contiguous bands (that is, two different component carriers (CC) having different carrier frequencies) in the frequency domain may be aggregated, and a higher transmission rate may be supported. In CA, a cell may be formed of a downlink resource (that is, downlink component carrier (DL CC)) and/or an uplink resource (that is, uplink component carrier (UL CC)). Here, the UL CC is not essential, and a single cell may correspond to only the DL CC, or may correspond to both the DL CC and the UL CC. The DL CC and the UL CC may be expressed as a carrier frequency, and the carrier frequency may indicate a center frequency in a corresponding cell. The cell may be classified as a primary cell (PCell) that operates in a primary frequency and a secondary cell (SCell) that operates in a secondary frequency. The PCell and the SCell may be generally referred to as a serving cell. The PCell indicates a serving cell that provides a security input and Non-Access Stratum (NAS) mobility information in the state of radio resource control establishment or re-establishment. The set of serving cells may be configured by adding one or more SCells to a PCell based on the capability of a terminal. That is, the set of serving cells configured for a single terminal may include only a single PCell or may include a single PCell and one or more SCells.

The conventional CA defines that a maximum of 5 CCs are aggregated. However, recently, the CA technology enhancement that aggregates more than 5 CCs (e.g., a maximum or 32 CCs) has been discussing. To support the enhanced CA (eCA), the introduction of a new PUCCH format that has a larger capacity than the existing PUCCH format has been discussing.

Also, in the conventional CA, uplink control information (UCI) (here, the UCI generally indicates a HARQ-ACK, CSI, a scheduling request (SR), and the like) through a PUCCH is transmitted only in a primary cell (PCell), which is a limitation. However, in the eCA, supporting a PUCCH transmission in a secondary cell (SCell), is also discussed.

Therefore, when a new PUCCH format is configured, there is a desire for a detailed scheme for simultaneously transmitting HARQ-ACK information and one or a plurality of periodic CSIs. Also, there is a need for a detailed scheme for supporting the transmission of uplink control information when a new PUCCH format is set for a UE.

SUMMARY

Exemplary embodiments of the present invention provide a method and apparatus for a terminal to simultaneously transmit or receive uplink HARQ-ACK information and a periodic CSI.

Exemplary embodiments of the present invention provide a method and apparatus for transmitting or receiving uplink control information through a PUCCH in an environment that supports at least a predetermined number of CCs in a wireless communication system.

Exemplary embodiments of the present invention provide a method and apparatus for a terminal to simultaneously transmit or receive HARQ-ACK information and one or a plurality of periodic CSIs when a new PUCCH format is set for the terminal.

Exemplary embodiments of the present invention provide a method and apparatus for dynamically switching an uplink control channel format.

Exemplary embodiments of the present invention provide a method and apparatus for dynamically switching an uplink control channel format for the transmission of uplink acknowledgment (ACK) information.

Exemplary embodiments of the present invention provide a method and apparatus that transmits uplink ACK information using an uplink control format that is dynamically selected based on the size of the uplink ACK information.

Exemplary embodiments of the present invention provide a method and apparatus that transmits uplink ACK information using an uplink control channel that is dynamically selected based on a serving cell group.

Exemplary embodiments of the present invention provide a method and apparatus for dynamically allocating a resource for an uplink control channel.

Exemplary embodiments of the present invention provide a method and apparatus that allocates resource regions that may be used by an uplink control channel, and indicates a resource region that is used by the uplink control channel out of the resource regions.

Exemplary embodiments of the present invention provide a method and apparatus that semi-statically allocates resource regions that may be used by an uplink control channel, and dynamically allocates a resource region that is used by the uplink control channel out of the resource regions.

An exemplary embodiment of the present invention provides a method for transmitting uplink control information through a Physical Uplink Control Channel (PUCCH) by a User Equipment (UE), the method including: configuring serving cells for the UE, the serving cells including at least six serving cells configurable for the UE; receiving PUCCH format configuration information for transmitting uplink control information associated with the configured serving cells, the PUCCH format configuration information including configuration information of PUCCH format 4 indicated by PUCCH-Format parameter of PUCCH-Config Information Element (IE) in a Radio Resource Control (RRC) message; determining a total number of Hybrid Automatic Repeat Request-Acknowledgement (HARQ-ACK) bits, scheduling request (SR) bits, and periodic Channel State Information (CSI) bits to be transmitted in a subframe; selecting, at least based on the determined total number, a PUCCH format to transmit at least one of HARQ-ACK, SR, and periodic CSI in the subframe, the selected PUCCH format being one of PUCCH formats including the PUCCH format 4 and PUCCH format 3; and transmitting the uplink control information associated with the configured serving cells in the subframe using the selected PUCCH format, the uplink control information associated with the configured serving cells including the at least one of HARQ-ACK, SR, and periodic CSI.

An exemplary embodiment of the present invention provides a method for transmitting uplink control information through a Physical Uplink Control Channel (PUCCH) by a User Equipment (UE), the method including: configuring serving cells for the UE, the serving cells including at least six serving cells configurable for the UE; receiving PUCCH format configuration information for transmitting uplink control information associated with the configured serving cells, the PUCCH format configuration information including configuration information of PUCCH format 4 indicated by a Radio Resource Control (RRC) message; determining a total number of Hybrid Automatic Repeat Request-Acknowledgement (HARQ-ACK) bits, scheduling request (SR) bits, and periodic Channel State Information (CSI) bits to be transmitted in a subframe; selecting, at least based on the determined total number, a PUCCH format to transmit at least one of HARQ-ACK, SR, and periodic CSI in the subframe, the selected PUCCH format being one of PUCCH formats including the PUCCH format 4 and PUCCH format 3; and transmitting the uplink control information associated with the configured serving cells in the subframe using the selected PUCCH format, the uplink control information associated with the configured serving cells including the at least one of HARQ-ACK, SR, and periodic CSI. Selecting of the PUCCH format includes determining whether the total number of HARQ-ACK bits, SR bits, and periodic CSI bits to be transmitted in a subframe is greater than 22, and selecting the PUCCH format 4 when the determined total number is greater than 22.

An exemplary embodiment of the present invention provides a User Equipment (UE) to transmit uplink control information through a Physical Uplink Control Channel (PUCCH), the UE including: a transceiver; and a processor operationally coupled to the transceiver and configured to: configure serving cells for the UE, the serving cells including at least six serving cells configurable for the UE; identify PUCCH format configuration information for transmitting uplink control information associated with the configured serving cells, the PUCCH format configuration information including configuration information of PUCCH format 4 indicated by PUCCH-Format parameter of PUCCH-Config Information Element (IE) in a Radio Resource Control (RRC) message; determine a total number of Hybrid Automatic Repeat Request-Acknowledgement (HARQ-ACK) bits, scheduling request (SR) bits, and periodic Channel State Information (CSI) bits to be transmitted in a subframe; select, at least based on the determined total number, a PUCCH format to transmit at least one of HARQ-ACK, SR, and periodic CSI in the subframe, the selected PUCCH format being one of PUCCH formats including the PUCCH format 4 and PUCCH format 3; and control the transceiver to transmit the uplink control information associated with the configured serving cells in the subframe using the selected PUCCH format, the uplink control information associated with the configured serving cells including the at least one of HARQ-ACK, SR, and periodic CSI.

BRIEF DESCRIPTION OF THE DRAWINGS

The accompanying drawings, which are included to provide a further understanding of the invention, illustrate embodiments of the invention, and together with the description serve to explain the principles of the invention.

FIG. 24 is a diagram illustrating a scheme of determining a slot in which a PF4 resource is allocated according to an exemplary embodiment of the present invention.

DETAILED DESCRIPTION OF THE ILLUSTRATED EMBODIMENTS

Figure 1:
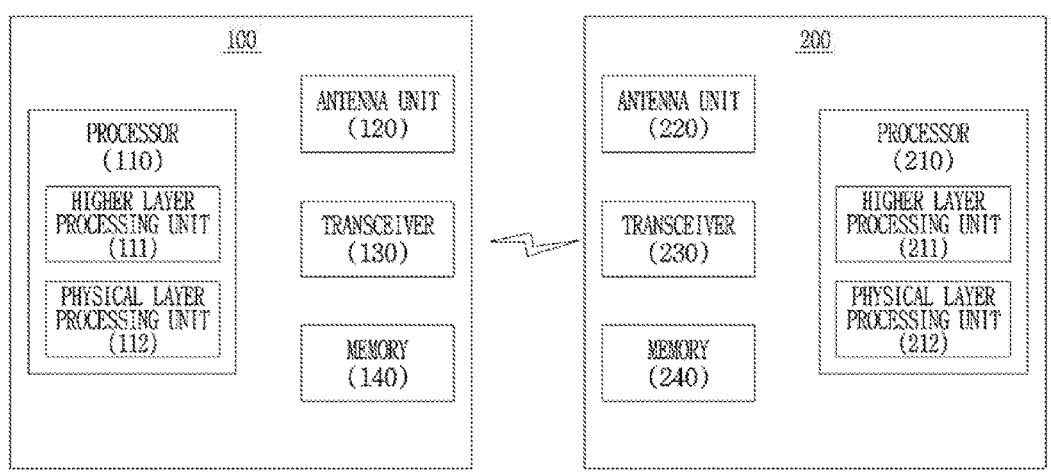
FIG. 1 is a diagram illustrating a configuration of a wireless device according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations, which are performed for communicating with a terminal in a network formed of a plurality of network nodes including a Base Station (BS), are executable by the BS or other network nodes excluding the BS. The 'BS' may be replaced with the terms, such as, a fixed station, a Node B, an eNode B (eNB), an Access Point (AP), and the like. Also, the 'terminal' may be replaced with the terms, such as a User Equipment (UE), a Mobile Station (MS), a Mobile Subscriber Station (MSS), a Subscriber Station (SS), a non-AP station (non-AP STA), and the like.

The terms used for describing the embodiments of the present invention are described through the 3GPP LTE/LTE-Advanced (LTE-A) standard documents, unless otherwise noted. However, this is merely for the economic feasibility and clarity of description. It should be construed that the application of the embodiments of the present invention is not limited to the system based on the 3GPP LTE/LTE-A or following standards.

Hereinafter, a wireless device according to an exemplary embodiment of the present invention will be described.

FIG. 1 is a diagram illustrating a configuration of a wireless device according to an exemplary embodiment of the present invention.

FIG. 1 illustrates a user equipment (UE) 100 that corresponds to an example of a downlink receiving device or an uplink transmitting device, and a eNode B (eNB) 200 that corresponds to an example of a downlink transmitting device or an uplink receiving device.

The UE 100 may include a processor 110, an antenna unit 120, a transceiver 130, and a memory 140.

The processor 110 processes a baseband-related signal, and may include an upper layer processing unit 111 and a physical layer processing unit 112. The higher layer processing unit 111 may process the operations of a medium access control (MAC) layer, a radio resource control (RRC) layer, or an upper layer that is higher than them. The physical layer processing unit 1120 may process the operations of a physical (PHY) layer (e.g., processing an uplink transmission signal or processing a downlink reception signal). The processor 110 may control the general operations of UE 100, in addition to processing a baseband-related signal.

The antenna unit 120 may include one or more physical antennas, and may support MIMO transmission/reception when a plurality of antennas is included. The transceiver 130 may include a radio frequency (RF) transmitter and an RF receiver. The memory 140 may store information processed by the processor 110, and software, an operating system (OS), applications or the like associated with the operations of the UE 100, and may include components, such as a buffer or the like.

The eNB 200 may include a processor 210, an antenna unit 220, a transceiver 230, and a memory 240.

The processor 210 processes a baseband-related signal, and may include an upper layer processing unit 211 and a physical layer processing unit 212. The upper layer processing unit 211 may process the operations of an MAC layer, an RRC layer, or an upper layer that is higher than them. The physical layer processing unit 212 may process the operations of a PHY layer (e.g., processing a downlink transmission signal or processing an uplink reception signal). The processor 210 may control the general operations of the eNB 200, in addition to processing a baseband-related signal.

The antenna unit 220 may include one or more physical antennas, and may support MIMO transmission/reception when a plurality of antennas is included. The transceiver 230 may include an RF transmitter and an RF receiver. The memory 240 may store information processed by the processor 210, and software, an OS, applications or the like associated with the operations of the eNB 200, and may include components, such as a buffer or the like.

Hereinafter, a structure of a radio frame will be described.

Figure 2:
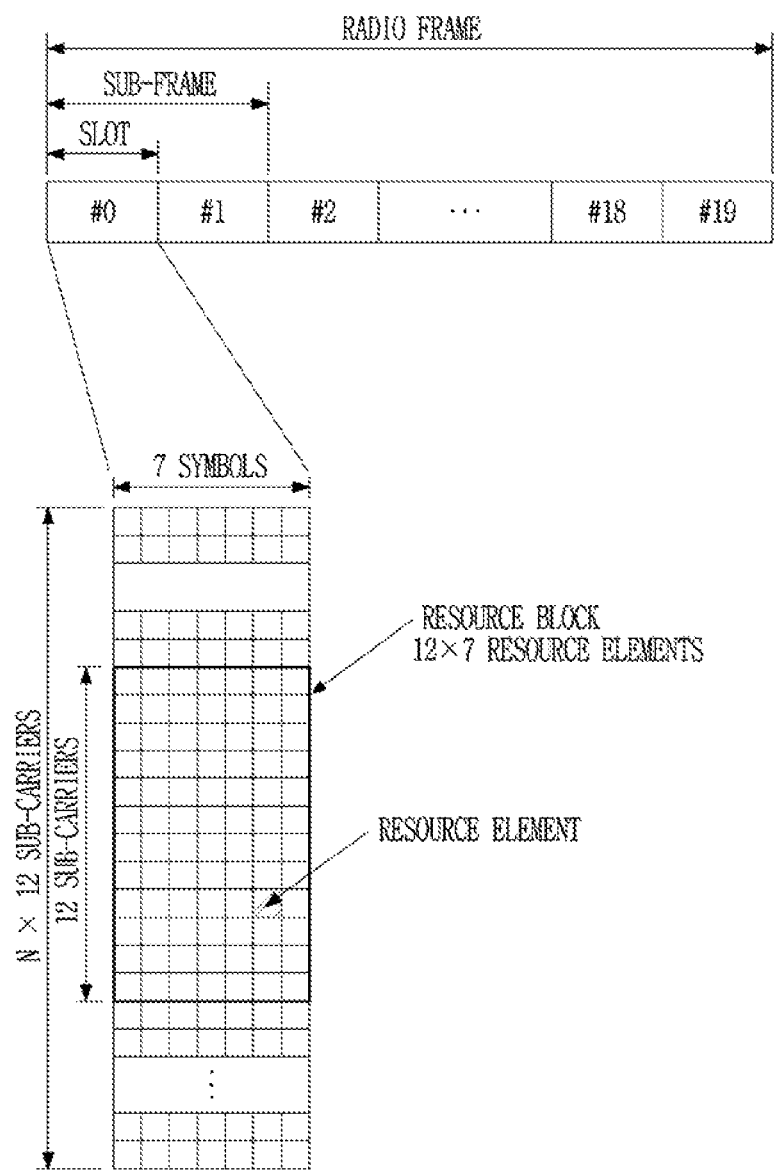
FIGS. 2 and 3 are diagrams illustrating a structure of a radio frame of a 3GPP LTE system.
Figure 3:
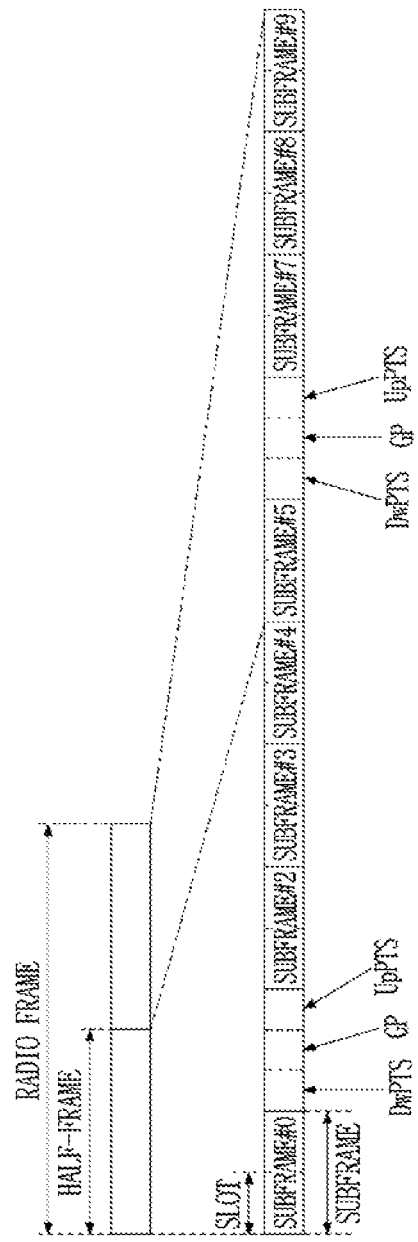

FIGS. 2 and 3 are diagrams illustrating a structure of a radio frame of a 3GPP LTE system.

In a cellular orthogonal frequency division multiplexing (OFDM) wireless packet communication system, an uplink transmission or a downlink transmission is executed based on a subframe unit. A single subframe is defined as a predetermined period of time including a plurality of OFDM symbols. The 3GPP LTE standard supports the structure of a radio frame type 1 that is applied to frequency division duplex (FDD), and the structure of a radio frame type 2 that is applied to time division duplex (TDD).

FIG. 2 illustrates the structure of the radio frame type 1. A single radio frame is formed of 10 subframes, and a single subframe is formed of 2 slots in the time domain. A time expended for transmitting a single subframe is referred to as a transmission time interval (TTI). For example, the length of a single subframe is 1 ms, and the length of a single slot is 0.5 ms. A single slot may include a plurality of OFMD symbols in the time domain. The OFDM symbol may be also referred to as a single carrier-frequency division multiple access (SC-FDMA) symbol or a symbol period. The number of OFDM symbols included in a single slot may be different based on the setting of a cyclic prefix (CP). The CP may include an extended CP and a normal CP. In the case of the normal CP, for example, the number of OFDM symbols included in a single slot may be 7. In the case of the extended CP, the length of one OFDM symbol is extended, and thus, the number of OFDM symbols included in a single slot may be 6, which is fewer than the normal CP. When a channel state is unstable, such as when a UE moves fast, or the like, an extended CP may be used to reduce inter-symbol interference.

In FIG. 2, by assuming the case of an OFDM symbol of the normal CP in a resource grid, a single slot corresponds to 7 OFDM symbols in the time domain. In the frequency domain, a system bandwidth is defined to be integer (N) times the resource block (RB), a downlink system bandwidth may be indicated by a parameter $N^{DL}$, and an uplink system bandwidth may be indicated by a parameter $N^{UL}$. A resource block is a resource allocation unit, and may correspond to a plurality of OFDM symbols (e.g., 7 OFDM symbols) of a single slot in the time domain and may correspond to a plurality of consecutive sub-carriers (e.g., 12 sub-carriers) in the frequency domain. Each element in the resource grid is referred to as a resource element (RE). A single resource block includes 12×7 REs. The resource grid of FIG. 2 may be applied equally to an uplink slot and a downlink slot. Also, the resource grid of FIG. 2 may be equally applied to the slot of the radio frame type 1 and the slot of the radio frame type 2.

FIG. 3 illustrates the structure of the radio frame type 2. The radio frame type 2 is formed of 2 half frames, and each half frame may be formed of 5 subframes, a downlink pilot time slot (DwPTS), a guard period (GP), and an uplink pilot time slot (UpPTS). Like the radio frame type 1, a single subframe is formed of 2 slots. The DwPTS is used for initial cell search, synchronization, or channel estimation in a UE, in addition to transmission/reception of data. The UpPTS is used for channel estimation and uplink transmission synchronization of a UE, in an eNB. The GP is a period between an uplink and a downlink, for removing interference generated in the uplink due to a multi-path delay of a downlink signal. The DwPTS, GP, and UpPTS may be also referred to as special subframes.

Figure 4:
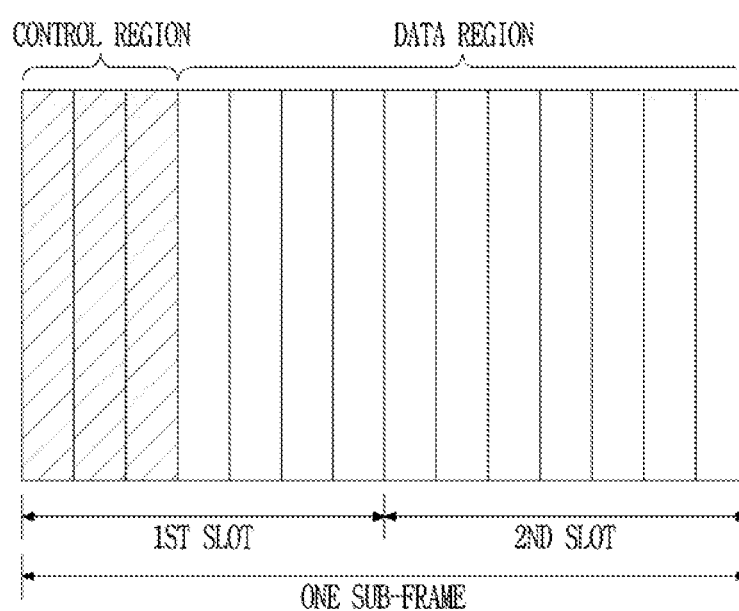
FIG. 4 is a diagram illustrating a structure of a downlink subframe.

FIG. 4 is a diagram illustrating a structure of a downlink subframe. A plurality of OFDM symbols (e.g., 3 OFDM symbols) disposed in the front part of a first slot in a single subframe may correspond to a control region to which a control channel is allocated. The remaining OFDM symbols correspond to a data region to which a physical downlink shared channel (PDSCH) is allocated. Downlink control channels used in the 3GPP LTE system may include a physical control format indicator channel (PCFICH), a physical downlink control channel (PDCCH), a physical hybrid automatic repeat request indicator channel (PHICH), and the like. In addition, an enhanced physical downlink control channel (EPDCCH) of the data region may be transmitted to UEs configured by an eNB.

The PCFICH is transmitted in a first OFDM symbol of a subframe, and may include information associated with the number of OFDM symbols used for a control channel transmission in the subframe.

The PHICH is a response to an uplink transmission, and includes HARQ-ACK information.

Control information transmitted through the (E)PDCCH is referred to as downlink control information (DCI). The DCI includes uplink or downlink scheduling information, or may include other control information based on various purposes, such as a command for controlling an uplink transmission power with respect to a UE group, or the like. The eNB determines an (E)PDCCH format based on DCI transmitted to a UE, and assigns a cyclic redundancy check (CRC) to control information. The CRC is masked with a radio network temporary identifier (RNTI), based on an owner or the purpose of the (E)PDCCH. When the (E)PDCCH is for a predetermined UE, the CRC may be masked with a cell-RNTI (C-RNTI) of the UE. Alternatively, when the PDCCH is for a paging message, the CRC may be masked with a paging indicator identifier (P-RNTI). When the PDCCH is for a system information block (SIB), the CRC may be masked with a system information identifier and a system information RNTI (SI-RNTI). To indicate a random access response with respect to a random access preamble transmission of a UE, the CRC may be masked with a random access-RNTI (RA-RNTI).

Figure 5:
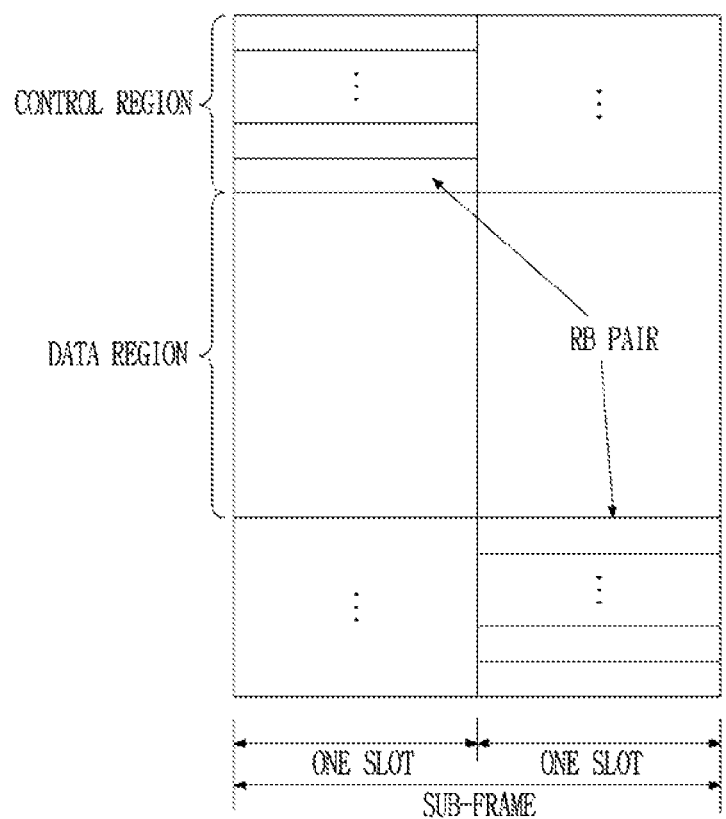
FIG. 5 is a diagram illustrating a structure of an uplink subframe.

FIG. 5 is a diagram illustrating a structure of an uplink subframe. An uplink subframe may be separated into a control region and a data region in the frequency domain. A physical uplink control channel (PUCCH) including uplink control information may be allocated to the control region. A physical uplink shared channel (PUSCH) including user data may be allocated to the data region. A PUCCH for a single UE may be allocated to a resource block pair (RB pair) in a subframe. The resource blocks included in the RB pair may occupy different sub-carriers with respect to two slots. This indicates that the RB pair that is allocated to a PUCCH is frequency-hopped in a slot boundary.

Hereinafter, a physical uplink control channel (PUCCH) will be described.

The amount of uplink control information (UCI) that the UE may transmit in a single subframe may be determined based on the number of SC-FDMA symbols that are usable for the transmission of control information (that is, the number of SC-FDMA symbols excluding SC-FDMA symbols used for transmitting a reference signal (RS) for the coherent detection of a PUCCH).

In the 3GPP LTE system, a PUCCH is defined by a total of 7 different formats, based on transmitted control information, a modulation scheme, the amount of control information, and the like. The number of bits (Mbit) transmitted in each subframe is listed in Table 1, for each PUCCH format.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

PUCCH format 1 is used when a scheduling request (SR) exists, that is, when a positive SR is satisfied.

PUCCH format 1a is used for a 1-bit HARQ-ACK (that is, HARQ ACK/NACK), or in the case of FDD, PUCCH format 1a is used for a 1-bit HARQ-ACK with a positive SR. PUCCH format 1b is used for a 2-bit HARQ-ACK or may be used for a 2-bit HARQ-ACK with a positive SR. Also, PUCCH format 1b is used for up to a 4-bit HARQ-ACK with channel selection. This may be applied when serving cells (e.g., two serving cells), of which the number is greater than one, are configured for a UE, or in the case of TDD, this may be applied when a single serving cell is configured.

PUCCH format 2 is used for reporting CSI that is not multiplexed with a HARQ-ACK. Also, PUCCH format 2 is used for reporting CSI that is multiplexed with a HARQ-ACK for an extended cyclic prefix (CP). PUCCH format 2a is used for reporting CSI that is multiplexed with a 1-bit HARQ-ACK for a normal CP. PUCCH format 2b is used for reporting CSI that is multiplexed with a 2-bit HARQ-ACK for a normal CP.

PUCCH format 3 is used for up to a 10-bit HARQ-ACK for FDD, or is used for up to a 20-bit HARQ-ACK for TDD. Also, PUCCH format 3 is used for up to 11 bits corresponding to a 10-bit HARQ-ACK for FDD and a 1-bit positive/negative SR, or is used for up to 21 bits corresponding to a 20-bit HARQ-ACK for TDD and a 1-bit positive/negative SR. Also, PUCCH format 3 is used for a multi-bit HARQ-ACK, a 1-bit positive/negative SR, and a CSI report for a single serving cell.

Figure 6:
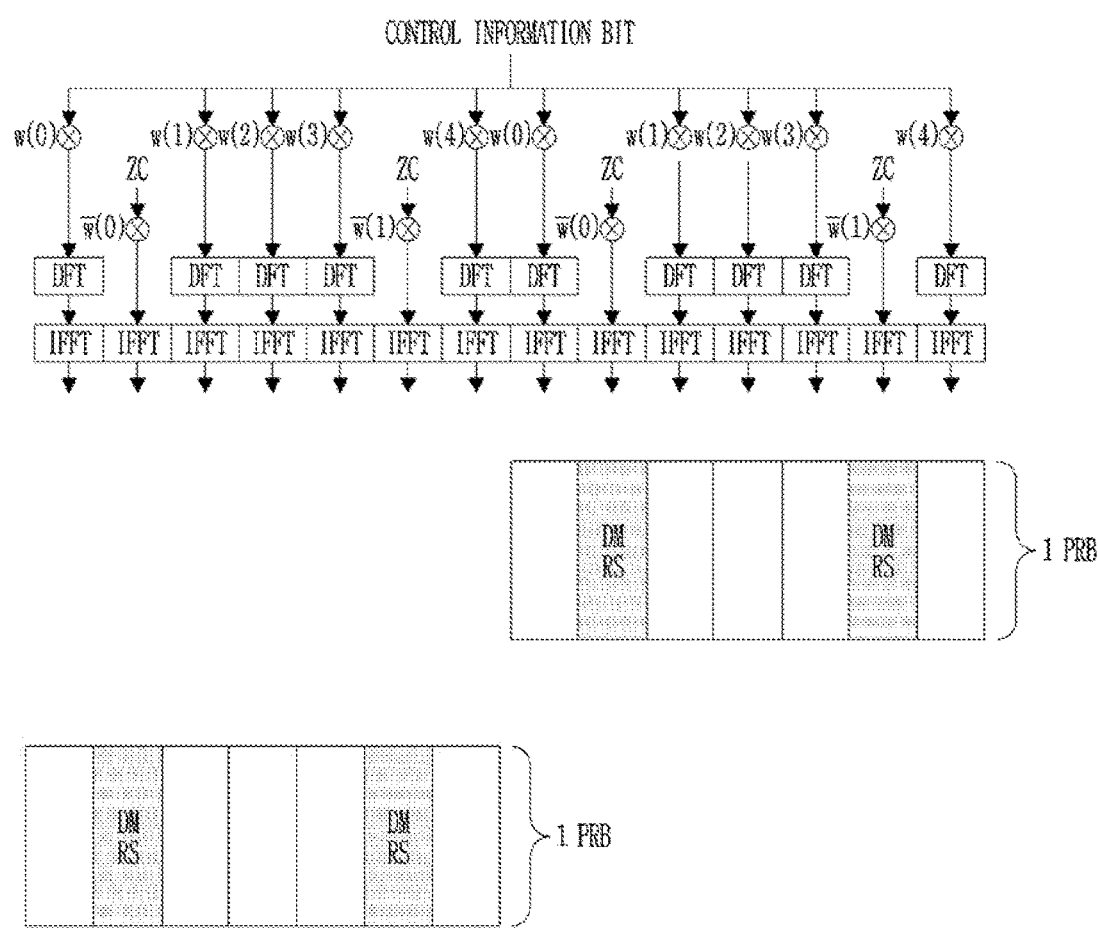
FIG. 6 is a diagram illustrating a structure of PUCCH format 3.

FIG. 6 is a diagram illustrating the structure of PUCCH format 3.

In the case of PUCCH format 3, block spreading is applied to the transmission of control information, unlike PUCCH format 1/1a/1b or PUCCH format 2/2a/2b. For example, 48 bits may be formed by encoding uplink control information bits (e.g., multiple HARQ-ACK bits (including an SR information bit) and/or CSI bits). The coded 48 bits may be scrambled using a cell-specific sequence. 24 bits out of the bits may be transmitted in predetermined SC-FDMA symbols each of an even-numbered slot, and the remaining 24 bits may be transmitted in predetermined SC-FDMA symbols of an odd-numbered slot. 24 bits in each SC-FDMA symbol may be modulated into 12 quadrature phase shift keying (QPSK) symbols, and may be spread to 4 or 5 SC-FDMA symbols using an orthogonal cover code (OCC) having a length of 4 or 5 according to a spreading factor (SF) in a single slot. By using different OCCs, PUCCH transmissions by different UEs may be multiplexed in an identical PRB pair. In the example of FIG. 6, w(0), w(1), w(2), w(3), and w(4) indicate an OCC. The spread symbols may be discrete Fourier transform (DRF)-precoded and transmitted, in a single RB in the frequency domain and 4 or 5 SC-FDAM symbols in the time domain.

In the case of a normal CP, a PUCCH demodulation reference signal (DMRS) is mapped to SC-FDMA symbol indices 1 and 5 (herein, it is assumed that an SC-FDMA symbol index begins with 0) in a single slot, and control information may be mapped to the remaining SC-FDMA symbol indices (that is, SC-FDMA symbol indices 0, 2, 3, 4, and 6). Here, the case in which the last SC-FDMA symbol in a second slot out of two slots in a single subframe is used for an SRS transmission, and the remaining 4 SC-FDMA symbols are used for PUCCH format 3, is referred to as a shortened PUCCH format 3. This corresponds to the case in which the last SC-FDMA symbol in the single subframe is punctured for the SRS transmission. Also, in an extended CP, a PUCCH DMRS is mapped to a single SC-FDMA symbol (that is, an SC-FDMA symbol index 3) in a single slot, and control information may be mapped to the remaining SC-FDMA symbols (that is, SC-FDMA symbol indices 0, 1, 2, 4, and 5).

In the example of FIG. 6, the DMRS symbol may be generated from a Zadoff-Chu sequence to which a predetermined cyclic-shift value is applied, and an OCC having a length of 2 may be applied to two DMRS symbols in a single slot. In the example of FIG. 6, $\overline{w}(0)$, $\overline{w}(1)$ indicates an OCC. Here, a result value obtained by applying an OCC to a DMRS symbol is always 1, and thus, actually, additional multiplexing is not performed through the OCC that is applied to the ZC sequence.

As described with reference to FIG. 5, a PRB pair used for PUCCH format 3 is formed of a single PRB of one side frequency edge of a system bandwidth in a single slot in a single subframe and a single PRB of the other side frequency edge of the other slot. That is, the PRB pair of PUCCH format 3 may be frequency-hopped based on a slot boundary (intra-subframe frequency hopping). The frequency hopping relation may be defined based on pairing between PRBs in the slots, and a PRB-pair through which uplink control information is to be transmitted may be determined based on a PUCCH format 3 resource index.

When PUCCH format 3 is set for a UE, a single resource set (that is, a plurality of PUCCH format 3 resources are included) is set by a higher layer (e.g., RRC). Which PUCCH format 3 resource is to be used by the UE out of the resource set may be explicitly indicated by a PUCCH transmission power control (TPC) command field (2 bits) included in an (E)PDCCH downlink DCI (e.g., DCI format 1/1A/1B/1D/2/2A/2B/2C/2D), or a HARQ-ACK resource offset field (2 bits) included in an EPDCCH downlink DCI. The HARQ-ACK resource offset field may exist in an EPDCCH DCI, but does not exist in a PDCCH DCI. The 2 bits of the HARQ-ACK resource offset field may have a value of 0 when an EPDCCH DCI is transmitted on an SCell, or when an EPDCCH DCI that schedules a PDSCH on an SCell is transmitted on a PCell and PUCCH format 3 is set for the UE for HARQ-ACK feedback.

Table 2 provided below shows the mapping relationship between a TPC field or a HARQ-ACK resource offset field and a PUCCH format 3 resource index $n_{PUCCH}^{(3,\tilde{p})}$.

TABLE 2

| TPC command field value or HARQ-ACK resource offset field value for PUCCH | PUCCH format 3 resource index ($n_{PUCCH}^{(3,\tilde{p})}$) |
|---|---|
| '00' | first PUCCH resource value set by higher layer |
| '01' | second PUCCH resource value set by higher layer |
| '10' | third PUCCH resource value set by higher layer |
| '11' | fourth PUCCH resource value set by higher layer |

Hereinafter, HARQ-ACK information will be described.

HARQ-ACK information is control information that is fed back from a reception side to a transmission side based on whether data transmitted from the transmission side is successfully decoded. For example, when a UE successfully decodes downlink data, the UE may transmit ACK information to an eNB, and may feed NACK information back to the eNB when the UE fails to decode the downlink data. Particularly, the case in which a data reception side needs a HARQ-ACK transmission in the 3GPP LTE system may be classified briefly as three cases as follows.

First, a HARQ-ACK is transmitted with respect to a PDSCH transmission indicated by the detection of a (E)PDCCH. Second, a HARQ-ACK is transmitted with respect to a (E)PDCCH that indicates releasing a Semi-Persistent Scheduling (SPS). Third, a HARQ-ACK is transmitted with respect to a PDSCH that is transmitted without the detection of a (E)PDCCH. This indicates a HARQ-ACK transmission with respect to an SPS. In the following descriptions, a HARQ-ACK transmission scheme is not limited to any one of the three cases, unless otherwise indicated. Also the above three cases can be called a DL transmission that is acknowledged by an HARQ-ACK.

Subsequently, the transmission resource of HARQ-ACK information in an FDD scheme and a TDD scheme will be described in detail.

The FDD scheme is a scheme that executes transmission/reception by distinguishing downlink (DL) and uplink (UP) for each independent frequency band. Therefore, when an eNB sends a PDSCH in a DL band, a UE transmits a HARQ-ACK response indicating whether DL data is normally received, through a PUCCH on a UL band corresponding to the DL band after a predetermined period of time. Therefore, DL and UL may operate in one-to-one correspondence with each other.

Particularly, in the example of the 3GPP LTE system, control information associated with a downlink data transmission of an eNB is transferred to a UE through a PDCCH, and the UE that receives, through a PDSCH, data scheduled through the PDCCH for the UE, may transmit a HARQ-ACK through a PUCCH that is a channel for transmitting uplink control information (or based on a piggyback-on-PUSCH scheme). Generally, a PUCCH for a HARQ-ACK transmission is not previously allocated to each UE, but a plurality of PUCCHs may be distributed to a plurality of UEs in a cell at each HARQ-ACK transmission point in time. Therefore, as a PUCCH used by a UE which receives downlink data, for transmitting a HARQ-ACK at a predetermined point in time, a PUCCH may be used, which corresponds to a PDCCH that is used when the UE receives scheduling information associated with the corresponding downlink data.

The PUCCH (e.g., PUCCH format 1/1a/1b) corresponding to the PDCCH will be described in detail. A region where a PDCCH is transmitted in each downlink subframe is formed of a plurality of control channel elements (CCE), and a PDCCH transmitted to a UE in a subframe may be formed of one or a plurality of CCEs out of the CCEs forming the PDCCH region of the corresponding subframe. Also, in a region where a PUCCH is transmitted in each uplink subframe, resources that are capable of transmitting a plurality of PUCCHs may exist. In this instance, a UE may transmit a HARQ-ACK through a PUCCH having an index that corresponds to the index of a predetermined CCE (that is, a first CCE) out of the CCEs forming a PDCCH that the UE receives, the UE can determine the PUCCH index and use PUCCH resources that corresponds the PUCCH index so that the UE transmits HARQ-ACK.

In a system in which a PUCCH serving cell (PCell or P-SCell, which will be described in detail) is set to a frame structure 1 in FDD (that is, frame structure type 1) or FDD-TDD, a UE may transmit, in a subframe index n, HARQ-ACK information with respect to a PDSCH transmission received in a subframe index n-k (e.g., k=4). Based on a PDCCH that indicates a PDSCH transmission in the subframe n-k, the UE may determine a PUCCH resource index through which a HARQ-ACK is to be transmitted at the subframe n.

Subsequently, a HARQ-ACK transmission in the TDD scheme will be described.

In a TDD mode, a downlink transmission and an uplink transmission are distinguished by time, and thus, subframes in a single radio frame may be distinguished as downlink subframes and uplink subframes. Table 3 illustrates examples of a UL-DL configuration in the TDD mode.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3, D denotes a downlink subframe, U denotes an uplink subframe, and S denotes a special subframe including a DwPTS, a GP, and an UpPTS.

In a system in which a PUCCH serving cell (PCell or P-SCell, which will be described in detail) is set to a frame structure 2 in TDD (frame structure type 2) or FDD-TDD, a UE may transmit, in a single uplink subframe, HARQ-ACK information with respect to a PDSCH transmission received in one or more downlink subframes. The UE may transmit, in an uplink subframe n, HARQ-ACK information with respect to a PDSCH transmission received in a downlink subframe n-k, and k may be given based on the UL-DL configuration. For example, with respect to the UL-DL configurations of Table 3, a downlink association set index K:$\{k_0, k_1, \ldots, k_{M-1}\}$ may be given as shown in Table 4. That is, M downlink subframes may be associated with a single uplink subframe n, and M downlink subframes may be referred to as a subframe n-$k_m$ (m=0, 1, ..., M-1).

TABLE 4

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the case of the UL-DL configuration index 0 in Table 4, k=4 is given with respect to an uplink subframe index 9, and thus, HARQ-ACK information with respect to data that is received in a single (M=1) downlink subframe (that is, a downlink subframe index 5 (that is, a subframe index that is located 4 subframes before the subframe index 9)) may be transmitted in the uplink subframe index 9. Alternatively, in the case of the UL-DL configuration index 5 in Table 3, k=13, 12, 9, 8, 7, 5, 4, 11, and 6 is given with respect to an uplink subframe index 2, and thus, HARQ-ACK information with respect to data that is received in 9 (M=9) downlink subframes (that is, a downlink subframe index 9 (=2-13) of a previous radio frame of an immediately previous radio frame, and downlink subframe indices 0(=2-12), 3(=2-9), 4(=2-8), 5(=2-7), 7(=2-5), 8(=2-4), 1(=2-11), 6(=2-6) of the immediately previous radio frame) may be transmitted in the uplink subframe index 2.

Also, in a predetermined TDD CA configuration environment (e.g., when the TDD UL-DL configurations of serving cells are different, or when a PCell is set to TDD and SCell(s) is set to FDD), a DL reference UL-DL configuration may be used for a predetermined serving cell(s) (e.g., SCell(s)). In this instance, a subframe association (that is, HARQ-ACK timing) for a HARQ-ACK transmission may be determined based on the DL reference UL-DL configuration, instead of the TDD UL-DL configuration of a corresponding serving cell (e.g., a TDD UL-DL configuration set through an SIB or an RRC signaling). For example, the HARQ-ACK timing of a serving cell having the TDD UL-DL configuration 0 may be determined based on the DL reference UL-DL configuration 2. The DL reference UL-DL configuration may be determined based on a relationship that is determined in advance between a PUCCH serving cell and a service cell (e.g., a PDSCH transmission serving cell) that receives data and needs to provide a HARQ-ACK transmission. For example, in the case of CA of two serving cells having different TDD UL-DL configurations, the DL reference UL-DL configuration may be determined based on a combination of the TDD UL-DL configuration of the PUCCH serving cell and the TDD UL-DL configuration of the PDSCH transmission serving cell. Also, in the case of FDD-TDD, the DL reference UL-DL configuration may be determined based on a combination of the TDD UL-DL configuration of the PUCCH serving cell and a PDSCH transmission FDD serving cell.

Hereinafter, the size of a HARQ-ACK codebook will be described.

The CA up to 3GPP LTE release-12 defines the aggregation of a maximum of 5 serving cells. In a single serving cell, the transmission of a maximum of 2 codewords is supported based on a transmission mode. The size of a HARQ-ACK bit of each codeword transmission is 1 bit, and thus, the size of a HARQ-ACK bit for the transmission of two codewords is 2 bits.

In the case of FDD, a HARQ-ACK with respect to a single downlink subframe is transmitted in a single uplink subframe. In the case of FDD, the maximum number of HARQ-ACK bits may be determined based on Equation 1, as provided below.

$$\sum_{c=1}^{C} K_{mimo,c}$$ [Equation 1]

In Equation 1, $K_{mimo,c}$ denotes whether a MIMO transmission mode is set in a serving cell c. When the value is 1, this may indicate the case in which a single codeword (CW) (or a transmission block (TB)) is transmitted in a single PDSCH, or the case in which two CWs (or TBs) are transmitted in a single PDSCH and spatial bundling is applied to a HARQ-ACK (spatial bundling refers to bundling HARQ-ACK information associated with two codewords (or TB) in a single subframe). When the value is 2, this may indicate the case in which two CWs (or TBs) are transmitted in a single PDSCH and spatial bundling of a HARQ-ACK is not applied. C denotes the number of serving cells configured for a UE.

According to Equation 1, in the case of FDD, the maximum bit size of a HARQ-ACK transmitted in an uplink subframe may be 10 bits. That is, the case of C=5, and $K_{mimo,c}$=2 in each serving cell, may correspond to the case in which HARQ-ACK bits has the maximum size. Therefore, although 5 serving cells are configured, a HARQ-ACK may be reported through PUCCH format 3 in FDD.

In TDD, a HARQ-ACK with respect a transmission in one or more downlink subframes may be transmitted in a single uplink subframe, and as illustrated in Table 3, a HARQ with respect to a transmission in a maximum of 9 downlink subframes may be transmitted in a single uplink subframe. In the case of TDD, the maximum number of HARQ-ACK bits may be determined based on Equation 2, as provided below.

$$\sum_{c=1}^{C} K_{mimo,c} * M_c \quad \text{[Equation 2]}$$

In Equation 2, $K_{mimo,c}$ denotes whether a MIMO transmission mode is set in a serving cell c. When the value is 1, this may indicate the case in which a single codeword (CW) (or TB) is transmitted in a single PDSCH, or the case in which two CWs (or TBs) are transmitted in a single PDSCH and spatial bundling associated with a HARQ-ACK is applied. When the value is 2, this may indicate the case in which two CWs (or TBs) are transmitted in a single PDSCH, and spatial bundling associated with a HARQ-ACK is not applied. $M_c$ indicates the number of downlink subframes associated with an uplink subframe through which a PUCCH is transmitted. C denotes the number of serving cells configured for a UE.

According to Equation 2, in the case of TDD when the same TDD UL-DL configuration is applied to serving cells, theoretically, the maximum bit size of a HARQ-ACK transmitted in a single uplink subframe is 90 bits. That is, the case of C=5, $K_{mimo,c}$=2 in each serving cell, and $M_c$=9 in each serving cell, may correspond to the case in which HARQ-ACK bits has the maximum size, theoretically. However, in the case of TDD, CA is configured under the following limitations. Accordingly, the size of HARQ-ACK bits transmitted in a single uplink subframe may change depending on cases.

Particularly, in the CA of 3GPP LTE release-10, a TDD UL-DL configuration is the same for each serving cell. When a TDD UL-DL configuration index 5 is applied (that is, 9 downlink subframes are associated with a single uplink subframe), only a maximum of 2 serving cells may be configured (when more than 2 serving cells are configured, the number of bits may exceed the number of bits supported by PUCCH format 3). In this instance, the maximum number of HARQ-ACK bits may be 36 (that is, it is assumed that C=2, $K_{mimo,c}$=2 in each of 2 serving cells, and $M_c$=9 in each of 2 serving cells).

Particularly, in the CA of 3GPP LTE release-11, a TDD UL-DL configuration may be different for each serving cell. In this instance, a downlink UL-DL configuration which is used as a reference (that is, the above described DL reference UL-DL configuration) may be determined based on a UL-DL configuration of a PCell and an SCell. When a downlink reference UL-DL configuration index 5 is applied, only a maximum of 2 serving cells may be configured. In this instance, the maximum number of HARQ-ACK bits may be 36 (that is, it is assumed that C=2, $K_{mimo,c}$=2 in each of 2 serving cells, and $M_c$=9 in each of 2 serving cells).

Also, in the case of TDD, when the number of HARQ-ACK bits is greater than 20 bits, spatial bundling (additionally at least one of time spatial bundling and spatial bundling) may be applied to all serving cells. First, bundling may indicate an operation for expressing multi-bit HARQ-ACK information using a fewer number of bits. For example, bundling may be performed through a logical AND but this merely an example. Bundling may be performed using another operation method (e.g., logical OR). Subsequently, spatial bundling refers to bundling HARQ-ACK information associated with two codewords in a single subframe.

Subsequently, spatial bundling refers to bundling HARQ-ACK information associated with two codewords in a single subframe of a single serving cell. Time bundling refers to bundling HARQ-ACK information associated with a plurality of codewords throughout a plurality of subframes of a single serving cell. Frequency bundling refers to bundling HARQ-ACK information associated with a plurality of codewords throughout a plurality of subframes of a single subframe. When spatial bundling and time bundling are simultaneously applied, HARQ-ACK information associated with two codewords is bundled in each of a plurality of subframes of a single serving cell, and the spatially bundled HARQ-ACK information is additionally bundled in the plurality of subframes. When spatial bundling and time bundling are simultaneously applied, HARQ-ACK information associated with two codewords is bundled in a single subframe of each of a plurality of serving cells, and the spatially bundled HARQ-ACK information is additionally bundled in the plurality of serving cells.

In the CA of 3GPP LTE release-12, TDD and FDD may be set differently for each serving cell (this may be referred to as a FDD-TDD configuration). When PUCCH format 3 is set for a UE, and when the number (M) of downlink subframes that is associated with a single uplink subframe is greater than 4, the number of CA serving cells may be limited so that the size of HARQ-ACK bits to be transmitted in PUCCH format 3 does not exceed 21. It is not allowed that the size of HARQ-ACK bits exceeds 21 bits even after spatial bundling is applied to perform transmission in PUCCH format 3, and thus, a number of CA serving cells which cause the above defect may not be configured.

As described above, in the conventional CA in which a maximum of 5 serving cells are configured, all of the possible HARQ-ACK transmissions are not supported. Recently, an enhanced CA (eCA) that aggregates more than 5 serving cells (e.g., a maximum of 32 serving cells) has been discussing. In this instance, in the case of FDD, the maximum number of HARQ-ACK bits is 64 bits according to Equation 1 (that is, it is assumed that C=32, and $K_{mimo,c}$=2 in each of the two serving cells). In the case of TDD, the maximum number of HARQ-ACK bits is 576 bits according to Equation 2 (that is, it is assumed that C=32, $K_{mimo,c}$=2 in each of the 32 serving cells, and $M_c$=9 in each of the 32 serving cells). In the case of FDD-TDD in which a PCell is set to TDD and 31 SCells are set to FDD, the maximum number of HARQ-ACK bits runs to 638 bits (that is, it is assumed that C=32, $K_{mimo,c}$=2 in each of the 32 serving cells, 9 downlink subframes are associated with a single uplink subframe since a TDD UL-DL configuration index 5 is applied to a PCell, and 10 downlink subframes are associated with a single uplink subframe in each of the 31 SCells).

To support the eCA, the introduction of a new PUCCH format that has a larger capacity than the existing PUCCH format has been discussing. Although the new PUCCH format is named PUCCH format 4 in the present specification, this may not be limited by the name.

In an exemplary embodiment of the present invention, PUCCH format 4 may indicate a new PUCCH format having a capacity that is capable of supporting control information having a size greater than P bits (that is, the size of control information bits before channel coding is applied exceeds P bits). Here, P may be 22, which is the maximum control bit size supported by PUCCH format 3. Also, the maximum amount of bits that PUCCH format 4 may support is 64 bits in the case of FDD, and may be at least 128 bits in the case of TDD. Alternatively, PUCCH format 4 may support 128 bits, irrespective of a frame structure.

For example, PUCCH format 4 may be used when more than 5 serving cells are configured for a UE, or when the control information size to be transmitted is greater than 22 although 5 or fewer serving cells are configured for the UE.

In associated with the structure of PUCCH format 4, two format structures have been discussing, briefly. A first structure is the structure of PUCCH format 3 in a plurality of PRB pairs (e.g., a form in which the structure of PUCCH format 3 of FIG. 6 is extended to a plurality of PRB pairs). A second structure is a new PUCCH structure that is based on a PUSCH structure (e.g., a form that has a DMRS structure which is similar to a PUSCH on a PUSCH resource block or a DMRS structure that is similar to PUCCH format 3).

Hereinafter, the simultaneous transmission of a HARQ-ACK and a periodic CSI report will be described.

The periodic CSI is a CSI that is transmitted based on a predetermined period and offset. In one reporting instance of the periodic CSI, CSI corresponding to a predetermined reporting type may be transmitted. PUCCH CSI reporting type 1 supports a CQI feedback with respect to a subband selected by a UE; PUCCH CSI reporting type 1a supports a subband CQI and second PMI feedback; PUCCH CSI reporting type 2, 2b, and 2c support a wideband CQI and PMI feedback; PUCCH CSI reporting type 2a supports a wideband PMI feedback; PUCCH CSI reporting type 3 supports an RI feedback; PUCCH CSI reporting type 4 supports a wideband CQI; PUCCH CSI reporting type 5 supports an RI and wideband PMI feedback; and PUCCH CSI reporting type 6 supports an RI and PTI feedback. Here, the wideband corresponds to a system bandwidth, and a first PMI and a second PMI may indicate, in combination, a precoding matrix that a UE prefers. Also, the property of CSI to be transmitted and a timing when the CSI is to be transmitted may be determined based on a CSI reporting mode.

When periodic CSI reports collide in the same subframe, the periodic CSI reports are prioritized based on at least one out of: a PUCCH CSI reporting type, a CSI process ID, a CSI subframe index, and a serving cell index, and one that has lower priority may be dropped. Accordingly, one periodic report that has higher priority may be transmitted in one reporting instance.

Subsequently, a periodic CSI report may collide with a HARQ-ACK transmission in the same subframe. In this instance, the simultaneous transmission may be performed or the periodic CSI may be dropped based on the state of a parameter(s) which are provided from a higher layer and allow the simultaneous transmission of them, and an additional condition.

Particularly, with respect to a UE for which a single serving cell is configured and PUCCH format 3 is not set, when a periodic CSI report and a HARQ-ACK collide in the same subframe in which a PUSCH is not transmitted, and when a simultaneousAckNackAndCQI parameter provided from a higher layer is set to TRUE, the periodic CSI report may be multiplexed with a HARQ-ACK. Otherwise, the CSI may be dropped.

In TDD, with respect to a UE for which a single serving cell is configured and PUCCH format 3 is set, when a periodic CSI report and a HARQ-ACK collide in the same subframe in which a PUSCH is not transmitted, and when a simultaneousAckNackAndCQI parameter provided from a higher layer is set to TRUE or when a simultaneousAckNackAndCQI-Format3-r11 parameter provided from a higher layer is set to TRUE, the periodic CSI report may be multiplexed with the HARQ-ACK or may be dropped according to a condition. Otherwise, the CSI may be dropped.

With respect to a UE for which serving cells, of which the number is greater than one, are configured in a system in which a PCell is set to the frame structure type 1 (that is, FDD) in FDD or FDD-TDD, in the case in which a periodic CSI report and a HARQ-ACK collide in the same subframe in which a PUSCH is not transmitted, when a simultaneousAckNackAndCQI parameter provided from a higher layer is set to TRUE, and the HARQ-ACK corresponds to a PDCCH/EPDCCH indicating a downlink SPS release in only the PCell or a single PDSCH transmission, the periodic CSI report may be multiplexed with the HARQ-ACK on the PUCCH using PUCCH format 2/2a/2b.

Otherwise, when PUCCH format 3 is set for the UE, and a simultaneousAckNackAndCQI-Format3-r11 parameter provided from a higher layer is set to TRUE, and when a PUCCH resource is determined, and when the total number of bits corresponding to a HARQ-ACK, an SR (if any), and a CSI in a subframe does not exceed 22, or when the total number of bits corresponding to a spatially-bundled HARQ-ACK, an SR (if any), and a CSI in a subframe does not exceed 22, the periodic CSI report may be multiplexed with the HARQ-ACK on a PUCCH using a PUCCH format 3 resource determined for the transmission of the HARQ-ACK.

Otherwise, the CSI may be dropped.

In association with a UE for which more than one serving cell is configured in a system in which a PCell is set to the frame structure type 2 (that is, TDD) in TDD or FDD-TDD, when a periodic CSI report and a HARQ-ACK collide in the same subframe in which a PUSCH is not transmitted, and when a simultaneousAckNackAndCQI parameter provided from a higher layer is set to TRUE or when a simultaneousAckNackAndCQI-Format3-r11 parameter provided from a higher layer is set to TRUE, the periodic CSI report may be multiplexed with the HARQ-ACK or may be dropped according to a condition. Otherwise, the CSI may be dropped.

In the case in which a periodic CSI report and a HARQ-ACK collide in the same subframe in which a PUSCH is transmitted, when the simultaneous transmission of a PUCCH and a PUSCH is not set by a higher layer with respect to a UE, the periodic CSI report may be multiplexed with the HARQ-ACK in the corresponding subframe. Otherwise, when the simultaneous transmission of the PUCCH and the PUSCH is set by the higher layer with respect to the UE, the HARQ-ACK may be transmitted on the PUCCH and the periodic CSI may be transmitted on the PUSCH.

Hereinafter, when PUCCH format 4 is set for a UE according to an exemplary embodiment of the present invention, the simultaneous transmission of a HARQ-ACK and a periodic CSI report will be described.

The 3GPP LTE release-12 system defines the simultaneous transmission of a HARQ-ACK and "a single periodic CSI report". However, when the eCA is configured for a UE (or when more than 5 serving cells are configured for a UE), the transmission of a plurality of periodic CSI reports need to be supported.

A single periodic CSI report may be set by a parameter (e.g., a reporting period, an offset, a reporting mode, a reporting type, and the like) provided by an eNB. More than one periodic CSI report may be set by an additional signaling or parameter in addition to the parameter for the one periodic CSI report, or may be implicitly set by another signaling or another parameter.

The present disclosure will describe a scheme of dynamically determining (or dynamically switching) a PUCCH format to be used for the transmission of uplink control information when a new PUCCH format (e.g., PUCCH format 4) is set for a UE and a HARQ-ACK and one or a plurality of periodic CSIs collide in the same subframe (including the case in which a HARQ-ACK and a plurality of CSIs collide). Hereinafter, when PUCCH format 4 is set for a UE according to an exemplary embodiment of the present invention, dynamic PUCCH format switching for a HARQ-ACK transmission is described as the above. When a new PUCCH format (e.g., PUCCH format 4) is set for a UE, an exemplary embodiment of the present invention describes a scheme of dynamically determining (dynamically switching) a PUCCH format to be used for the transmission of uplink control information based on the number of DL transmissions that require a HARQ-ACK on one or more subframes in a plurality of serving cells (e.g., the maximum number of DL transmissions that may be scheduled for a UE or the number of DL transmissions that are actually scheduled for a UE) or based on which serving cell sub-group a DL transmission that requires a HARQ-ACK exists.

The PUCCH format 4 may be set for the UE, so as to transmit a HARQ-ACK when more than C serving cells (e.g., C=5) are configured for the UE (or when the eCA is configured for the UE). However, the case of setting PUCCH format 4 may not be limited thereto. In the case in which the TDD UL-DL configuration index 5 is applied to a PUCCH transmission serving cell, or the downlink reference UL-DL configuration index 5 is applied in TDD CA or FDD-TDD CA, PUCCH format 4 may be set for the UE for the transmission of a HARQ-ACK when more than C=2 serving cells are configured for the UE.

Setting PUCCH format 4 for the UE may be indicated by, for example, a parameter named PUCCH-Format of an information element (IE), PUCCH-Config, from among the IEs for a higher layer signaling (e.g., an RRC signaling). Alternatively, PUCCH format 4 may be implicitly set through another parameter or settings. For example, when resources for PUCCH format 4 can be induced from the UE, it indicates that PUCCH format 4 is set.

Configuring eCA with respect to the UE and setting PUCCH format 4 with respect to the UE may not be associated with each other. That is, when the eCA is configured, PUCCH format 4 may be set. Although the eCA is not configured, PUCCH format 4 may be set. In this instance, whether to set PUCCH format 4 may be appropriately determined by an eNB by taking into consideration the number of serving cells configured for the UE, the frame structure type of a serving cell in which a PUCCH is transmitted (that is, type 1 of FDD or type 2 of TDD), and the like. Alternatively, in the case in which setting PUCCH format 4 and configuring eCA with respect to the UE are associated with each other, when eCA is configured for the UE, PUCCH format 4 may be set for the UE.

When eCA is configured for the UE, this may indicate that a parameter (or a higher layer signaling including the parameter) associated with a new operation that is not supported in the CA configuration is provided to the UE. For example, when eCA is configured for the UE, this may indicate that more than C serving cells ((e.g., C=5 or 2) or (in the case of TDD UL-DL configuration 5 or DL reference UL-DL configuration 5, C=2. In the case of FDD-TDD, when the number of serving cells, of which the number of HARQ-ACK bits does not exceed 21 bits, is X, C=X. For the rest cases, C=5)) is configured for the UE. Also, when eCA is configured for the UE, this may indicate that a higher layer parameter associated with an eCA operation is set. For example, the higher layer parameter associated with the eCA operation may include a parameter indicating whether to allow the transmission of a PUCCH through an SCell. Alternatively, a setting associated with eCA and a setting associated with whether to allow the transmission of a PUCCH through an SCell may be defined by different settings.

A PUCCH transmission in a PCell is mandatory to the UE, and a PUCCH transmission in an SCell is allowed for a UE by an eNB. An SCell in which a PUCCH transmission is set may be referred to as P-SCell. A PCell and a P-SCell are generally referred to as a PUCCH serving cell. With respect to a PUCCH on the PCell or a PUCCH on the P-SCell, a serving cell(s) associated with a corresponding PUCCH may exist. For example, in a relationship in which a HARQ-ACK with respect to a PDSCH in a second serving cell is transmitted through a PUCCH of a first serving cell (that is, when a PDSCH transmission serving cell and a PUCCH transmission serving cell are different from each other), the second serving cell is associated with the PUCCH of the first serving cell. The serving cell associated with the PUCCH on the first serving cell may include the first serving cell itself (that is, the case in which the HARQ-ACK with respect to the PDSCH in the first serving cell is transmitted through the PUCCH of the first serving cell). A serving cell(s) that is associated with a PUCCH on a PCell may exist, a serving cell(s) that is associated with a PUCCH on a P-SCell may exist, and the serving cell(s) associated with a PUCCH on a single serving cell may be referred to as a 'serving cell group' or PUCCH serving cell group. That is, a single serving cell group may include a single PUCCH serving cell (e.g., a PCell, or a P-SCell in which a PUCCH transmission is set), or may include a single PUCCH serving cell and one or more non-PUCCH serving cells (e.g., one or more SCells in which a PUCCH transmission is not set). When a PUCCH transmission is allowed for the UE in one or more P-SCells, this may be understood that at least two serving cell groups including a serving cell group associated with a PUCCH on a PCell may exist. For ease of description, it is assumed that various embodiments of the present invention are applied based on a single serving cell group unit (or to each serving cell group). However, even when a serving cell group is not clearly distinguished in association with a UE for which a plurality of PUCCH serving cells are configured, it is not excluded that various examples are applied.

Hereinafter, before describing the embodiments of the present invention, parameters associated with the simultaneous transmission of a HARQ and a periodic CSI report will be defined.

simultaneousAckNackAndCQI: a parameter that allows multiplexing a HARQ-ACK bit (1 bit or 2 bits) for a single PDSCH transmission and a single periodic CSI report in a single subframe by using PUCCH format 2/2a/2b. The parameter is defined in 3GPP LTE release-8, and may be re-used for a new operation according to an exemplary embodiment of the present invention. When a plurality of serving cell groups are defined, an exemplary embodiment of the present invention assumes that a simultaneousAckNackAndCQI parameter is separately applied to each serving cell group, or the single simultaneousAckNackAndCQI parameter is commonly applied to a plurality of serving cell groups.

simultaneousAckNackAndCQI-Format3-r11: a parameter that allows multiplexing a HARQ-ACK bit with respect to a plurality of subframes and/or a plurality of serving cells (the case in which PUCCH format 2/2a/2b is not applicable since the number of bits exceed 2 bits) and a single periodic CSI report in a single subframe by using PUCCH format 3. The parameter is defined in 3GPP LTE release-11, and may be re-used for a new operation according to an exemplary embodiment of the present invention. When a plurality of serving cell groups are defined, an exemplary embodiment of the present invention assumes that a simultaneousAckNackAndCQI-Format3-r11 parameter is separately applied to each serving cell group, or the single simultaneousAckNackAndCQI-Format3-r11 parameter is commonly applied to a plurality of serving cell groups.

simultaneousAckNackAndCQI-Format4-r13: a parameter that allows multiplexing a HARQ-ACK bit with respect to a plurality of subframes and/or plurality of serving cells (the case in which even PUCCH format 3 is not applicable since the number of bits exceed 2 bits) and one or a plurality of periodic CSI reports in a single subframe by using PUCCH format 4. The parameter is a parameter newly defined in an exemplary embodiment of the present invention. When a plurality of serving cell groups are defined, an exemplary embodiment of the present invention assumes that a simultaneousAckNackAndCQI-Format4-r13 parameter is separately applied to each serving cell group, or the single simultaneousAckNackAndCQI-Format4-r13 parameter is commonly applied to a plurality of serving cell groups.

Table 5 provided below shows some of the IE named CQI-ReportConfig out of the IEs used for a higher layer signaling (e.g., RRC signaling) in 3GPP LTE release-11 or 12. CQI-ReportConfig IE is used for specifying a CQI reporting setting, and may include a simultaneousAckNackAndCQI parameter and a simultaneousAckNackAndCQI-Format3-r11 parameter.

TABLE 5

```
...
CQI-ReportPeriodic ::=        CHOICE {
   release                                NULL,
   setup                                  SEQUENCE {
      cqi-PUCCH-ResourceIndex                INTEGER (0. .1185),
      cqi-Pmi-ConfigIndex                    INTEGER (0. .1023),
      cqi-FormatIndicatorPeriodic            CHOICE {
         widebandCQI                            NULL,
         subbandCQI                             SEQUENCE {
            k                                      INTEGER (1. .4)
         }
      },
      ri-ConfigIndex                         INTEGER (0. .1023)         OPTIONAL,    -- Need OR
      simultaneousAckNackAndCQI              BOOLEAN
   }
}
CQI-ReportPeriodic-r10 ::=    CHOICE {
   release                                NULL,
   setup                                  SEQUENCE {
      cqi-PUCCH-ResourceIndex-r10            INTEGER (0. .1184),
      cqi-PUCCH-ResourceIndexP1-r10          INTEGER (0. .1184)         OPTIONAL,    -- Need OR
      cqi-pmi-ConfigIndex                    INTEGER(0..1023),
      cqi-FormatIndicatorPeriodic-r10        CHOICE {
         widebandCQI-r10                        SEQUENCE {
            csi-ReportMode-r10                     ENUMERATED{submode1,submode2}   OPTIONAL -- Need OR
         },
         subbandCQI-r10                         SEQUENCE {
            k                                      INTEGER(1. .4),
            periodicityFactor-r10                  ENUMERATED {n2, n4}
         }
      },
      ri-ConfigIndex                         INTEGER (0. .1023)         OPTIONAL,    -- Need OR
      simultaneousAckNackAndCQI              BOOLEAN,
      cqi-Mask-r9                            ENUMERATED (setup)         OPTIONAL,    -- Need OR
      csi-ConfigIndex-r10                    CHOICE {
         release                                NULL,
         setup                                  SEQUENCE {
            cqi-pmi-ConfigIndex2-r10               INTEGER (0. .1023),
            ri-ConfigIndex2-r10                    INTEGER (0. .1023)      OPTIONAL     -- Need OR
         }
      }    OPTIONAL                                                                   -- Need ON
   }
}
CQI-ReportPeriodic-v1130 ::= SEQUENCE {
   simultaneousAckNackAndCQI-Format3-r11     ENUMERATED (setup)         OPTIONAL,    -- Need OR
   cqi-ReportPeriodicProcExtToReleaseList-r11   CQI-ReportPeriodicProcExtToReleaeeList-r11
   OPTIONAL, -- Need ON
   cqi-ReportPeriodicProcExtToAddModList-r11    CQI-ReportPeriodicProcExtToAddModList-r11
   OPTIONAL -- Need ON
}
CQI-ReportPeriodicProcExtToAddModList-r11 ::=    SEQUENCE (SIZE (1. .maxCQI -ProcExt-r11))   OF
CQI-RePortPeriodicProcExt-r11
CQI-ReportPeriodicProcExtToReleaseList-r11 ::=   SEQUENCE (SIZE (1. .maxCQI-ProcExt-r11))    OF
CQI-ReportPeriodicProcExtId-r11
CQI-ReportPeriodicProcExt-r11 ::=         SEQUENCE {
   cqi-ReportPeriodicProcExtId-r11           CQI-ReportPeriodicProcExtId-11,
   cqi-pmi-ConfigIndex-r11                   INTEGER (0. .1023),
```

TABLE 5-continued

| | | | |
|---|---|---|---|
| cqi-FormatIndicatorPeriodic-r11 | CHOICE { | | |
|   widebandCQI-r11 |   SEQUENCE { | | |
|     csi-ReportMode-r11 |     ENUMERATED {submode1, submode2} | OPTIONAL | -- Need OR |
|   }, | | | |
|   subbandCQI-r11 |   SEQUENCE { | | |
|     k |     INTEGER (1..4), | | |
|     periodicityFactor-r11 |     ENUMERATED {n2, n4} | | |
|   } | | | |
| }, | | | |
| ri-ConfigIndex-r11 | INTEGER (0..1023) | OPTIONAL, | -- Need OR |
| csi-ConfigIndex-r11 | CHOICE { | | |
|   release |   NULL, | | |
|   setup |   SEQUENCE { | | |
|     cqi-pmi-ConfigIndex2-r11 |     INTEGER (0..1023), | | |
|     ri-ConfigIndex2-r11 |     INTEGER (0..1023) | OPTIONAL | -- Need OR |
|   } | | | |
| } | | OPTIONAL, | -- Need ON |
| ... | | | |
| } | | | |

In Table 5, the simultaneousAckNackAndCQI parameter has a BOOLEAN value. When the value is TRUE, it indicates that the simultaneous transmission of a HARQ-ACK and a CQI is allowed. The single value of the parameter may be applied to at least one or the entirety of a CSI process (in a single serving cell group). This field may not be applied and may be disregarded in the case of a serving cell in which a PUCCH transmission is not set.

In table 5, the simultaneousAckNackAndCQI-Format3-r11 parameter indicates that it is allowed for a UE to multiplex a HARQ-ACK and a periodic CQI report in PUCCH format 3, and to simultaneously transmit them. When a PUCCH-format parameter for the UE is set to PUCCH format 3, or PUCCH format 4, simultaneousAckNackAndCQI-Format3-r11 may be set to a predetermined value. The single value of the parameter may be applied to at least one or the entirety of a CSI process (in a single serving cell group). This field may not be applied and may be disregarded in the case of a serving cell in which a PUCCH transmission is not set.

The description of other parameters in Table 4 may be understood with reference to the 3GPP TS 36.331 document.

Hereinafter, in the case in which PUCCH format 4 is set for a UE, when a HARQ-ACK (or HARQ-ACK and SR when SR needs to be transmitted) and one or a plurality of periodic CSIs collide in the same subframe, embodiments of the present invention will be described, which dynamically determine (or switch) a PUCCH format to be used for the transmission of UCI (transmission of one or more out of a HARQ-ACK; a HARQ-ACK and an SR; a single periodic CSI report; and a plurality of periodic CSI reports).

Dynamically determining a PUCCH format indicates appropriately determining a PUCCH format to be actually used at a UCI transmission timing based on a predetermined standard or parameter, out of PUCCH format 2/2a/2b, PUCCH format 3, and PUCCH format 4, although a PUCCH format that is semi-statically set by a higher layer is PUCCH format 4.

The dynamical PUCCH format determination may be based on at least one of: the frame structure of a PUCCH serving cell (e.g., the case when a PUCCH serving cell is the frame structure 1 in FDD, TDD, FDD-TDD or the case when a PUCCH serving cell is the frame structure 2 in FDD-TDD); the number of serving cell configured for a UE, a parameter associated with whether to perform the simultaneous transmission of a HARQ-ACK and a CSI (e.g., simultaneousAckNackAndCQI, simultaneousAckNackAndCQI-Format3-r11, or simultaneousAckNackAndCQI-Format4-r13); and the size of a payload of a UCI to be transmitted.

Figure 7:
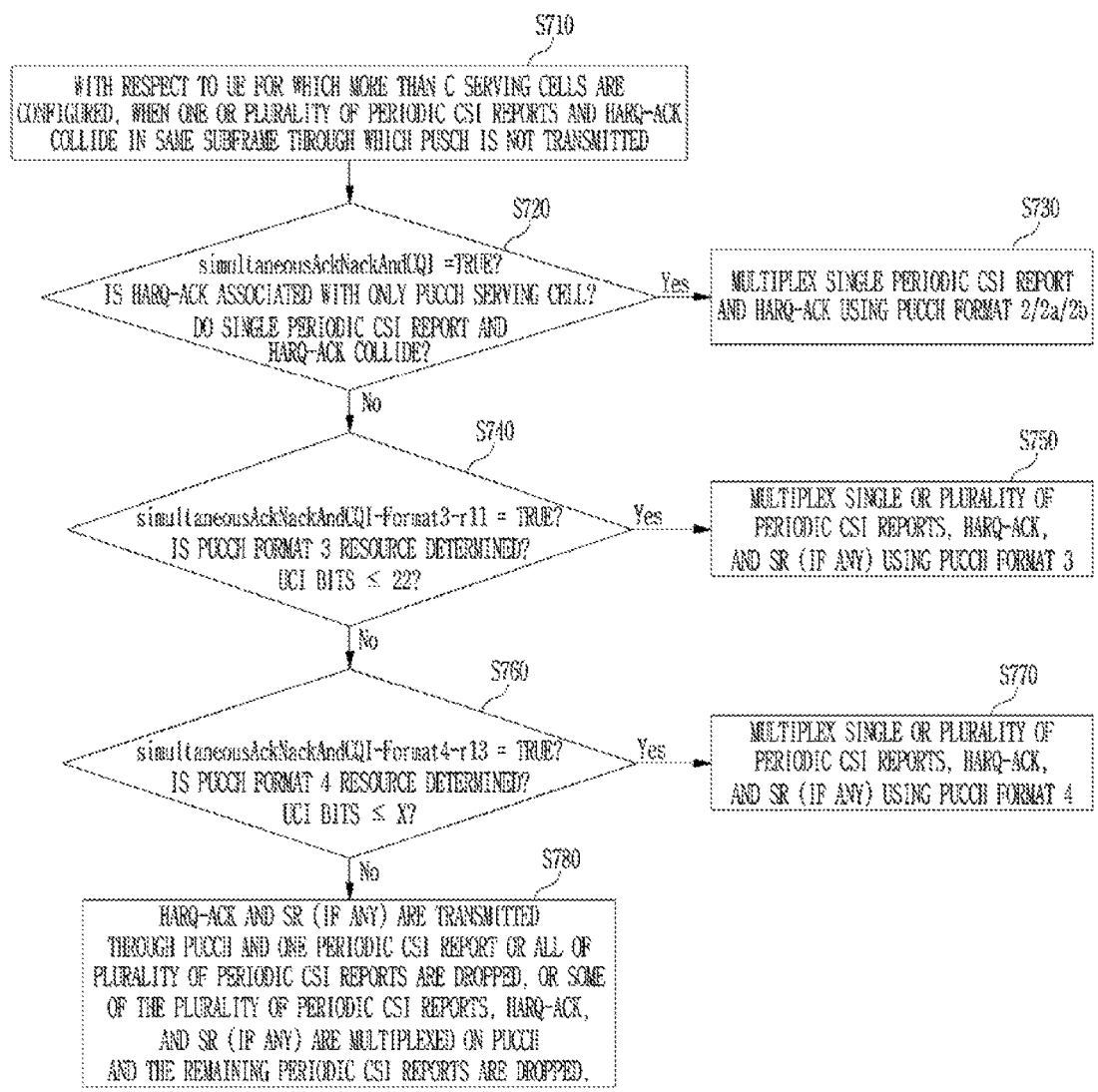
FIG. 7 is a diagram illustrating a dynamic PUCCH format determining scheme according to an exemplary embodiment of the present invention.

FIG. 7 is a diagram illustrating a dynamic PUCCH format determining scheme according to an exemplary embodiment of the present invention.

The example of FIG. 7 assumes operations performed when PUCCH format 4 is configured for a UE.

In operation S710, with respect to a UE for which C or more serving cells are configured, the dynamic PUCCH format determination is performed in the case in which a single or a plurality of periodic CSI reports and a HARQ-ACK collide in the same subframe (e.g., a first subframe) where a PUSCH is not transmitted. Here, when it implies that CA or eCA is configured, C may be 1 (C=1). When it implies that eCA is configured, C may be 5 (C=5). In a particular case of TDD, C may be 2 (C=2).

In operation S720, simultaneousAckNackAndCQI parameter provided from a higher layer is set to TRUE, and a single periodic CSI report collides with HARQ-ACK. When the HARQ-ACK corresponds to a single PDSCH transmission or a PDCCH/EPDCCH that indicates a downlink SPS release in only a PUCCH serving cell (e.g., a PCell or a P-SCell in which a PUCCH transmission is set), the operation proceeds with operation S730. Here, the case, in which the HARQ-ACK corresponds to a single PDSCH transmission or a PDCCH/EPDCCH that indicates a downlink SPS release in only the PUCCH serving cell, may be the case in which the size of the control information bit of the HARQ-ACK to be transmitted is 1 bit or 2 bits.

In operation S730, a single periodic CSI report may be multiplexed with the HARQ-ACK on a PUCCH using PUCCH format 2/2a/2b, and may be transmitted in a single subframe (e.g., a first subframe) on a PUCCH serving cell. Here, the resources for a PUCCH format 2/2a/2b transmission may be configured for the UE through a cqi-PUCCH-ResourceIndex parameter provided from a higher layer.

When any one of the conditions of operation S720 is not satisfied, the operation may proceed with operation S740.

In operation S740, it is determined whether a simultaneousAckNackAndCQI-Format3-r11 parameter provided from a higher layer is set to TRUE, and whether a PUCCH format 3 resource is determined. Here, when the PUCCH format 3 resource is determined, this indicates that the set of PUCCH format 3 available resources is set by a higher layer signaling, and one resource to be used for a HARQ-ACK transmission out of the set is determined (for example, the one resource to be used for the HARQ-ACK transmission is determined according to a value of Transmission Power Control (TPC) field of PDCCH DCI). When the total number of bits corresponding to a HARQ-ACK, an SR (if any), and one or a plurality of CSIs does not exceed 22, or when the total number of bits corresponding to a spatially bundled HARQ-ACK, an SR (if any), and one or more CSIs does not exceed 22, the operation may proceed with operation S750.

In operation S750, one or a plurality of periodic CSI reports may be multiplexed with a HARQ-ACK and an SR (if any) on a PUCCH using the determined PUCCH format 3 resource, and may be transmitted in a single subframe (e.g., a first subframe) on the PUCCH serving cell. Here, according to an exemplary embodiment of the present invention, it should be noted that a plurality of CSI reports may be transmitted using PUCCH format 3.

When any one of the conditions of operation S740 is not satisfied, the operation may proceed with operation S760.

In operation S760, it is determined whether a simultaneousAckNackAndCQI-Format4-r13 parameter provided from a higher layer is set to TRUE, and whether PUCCH format 4 resource is determined. When the total number of bits corresponding to a HARQ-ACK, an SR (if any), and one or a plurality of CSIs does not exceed X, or when the total number of bits corresponding to a spatially bundled HARQ-ACK, an SR (if any), and one or a plurality of CSIs does not exceed X, the operation may proceed with operation S770. Here, X indicates the number of UCI bits supported by PUCCH format 4, and is always greater than 22 bits. For example, it may be defined that X=64 or 128. However, X is not limited to 64 or 128.

In operation S770, one or more periodic CSI reports may be multiplexed with a HARQ-ACK and an SR (if any) on a PUCCH using the determined PUCCH format 4 resource, and may be transmitted in a single subframe (e.g., a first subframe) on the PUCCH serving cell.

When any one of the conditions of operation S760 is not satisfied, the operation may proceed with operation S780.

In operation S780, one CSI or some or all of a plurality of periodic CSIs that collide with the HARQ-ACK in the same subframe (e.g., a first subframe) may be dropped.

For example, the one CSI or all of the plurality of periodic CSI reports may be dropped. Accordingly, the HARQ-ACK and SR (if any) may be transmitted through a PUCCH using a PUCCH format determined for the HARQ-ACK transmission.

Alternatively, some of the plurality of periodic CSI reports may be dropped, and the remaining one or more periodic CSI reports (that it, periodic CSI reports that are not dropped) may be multiplexed with the HARQ-ACK and SR (if any) using a PUCCH format determined for the HARQ-ACK transmission, and may be transmitted on a PUCCH.

Here, some periodic CSI reports may be dropped such that the total number of bits corresponding to the HARQ-ACK, SR (if any), and one or more periodic CSI reports that are not dropped does not exceed X bits. In this instance, one or more periodic CSI reports that are not dropped may be multiplexed with the HARQ-ACK and SR (if any) on a PUCCH using the determined PUCCH format 4 resource, and may be transmitted in a single subframe (e.g., a first subframe) on the PUCCH serving cell.

Alternatively, some periodic CSI reports may be dropped to make the total number of bits corresponding to the HARQ-ACK, SR (if any), and one or more periodic CSI reports that are not dropped, to be less than or equal to 22. In this instance, one or more periodic CSI reports that are not dropped may be multiplexed with the HARQ-ACK and SR (if any) on a PUCCH using the determined PUCCH format 3 resource, and may be transmitted in a single subframe (e.g., a first subframe) on the PUCCH serving cell.

In association with some (one or more) periodic CSI reports which are dropped from the plurality of periodic CSI reports, periodic CSI reports may be prioritized based on at least one of: a PUCCH report type, a CSI process ID, a CSI subframe index, a serving cell index, and a serving cell group (e.g., whether it is a serving cell group including a PCell or a serving cell group including a P-SCell), and a periodic CSI report which has lower priority may be dropped. Accordingly, one or more periodic CSI reports that have higher priorities may be transmitted, in a single reporting instance.

For example, when the plurality of periodic CSI reports have an identical PUCCH report type and an identical CSI process ID, the periodic CSI reports may be prioritized based on an order of the lowest serving cell index, and one or more periodic CSI reports that have low priorities may be dropped. When three or more periodic CSI reports collide with a HARQ-ACK in the same subframe (e.g., a first subframe), a single periodic CSI report may be dropped and two periodic CSI reports may be multiplexed with the HARQ-ACK. The periodic CSI reports which correspond to the lowest serving cell index and the second lowest serving cell index may be determined to be the two periodic CSI reports that have higher priorities (that is, the two periodic CSI reports to be multiplexed with the HARQ-ACK).

Figure 8:
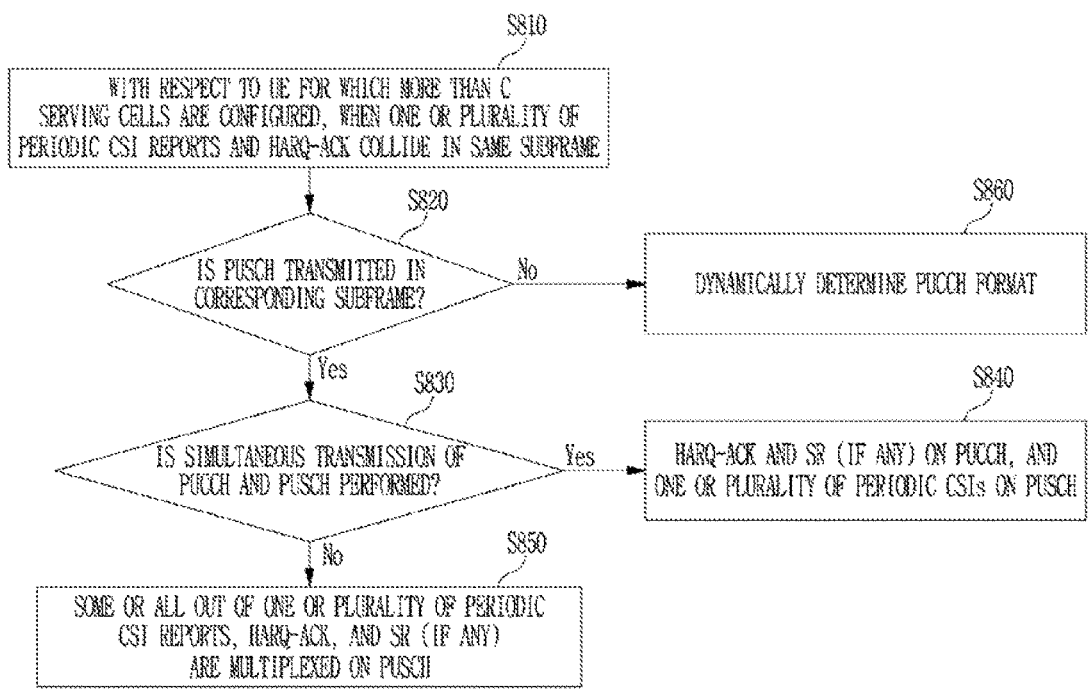
FIG. 8 is a diagram illustrating a dynamic PUCCH format determining scheme according to another exemplary embodiment of the present invention.

FIG. 8 is a diagram illustrating a dynamic PUCCH format determining scheme according to an exemplary embodiment of the present invention.

The example of FIG. 8 assumes operations performed when PUCCH format 4 is set for a UE.

In operation S810, with respect to a UE for which more than C serving cells are configured, a PUCCH format is dynamically determined when a single or a plurality of periodic CSI reports collide with a HARQ-ACK in the same subframe. Here, when it is indicated that CA or eCA is configured, it may be determined that C=1. When it is indicated that eCA is configured, it may be determined that C=5, and in a particular case in TDD, it may be determined that C=2.

In operation S820, it is determined whether a PUSCH transmission exists in the corresponding subframe where one or a plurality of periodic CSI reports and the HARQ-ACK collide. To determine whether a PUSCH is transmitted or not, a PDCCH/EPDCCH uplink grant may be determined based on scheduling information included in DCI.

When a PUSCH transmission exists in the corresponding subframe (e.g., a second subframe) in operation 820, the method proceeds with operation S830.

In operation S830, it is determined whether the simultaneous transmission of a PUCCH and a PUSCH is indicated by a parameter (e.g., a simultaneousPUCCH-PUSCH-r10 parameter included in a PUCCH-Config IE that is provided through an RRC signaling) associated with the simultaneous transmission of a PUCCH and a PUSCH, which is provided from a higher layer to the UE.

When the simultaneous transmission of a PUCCH and a PUSCH is allowed, the method proceeds with operation S840, so that a HARQ-ACK and an SR (if any) are transmitted through a PUCCH and one or a plurality of periodic CSIs are transmitted through a PUSCH in the single subframe (e.g., the second subframe). Alternatively, one CSI report or some or all of the plurality of periodic CSI reports may be dropped based on at least one out of: the number of PRBs allocated for the transmission of a PUSCH, and an MCS, and only the remaining periodic CSI reports (that is, CSI reports that are not dropped) may be transmitted through the PUSCH, and a HARQ-ACK and an SR (if any) are transmitted through the PUCCH. Here, the condition for determining dropping has been described. That is, the periodic CSI reports are prioritized based on at least one out of: a PUCCH reporting type, a CSI process ID, a CSI subframe index, a serving cell index, and a serving cell group (e.g., a serving cell group including a PCell or a serving cell group including a P-SCell), and one that has lower priority may be dropped.

When the simultaneous transmission of a PUCCH and a PUSCH is not allowed, the method proceeds with operation S850, and one CSI report or some or all of a plurality of periodic CSI reports, a HARQ-ACK, and an SR (if any) may be multiplexed on a PUSCH, and may be transmitted. Alternatively, one CSI report or some or all of the plurality of periodic CSI reports may be dropped based on at least one out of: the number of PRBs allocated for the transmission of a PUSCH, and an MCS, and only the remaining periodic CSI reports (that is, CSI reports that are not dropped) may be transmitted through the PUSCH.

For example, one CSI report or all of the plurality of periodic CSI reports may be multiplexed with the HARQ-ACK on the PUSCH and may be transmitted. This indicates that one CSI report or all of the plurality of periodic CSI reports, the HARQ-ACK, and the SR (if any) may be multiplexed on the PUSCH and may be transmitted, (always or) irrespective of the total number of bits of one or the plurality of periodic CSI reports, the HARQ-ACK, and the SR (if any). In this instance, PUSCH scheduling (e.g., adjusting a code rate of uplink data and the like) may be performed by an eNB by taking into consideration the number of bits of UCI transmitted through the PUSCH.

Alternatively, when the total number of bits corresponding to the HARQ-ACK, the SR (if any), and one or the plurality of CSIs does not exceed the maximum number of bits supported by PUCCH format 4 (that is, X (e.g., X=64 or 128)), or when the total number of bits corresponding to a spatially-bundled HARQ-ACK, the SR (if any), and one or the plurality of CSIs does not exceed X, the HARQ-ACK, the SR (if any), and one or all of the plurality of CSI reports may be multiplexed on the PUSCH and may be transmitted. When the total number of bits corresponding to the HARQ-ACK, the SR (if any), and one or the plurality of CSIs exceeds X (e.g., X=64 or 128), some periodic CSI reports may be dropped so that the total number of bits corresponding to the HARQ-ACK, the SR (if any), and one or more periodic CSI reports that are not dropped may be less than or equal to X bits. In this instance, the one or more periodic CSI reports that are not dropped may be multiplexed with the HARQ-ACK and the SR (if any) on the PUSCH, and may be transmitted. As described above, by setting the total number of bits of a UCI transmitted through a PUCCH to be equal to the maximum number of bits of a UCI transmitted through a PUSCH, the operations associated with a UCI transmission may readily implemented with low complexity.

Alternatively, only when the number (K) of periodic CSI reports is less than or equal to a predetermined reference value, the HARQ-ACK, the SR (if any), and K periodic CSI reports may be multiplexed and may be transmitted on the PUSCH. The predetermined reference value may be determined in advance and may be shared between a UE and an eNB, or may be set by the eNB. K may be, for example, 5. When more than K periodic CSI reports are multiplexed on the PUSCH and transmitted, the amount of resource used by the HARQ-ACK and the periodic CSI reports on the PUSCH increases, and thus, the amount of resources for uplink data that is to be originally transmitted on the PUSCH decreases, instead. Accordingly, the code rate of uplink data increases (when the code rate increases, reliability may decrease). Therefore, an exemplary embodiment of the present invention limits the number of periodic CSI reports that may be multiplexed on a PUSCH, so as to prevent the code rate of uplink data from being increased. Accordingly, an exemplary embodiment of the present invention may multiplex one or a plurality of periodic CSI reports and a HARQ-ACK on a PUSCH, and may transmit the same, while maintaining the performance of decoding data. Also, an exemplary embodiment of the present invention may determine whether to transmit a UCI on a PUSCH, or may determine at least how many periodic CSI reports need to be included in a UCI which is to be transmitted on a PUSCH, based on one or more out of the number of periodic CSI reports, the number of PRBs allocated for a PUSCH transmission, and an MCS.

When a PUSCH transmission does not exist in the corresponding subframe (e.g., a first subframe) in operation S820, the method proceeds with operation S850, and dynamically determines a PUCCH format.

The dynamic PUCCH format determination in operation S850 may correspond to the operations performed from operation S710 of FIG. 7.

Alternatively, the dynamic PUCCH format determination in operation S850 may correspond to a dynamic switching operation that selectively branches out into one of operation S720, operation S740, and operation S760 of FIG. 7.

For example, the branching may be determined based on the combination of set values of parameters (simultaneousAckNackAndCQI, simultaneousAckNackAndCQI-Format3-r11, or simultaneousAckNackAndCQI-Format4-r13) associated with the simultaneous transmission of a HARQ-ACK and a CSI Table 5 provided below shows the branching or dynamic switching.

TABLE 6

| simultaneousAckNackAndCQI | TRUE | TRUE | TRUE | TRUE |
|---|---|---|---|---|
| simultaneousAckNackAndCQI-Format3-r11 | FALSE | TRUE | FALSE | TRUE |
| simultaneousAckNackAndCQI-Format4-r13 | FALSE | FALSE | TRUE | TRUE |
| branch | S720 | S740 | S760 | S760 |
| simultaneousAckNackAndCQI | FALSE | FALSE | FALSE | FALSE |
| simultaneousAckNackAndCQI-Format3-r11 | FALSE | TRUE | FALSE | TRUE |
| simultaneousAckNackAndCQI-Format4-r13 | FALSE | FALSE | TRUE | TRUE |
| branch | S780 | S740 | S760 | S760 |

As illustrated in Table 6, when the simultaneousAckNackAndCQI-Format4-r13 parameter is set to TRUE, the operation may branch out into operation S760, irrespective of the value of the simultaneousAckNackAndCQI parameter or the simultaneousAckNackAndCQI-Format3-r11 parameter. In the case in which the simultaneousAckNackAndCQI-Format4-r13 parameter is set to FALSE, when the simultaneousAckNackAndCQI-Format3-r11 parameter value is TRUE, the operation may branch out into operation S740, irrespective of the value of the simultaneousAckNackAndCQI parameter. When the simultaneousAckNackAndCQI-Format4-r13 parameter is set to FALSE and the simultaneousAckNackAndCQI-Format3-r11 parameter is set to FALSE, in the case in which the simultaneousAckNackAndCQI parameter is set to TRUE, the operation may branch out into operation S720. When all of the simultaneousAckNack- AndCQI, simultaneousAckNackAndCQI-Format3-r11, and simultaneousAckNackAndCQI-Format4-r13 parameters are set to FALSE, the operation may branch out into operation S780.

When the operation branches out into operation S720 (that is, simultaneousAckNackAndCQI-Format3-r11 and simultaneousAckNackAndCQI-Format4-r13 are set to FALSE, and simultaneousAckNackAndCQI is set to TRUE), in the case in which an additional condition of operation S720 (that is, the condition of the size of a UCI payload) is not satisfied, the operation may immediately branch out into operation S780.

When the operation branches out into operation S740 (that is, simultaneousAckNackAndCQI-Format3-r11 is set to TRUE, simultaneousAckNackAndCQI-Format4-r13 is set to FALSE), in the case in which an additional condition of operation S740 (that is, the condition of the size of a UCI payload) is not satisfied, the operation may immediately branch out into operation S780.

As described above, the dynamic PUCCH format determination according to an exemplary embodiment of the present invention may be performed according to a sequential scheme as described in FIG. 7, and may be performed based on a scheme that determines a predetermined PUCCH format based on the combination of predetermined conditions as described in FIG. 8.

The dynamic PUCCH format determination in FDD according to an exemplary embodiment of the present invention will be described as follows.

The example provided below assumes operations performed when PUCCH format 4 is set for a UE.

With respect to a UE for which more than C (e.g., C=1 or 5 or 2) serving cells are configured in a system in which a PUCCH serving cell (e.g., a PCell or a P-SCell in which a PUCCH transmission is set) is set to the frame structure type 1 (that is, FDD) in FDD or FDD-TDD, in the case in which one or a plurality of periodic CSI reports and a HARQ-ACK collide in the same subframe in which a PUSCH is not transmitted, when a simultaneousAckNackAndCQI parameter provided from a higher layer is set to TRUE, and the HARQ-ACK corresponds to a PDCCH/EPDCCH indicating a downlink SPS release in only the PUCCH serving cell or corresponds to a single PDSCH transmission, the one periodic CSI report may be multiplexed with the HARQ-ACK on the PUCCH using PUCCH format 2/2a/2b.

Otherwise, when a simultaneousAckNackAndCQI-Format3-r11 parameter provided from a higher layer is set to TRUE, and when a PUCCH format 3 resource is determined for the UE, and when the total number of bits corresponding to the HARQ-ACK, an SR (if any), and one or the plurality of CSI reports in the corresponding subframe does not exceed 22, or when the total number of bits corresponding to a spatially bundled HARQ-ACK, the SR (if any), and the one or the plurality of periodic CSI reports in the corresponding subframe does not exceed 22, the one or the plurality of periodic CSI reports may be multiplexed with the HARQ-ACK on the PUCCH using the determined PUCCH format 3 resource.

Otherwise, when a simultaneousAckNackAndCQI-Format4-r13 parameter provided from a higher layer is set to TRUE, and when a PUCCH format 4 resource is determined for the UE, and when the total number of bits corresponding to the HARQ-ACK, the SR (if any), and the one or the plurality of CSI reports in the corresponding subframe does not exceed X (e.g., X=64 or 12), or when the total number of bits corresponding to a spatially bundled HARQ-ACK, the SR (if any), and the one or the plurality of periodic CSI reports in the corresponding subframe does not exceed X (e.g., X=64 or 128), the one or the plurality of periodic CSI reports may be multiplexed with the HARQ-ACK on the PUCCH using the determined PUCCH format 4 resource.

Otherwise, the one CSI report or all of the plurality of periodic CSI reports may be dropped. The HARQ-ACK and the SR (if any), excluding the periodic CSI report that is dropped, may be transmitted based on the determined PUCCH format.

Alternatively, some of the plurality of periodic CSI reports may be dropped, and the remaining one or more periodic CSI reports, the HARQ-ACK, and the SR (if any) may be multiplexed.

Some periodic CSI reports may be dropped to enable the total number of bits corresponding to the HARQ-ACK, the SR (if any), and one or more periodic CSI reports that are not dropped, to be less than or equal to X bits (e.g., X=64 or 128), or some periodic CSI reports may be dropped to enable the total number of bits corresponding to the HARQ-ACK, the SR (if any), and one or more CSI reports that are not dropped, to be less than or equal to 22.

The dynamic PUCCH format determination in TDD according to an exemplary embodiment of the present invention will be described as follows.

The example provided below assumes operations performed when PUCCH format 4 is set for a UE.

With respect to a UE for which more than C (e.g., C=1 or 5 or 2) serving cells are configured in a system in which a PUCCH serving cell (e.g., a PCell or a P-SCell in which a PUCCH transmission is set) is set to the frame structure type 2 (that is, TDD) in TDD or FDD-TDD, in the case in which one or a plurality of periodic CSI reports and a HARQ-ACK collide in the same subframe (e.g., a subframe n) in which a PUSCH is not transmitted, when a simultaneousAckNackAndCQI parameter provided from a higher layer is set to TRUE, and a HARQ-ACK corresponding to a PDCCH/EPDCCH indicating a downlink SPS release in only a PUCCH serving cell or corresponding to a PDSCH transmission (that is, the case in which the value of a downlink assignment index (DAI) in a PDCCH/EPDCCH DCI in the PCell is 1) in a subframe n-$k_m$, or a HARQ-ACK corresponding to a single PDSCH transmission (that is, SPS PDSCH transmission) without a PDCCH/EPDCCH indication in the PCell in the subframe n-$k_m$, collides with a single periodic CSI report in a subframe n, the single periodic CSI report may be multiplexed with the HARQ-ACK on a PUCCH using PUCCH format 2/2a/2b.

Otherwise, when a simultaneousAckNackAndCQI-Format3-r11 parameter provided from a higher layer is set to TRUE, and when a PUCCH format 3 resource is determined for the UE, and when the total number of bits corresponding to the HARQ-ACK, an SR (if any), and one or the plurality of CSI reports in the corresponding subframe does not exceed 22, or when the total number of bits corresponding to a spatially-bundled HARQ-ACK, the SR (if any), and one or the plurality of periodic CSI reports in the corresponding subframe does not exceed 22, the one or the plurality of periodic CSI reports may be multiplexed with the HARQ-ACK on the PUCCH using the determined PUCCH format 3 resource.

Otherwise, when a simultaneousAckNackAndCQI-Format4-r13 parameter provided from a higher layer is set to TRUE, and when a PUCCH format 4 resource is determined for the UE, and when the total number of bits corresponding to the HARQ-ACK, the SR (if any), and the one or the plurality of CSI reports in the corresponding subframe does not exceed X (e.g., X=64 or 128), or when the total number of bits corresponding to a spatially bundled HARQ-ACK, the SR (if any), and the one or the plurality of periodic CSI reports in the corresponding subframe does not exceed X (e.g., X=64 or 128), the one or the plurality of periodic CSI reports may be multiplexed with the HARQ-ACK on the PUCCH using the determined PUCCH format 4 resource.

Otherwise, the one CSI report or all of the plurality of periodic CSI reports may be dropped. The HARQ-ACK and the SR (if any), excluding the periodic CSI report that is dropped, may be transmitted based on the determined PUCCH format.

Alternatively, some of the plurality of periodic CSI reports may be dropped, and the remaining one or more periodic CSI reports, the HARQ-ACK, and the SR (if any) may be multiplexed.

Some periodic CSI reports may be dropped to enable the total number of bits corresponding to the HARQ-ACK, the SR (if any), and one or more periodic CSI reports that are not dropped, to be less than or equal to X bits (e.g., X=64 or 128), or some periodic CSI reports may be dropped to enable the total number of bits corresponding to the HARQ-ACK, the SR (if any), and one or more CSI reports that are not dropped, to be less than or equal to 22.

According to one or more exemplary embodiments of the present invention as described above, a PUCCH format may be dynamically determined or switched based on the setting state of parameters associated with the simultaneous transmission of a HARQ-ACK and one or a plurality of periodic CSI reports, and the size of a payload of a UCI to be transmitted. Accordingly, although PUCCH format 4 is set for a UE, a PUCCH format that is appropriate for the size of the UCI to be actually transmitted may be selected. Therefore, a waste of resource may be prevented and the efficiency of utilizing resources throughout the system may increase.

Although the above described illustrative methods are expressed as a series of operations for ease of description, they may not limit the order of operations executed, and the operations may be executed in parallel or in a different order. Also, all of the operations described above may not be always required to implement the method of the present invention.

The above described embodiments may include examples of various aspects of the present invention. Although it is difficult to describe all the possible combinations showing the various aspects, it is apparent to those skilled in the art that other combinations are possible. Therefore, it should be construed that the present invention includes other substitutions, corrections, and modifications belonging to the scope of claims.

The scope of the present invention includes an apparatus (e.g., a wireless device and components thereof, which have been described with reference to FIG. 1) that processes or implements the operations according to various embodiments of the present invention.

Figure 9:
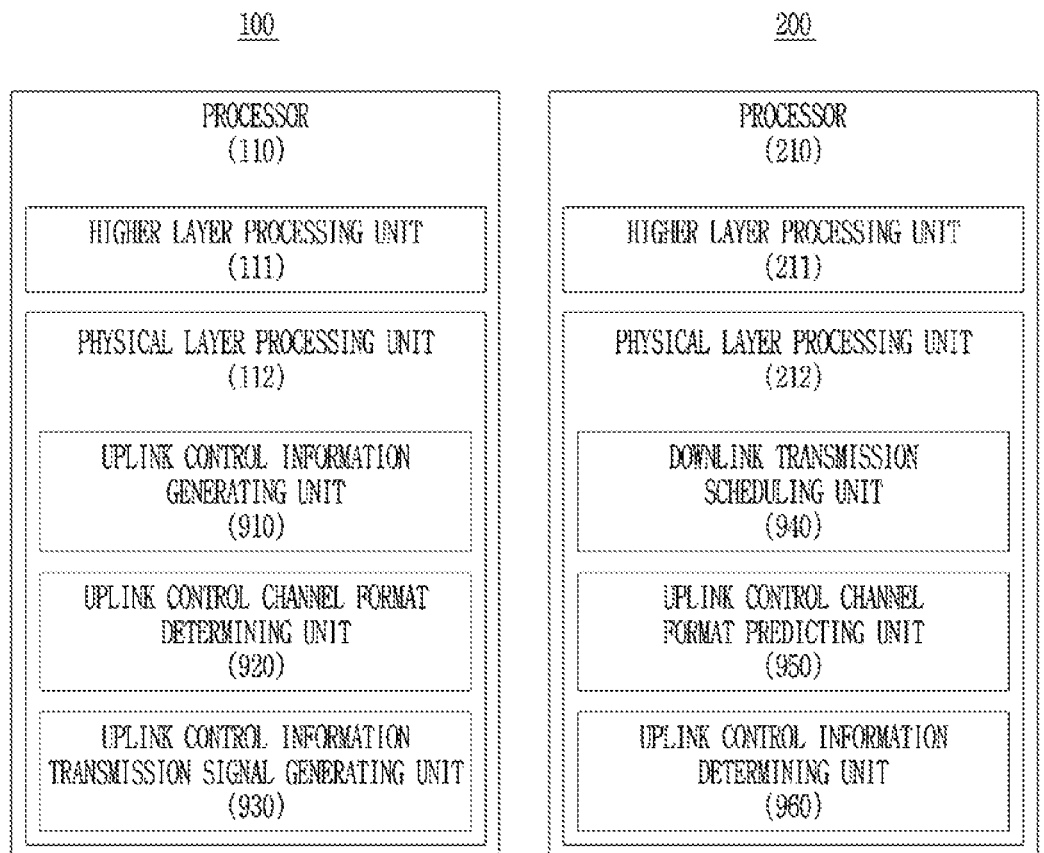
FIG. 9 is a diagram illustrating a configuration of a processor according to an exemplary embodiment of the present invention.

FIG. 9 is a diagram illustrating a configuration of a processor according to an exemplary embodiment of the present invention.

Dynamic PUCCH format switching that has been described in various embodiments of the present invention may be processed by the physical layer processing unit 112 of the processor 110 of the UE 100.

Referring to FIG. 9, the physical layer processing unit 112 may include an uplink control information generating unit 910, an uplink control channel format determining unit 920, and an uplink control information transmission signal generating unit 930.

The uplink control information generating unit 910 may generate HARQ-ACK information with respect to a downlink transmission that is received from the eNB 200. Also, the uplink control information generating unit 910 may generate channel state information (CSI) based on a reference signal or the like, which is received from the eNB 200.

The uplink control channel format determining unit 920 may dynamically determine an uplink control channel format to be used for the transmission of HARQ-ACK information. For example, the uplink control channel format determining unit 920 may include one or more out of: a frame structure determining unit, a serving cell counting unit, a PUCCH and PUSCH simultaneous transmission determining unit, a HARQ-ACK information and CSI simultaneous transmission determining unit, and an uplink control information (e.g., control information including a HARQ-ACK and CSI) bit size determining unit.

For example, the frame structure determining unit of the uplink control channel format determining unit 920 may determine the frame structure (e.g., TDD or FDD) of a PUCCH serving cell. The serving cell counting unit of the uplink control channel format determining unit 920 may determine whether the number of serving cells configured for the UE exceeds C. The PUCCH and PUSCH simultaneous transmission determining unit of the uplink control channel format determining unit 920 may determine whether the simultaneous transmission of a PUCCH and a PUSCH is set in a subframe through which uplink control information is to be transmitted. The HARQ-ACK information and CSI simultaneous transmission determining unit of the uplink control channel format determining unit 920 may determine whether a simultaneousAckNackAndCQI parameter, a simultaneousAckNackAndCQI-Format3-r11 parameter, or a simultaneousAckNackAndCQI-Format4-r13 parameter, which is set by a higher layer, is set to TRUE. The uplink control information bit size determining unit of the uplink control channel format determining unit 920 may determine whether the size of bits of uplink control information (UCI) including HARQ-ACK information and one or a plurality of periodic CSIs which are to be simultaneously transmitted, exceeds 22, or exceeds X (e.g., X=64 or 128). The uplink control channel format determining unit 920 may dynamically determine a PUCCH format to be used for the transmission of uplink control information, based on the result of determination/calculation of one or more out of: the frame structure determining unit, the serving cell counting unit, the PUCCH and PUSCH simultaneous transmission determining unit, the HARQ-ACK information and CSI simultaneous transmission determining unit, and the uplink control information bit size determining unit.

The uplink control information transmission signal generating unit 930 may generate an uplink control information transmission signal based on a PUCCH format determined by the uplink control channel format determining unit 920. The generated signal may be transmitted to the eNB 200 through the transceiver 130.

The operation that supports dynamic PUCCH format switching of the UE 100, which has been described in various embodiments of the present invention, may be processed by the physical layer processing unit 212 of the processor 210 of the eNB 200.

Referring to FIG. 9, the physical layer processing unit 212 may include a downlink transmission scheduling unit 940, an uplink control channel format predicting unit 950, and an uplink control information determining unit 960.

The downlink transmission scheduling unit 940 may determine a resource to be used for a downlink transmission from the eNB 200 to the UE 100, may provide the UE 100 with the downlink transmission scheduling control information, and may generate a signal for the downlink transmission.

The uplink control channel format predicting unit 950 may determine an uplink control channel format to be used by the UE 100, so as to transmit a HARQ-ACK that responds to a downlink transmission to the UE 100, and a CSI generated based on a reference signal and the like. For example, the uplink control channel format predicting unit 950 may include one or more out of: a frame structure determining unit, a serving cell counting unit, a PUCCH and PUSCH simultaneous transmission determining unit, a HARQ-ACK information and CSI simultaneous transmission determining unit, and an uplink control information (e.g., control information including a HARQ-ACK and CSI) bit size predicting unit.

For example, the frame structure determining unit of the uplink control channel format predicting unit 950 may determine the frame structure (e.g., TDD or FDD) of a PUCCH serving cell, which is set for the UE. The serving cell counting unit of the uplink control channel format predicting unit 950 may determine whether the number of serving cells configured for the UE exceeds C. The PUCCH and PUSCH simultaneous transmission determining unit of the uplink control channel format predicting unit 950 may determine whether the simultaneous transmission of a PUCCH and a PUSCH is set in a subframe through which uplink control information is to be transmitted. The HARQ-ACK information and CSI simultaneous transmission determining unit of the uplink control channel format predicting unit 950 may determine whether a simultaneousAckNackAndCQI parameter, a simultaneousAckNackAndCQI-Format3-r11 parameter, or a simultaneousAckNackAndCQI-Format4-r13 parameter, which is set by a higher layer, is set to TRUE. The uplink control information bit size predicting unit of the uplink control channel format predicting unit 950 may predict whether the size of bits of uplink control information (UCI) including HARQ-ACK information and one or a plurality of periodic CSIs which are to be simultaneously transmitted, exceeds 22, or exceeds X (e.g., X=64 or 128). The uplink control channel format predicting unit 950 may dynamically predict a PUCCH format to be used for the transmission of uplink control information, based on the result of determination/calculation/prediction made by one or more out of: the frame structure determining unit, the serving cell counting unit, the PUCCH and PUSCH simultaneous transmission determining unit, the HARQ-ACK information and CSI simultaneous transmission determining unit, and the uplink control information bit size predicting unit.

The uplink control information determining unit 960 may attempt to receive an uplink control information transmission signal based on a PUCCH format determined by the uplink control channel format predicting unit 950, and may determine the received uplink control information. For example, the processor 210 of the eNB 200 that determines the HARQ-ACK information may determine whether to retransmit the corresponding downlink transmission. Also, the processor 210 of the eNB 200 that determines the CSI information may determine scheduling and the like in association with the corresponding UE, by taking into consideration a channel state indicated by the CSI.

The operations of the above described processor 110 of the UE 100 or the processor 210 of the eNB 200 may implemented by software processing or hardware processing, or may be implemented by software and hardware processing.

According to one or more exemplary embodiments of the present invention, a UE includes a transceiver and a processor operationally coupled to the transceiver. The processor is configured to: configure serving cells for the UE, the serving cells including at least six serving cells configurable for the UE; identify PUCCH format configuration information for transmitting uplink control information associated with the configured serving cells, the PUCCH format configuration information including configuration information of PUCCH format 4 indicated by PUCCH-Format parameter of PUCCH-Config Information Element (IE) in a Radio Resource Control (RRC) message; determine a total number of Hybrid Automatic Repeat Request-Acknowledgement (HARQ-ACK) bits, scheduling request (SR) bits, and periodic Channel State Information (CSI) bits to be transmitted in a subframe; select, at least based on the determined total number, a PUCCH format to transmit at least one of HARQ-ACK, SR, and periodic CSI in the subframe, the selected PUCCH format being one of PUCCH formats including the PUCCH format 4 and PUCCH format 3; and control the transceiver to transmit the uplink control information associated with the configured serving cells in the subframe using the selected PUCCH format, the uplink control information associated with the configured serving cells including the at least one of HARQ-ACK, SR, and periodic CSI.

The processor may further be configured to determine whether the total number of HARQ-ACK bits, SR bits, and periodic CSI bits to be transmitted in a subframe is greater than 22, and select the PUCCH format 3 when the determined total number is not greater than 22. The processor may further be configured to select the PUCCH format 4 when the determined total number is greater than 22.

The processor may further be configured to determine resource sets of the PUCCH format 3 and the PUCCH format 4, and determine a resource of the selected PUCCH format indicated by a value of Transmission Power Control (TPC) field in downlink control information (DCI) of a Physical Downlink Control Channel (PDCCH). The processor may further be configured to multiplex the HARQ-ACK, the SR, and the periodic CSI such that the HARQ-ACK, the SR, and the periodic CSI are transmitted in the subframe.

The transceiver may transmit the uplink control information associated with the configured serving cells in the subframe through a primary serving cell (PCell) or a PUCCH serving cell. The processor may further be configured to configure the PUCCH serving cell among secondary serving cells (SCells), and the transceiver may transmit the uplink control information associated with the configured serving cells in the subframe through the PUCCH serving cell. The transceiver may receive configuration information of the PUCCH serving cell through an RRC signaling.

The processor may further be configured to determine whether simultaneousAckNackAndCQI-Format4-r13 is set TRUE in determining the transmission of the HARQ-ACK, SR, and periodic CSI in the subframe. The processor may further be configured to determine to use the PUCCH format 4 if the simultaneousAckNackAndCQI-Format4-r13 is set TRUE and if the total number of HARQ-ACK bits, SR bits, and periodic CSI bits to be transmitted in the subframe is less than or equal to a threshold value.

The processor may further be configured to determine a priority for the periodic CSI based on at least one of a PUCCH report type, a process ID, a CSI subframe index, a serving cell index, and a serving cell group, and to drop at least one periodic CSI based on the determined priority for the periodic CSI when the total number of HARQ-ACK bits, SR bits, and periodic CSI bits to be transmitted in the subframe is greater than the threshold value.

The processor may further be configured to control the transceiver to transmit one HARQ-ACK multiplexed with one periodic CSI report in a subframe using PUCCH format 2/2a/2b if simultaneousAckNackAndCQI-Format4-r13 is set TRUE and if the one HARQ-ACK correspond to a PDSCH transmission or Physical Downlink Control Channel (PDCCH)/Enhanced PDCCH indicating downlink Semi-Persistent Scheduling (SPS) release on a primary serving cell.

According to one or more exemplary embodiments of the present invention, when a terminal is set to use a new PUCCH format for supporting eCA, there may be provided a new scheme that enables the terminal to simultaneously transmit HARQ-ACK information and a periodic CSI.

Although the various embodiments of the present invention have been described from the perspective of the 3GPP LTE or LTE-A system, they may be applied to various mobile communication systems.

Furthermore, the present disclosure relates to a wireless communication system, and more particularly, to an apparatus, a method, software, or a recording medium that stores software, which dynamically switches an uplink control channel format in a wireless communication system. According to the present invention, there is provided a new method associated with the dynamic switching of a PUCCH format, which may increase the efficiency of utilizing a PUCCH resource. Also, according to the present invention, there is provided a new method that dynamically indicates resource allocation associated with a new PUCCH format, and dynamically induces a resource that is allocated based on the indication.

Figure 10:
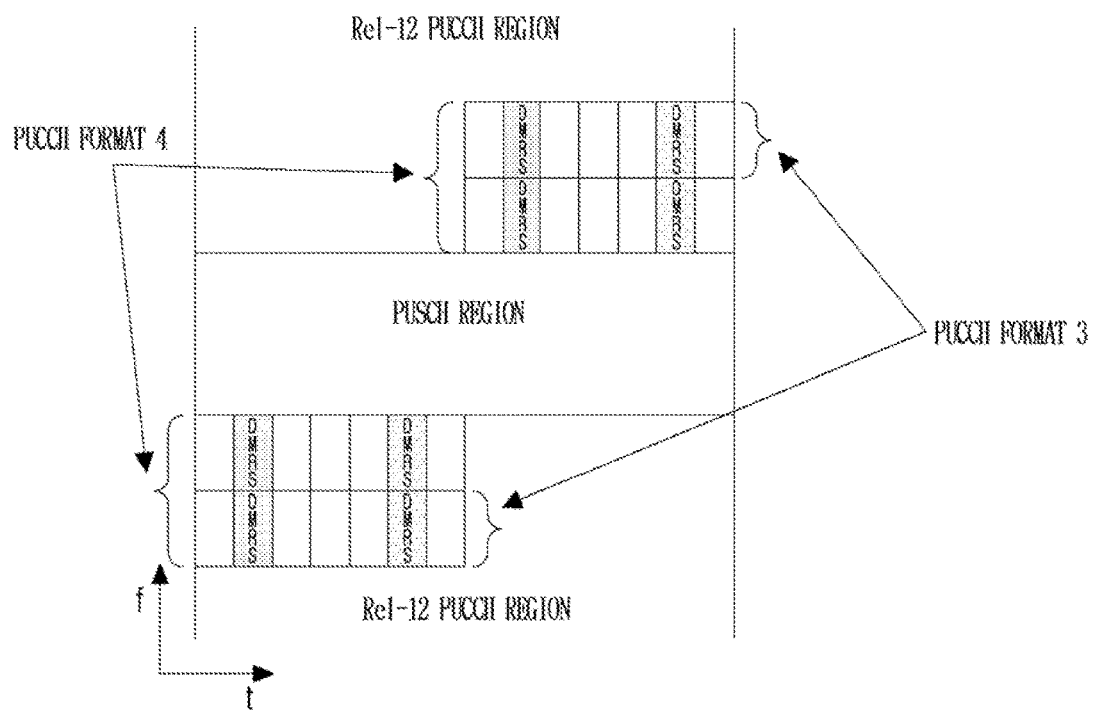
FIGS. 10 and 11 are diagrams illustrating an example of the structure of PUCCH format 4 according to an exemplary embodiment of the present invention.
Figure 11:
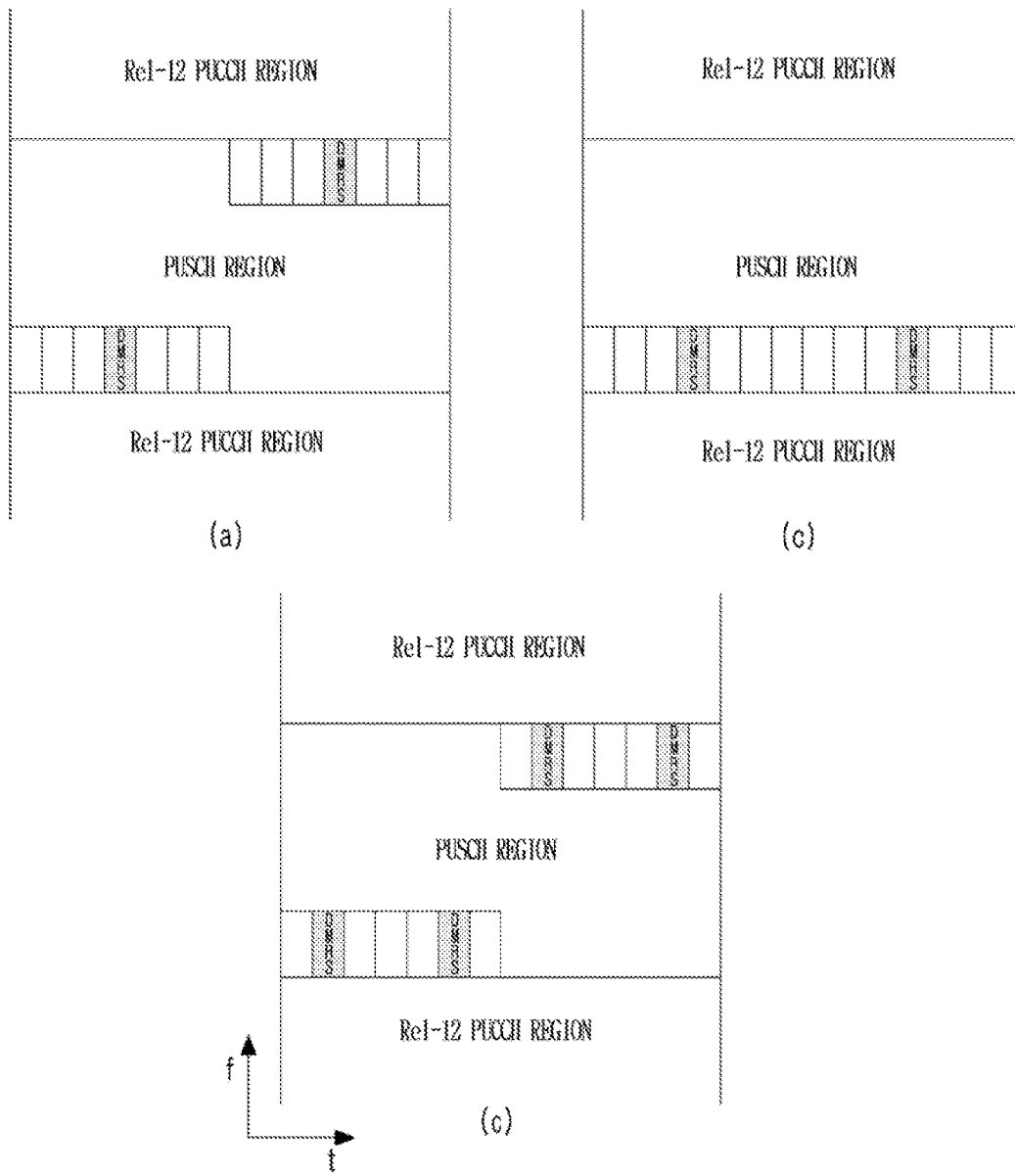

FIGS. 10 and 11 are diagrams illustrating an example of the structure of PUCCH format 4.

In association with the structure of PUCCH format 4, two types of format structures have been discussing, briefly.

PUCCH format 4 structure type 1 as illustrated in FIG. 10 may be the PUCCH format 3 structure in a plurality of PRB pairs (e.g., a form in which the PUCCH format 3 structure of FIG. 6 is extended to a plurality of PRB pairs). That is, a PRB pair used for PUCCH format 3 is formed of a single PRB of one side frequency edge of a system bandwidth in a single slot in a single subframe and a single PRB of the other side frequency edge of the other slot. The PUCCH format 4 type 1 may be a form in which a single PRB pair is further used in the direction of a PUSCH region in addition to the PRB pair used for PUCCH format 3.

PUCCH format 4 structure type 2 as illustrated in FIG. 11 may use some of a PUSCH region, as opposed to a PUCCH region. A resource used for PUCCH format 4 type 2 of FIG. 11 may not be limited to a single PRB size in a single slot, and one PRB pair or a plurality of PRB pairs may be used. Although a single PRB pair is used for PUCCH format 4, a structure may be used that may allocate a larger amount of information than an amount of information that PUCCH format 3 allocates using a single PRB pair.

The example (a) of FIG. 11 is the case in which a PRB pair used for PUCCH format 4 in a subframe performs frequency hopping (that is, intra-subframe frequency hopping) based on a slot, and a DMRS structure that is similar to a PUSCH may be used for PUCCH format 4 is used.

The example (b) of FIG. 11 is the case in which a PRB pair used for PUCCH format 4 does not perform intra-subframe frequency hopping, and a DMRS structure that is similar to a PUSCH is used for PUCCH format 4 is used.

The example (c) of FIG. 11 is the case in which a PRB pair used for PUCCH format 4 performs intra-subframe frequency hopping, and a DMRS structure that is similar to PUCCH format 3 is used for PUCCH format 4.

Hereinafter, when PUCCH format 4 is set for a UE according to the present invention, dynamic PUCCH format switching for a HARQ-ACK transmission is described as the above.

When a new PUCCH format (e.g., PUCCH format 4) is set for a UE, the present invention describes a scheme of dynamically determining (dynamically switching) a PUCCH format to be used for the transmission of uplink control information based on the number of DL transmissions that require a HARQ-ACK on one or more subframes in a plurality of serving cells (e.g., the maximum number of DL transmissions that may be scheduled for a UE or the number of DL transmissions that are actually scheduled for a UE) or based on which serving cell sub-group a DL transmission that requires a HARQ-ACK exists.

Even when a serving cell group is not clearly distinguished in a UE for which a plurality of PUCCH serving cells are configured, it is not excluded that various examples are applied. Dynamically determining a PUCCH format for a HARQ-ACK transmission means determining a PUCCH format to be actually used at a HARQ-ACK transmission timing based on a predetermined standard or parameter, out of PUCCH format 1a/1b, PUCCH format 2a/2b, PUCCH format 3, and PUCCH format 4, although a PUCCH format that is semi-statically set by a higher layer is PUCCH format 4.

The dynamic determination of a PUCCH format according to the present invention may be based on a value that is obtained by adding up, throughout a plurality of serving cells, the number of DL transmissions that require a HARQ-ACK in one or more subframes of each serving cell (for example, the maximum number of DL transmissions that may be scheduled for a UE or the number of DL transmissions that are actually scheduled for a UE), or based on a which serving cell sub-group a DL transmission that requires a HARQ-ACK exists, depending on the frame structure of a PUCCH serving cell (e.g., a case when a PUCCH serving cell corresponds to frame structure 1 in FDD, TDD, and FDD-TDD and a case when a PUCCH serving cell is frame structure 2 in FDD-TDD).

As a PUCCH transmission format for a HARQ-ACK transmission under the environment of CA, PUCCH format 3 or PUCCH format 1b with channel selection may be used. The size of a HARQ-ACK payload to be transmitted through the PUCCH format may be determined based on a parameter that is semi-statically set for a UE through a higher layer signaling (e.g., an RRC signaling). In the case of FDD, the size of a HARQ-ACK payload may be determined based on the number of serving cells configured for a UE and a transmission mode in each serving cell (e.g., it is about whether a MIMO transmission mode is applied, and based on the same, the number of codewords (or transport blocks) that may be transmitted in a single PDSCH may be determined). In the case of TDD, the size of a HARQ-ACK payload may be determined based on the number of serving cells configured for a UE, a transmission mode in each serving cell, the size of a bundling window (that is, the number of downlink subframes associated with a HARQ-ACK transmission in a single uplink subframe).

In a radio communication environment, although a UE may miss scheduling information or data transmission that is transmitted from an eNB, or the UE may mistake erroneous reception for normal reception (that is, mistake NACK for ACK). In the case when an error occurs, there may be a difference between the number of bits of a HARQ-ACK to be actually transmitted and the size of a HARQ-ACK payload that a UE derives, and thus, the performance may deteriorate. However, under the environment of CA, although the error occurs, there is no big problem from the perspective of PUCCH transmission efficiency. That is, under the environment of CA, the number of serving cells configured for a UE is small (that is, 3GPP LTE release-10 that initially introduces CA basically considers a scenario in which 2 CCs are configured for a UE), and although a difference exists between the number of HARQ-ACK bits which is to be actually transmitted based on the number of serving cells where scheduling is performed, and the size of a HARQ-ACK payload which is determined based on a parameter (that is, the number of serving cells configured for a UE) that is semi-statically set for a UE, the difference is small.

In the case of the introduction of eCA that is currently discussed, a maximum of 32 serving cells are configured for a single UE. Therefore, when the size of a HARQ-ACK payload is determined based on a parameter that is semi-statically set through a higher layer signaling, and a PUCCH format is selected based on the same, the inefficiency thereof may be amplified. That is, even when a maximum of 32 serving cells are configured for a single UE, the number of serving cells that an eNB schedules (that is, where a downlink allocation is performed) for a UE on a single sub-frame may be significantly smaller than 32. Accordingly, the size of a HARQ-ACK payload corresponding to a DL transmission that actually requires a HARQ-ACK (that is, a PDSCH indicated by the detection of an (E)PDCCH or a PDSCH that is transmitted without the detection of an (E)PDCCH (they may be commonly called a PDSCH), or an (E)PDCCH indicating DL SPS release) may have a large difference. Therefore, a scheme of determining the size of a HARQ-ACK payload based on the number of serving cells that are actually scheduled (where a downlink allocation is performed), as opposed to based on the number of serving cells configured for a UE, may be taken into consideration.

Hereinafter, embodiments of the present invention will be described in association with a scheme of dynamically determining (or dynamically switching) a PUCCH format to be used for the transmission of a HARQ-ACK, as a newly introduced PUCCH format 4 structure and a new method of determining the size of a HARQ-ACK payload are applied as described above.

First, the scheme of dynamically determining a PUCCH format of the present invention assumes that the following configurations for a UE are basically provided by a higher layer signaling.

When a PUCCH serving cell is set to FDD, it is assumed that more than 5 serving cells are configured for a UE, and PUCCH format 4 is set (including the case in which the resource of PUCCH format 4 is derived or the case in which the use of PUCCH format 4 is implicitly indicated).

In the case in which a PUCCH serving cell is set to TDD, when TDD UL-DL configuration 0, 1, 2, 3, 4, or 6 (or DL reference UL-DL configuration 0, 1, 2, 3, 4, or 6) is used, it is assumed that more than 5 serving cells are configured for a UE, or when TDD UL-DL configuration 5 (or DL reference UL-DL configuration 5) is used, it is assumed that more than 2 serving cells are configured for a UE and PUCCH format 4 is set (including the case in which the resource of PUCCH format 4 is derived or the case in which the use of PUCCH format 4 is implicitly indicated).

Also, when PUCCH format 4 is set for a UE, it is assumed that the value of a PUCCH TPC command field (2 bits) in an (E)PDCCH downlink DCI (e.g., DCI format 1/1A/1B/1D/2/2A/2B/2C/2D) transmitted in an SCell indicates a PUCCH format 4 resource index (e.g., $n_{PUCCH}^{(3,\tilde{p})}$) and resource allocation indicator information (a TPC command field of an (E)PDCCH downlink DCI transmitted in a PUCCH serving cell indicates a value associated with PUCCH power control, for the purpose for which it was intended.

As described above, based on the PUCCH resource index and the resource allocation indicator information provided by an eNB to a UE, the UE may determine the resource for a PUCCH format 4 transmission through a predetermined antenna port in a subframe n. When transmission diversity is set (e.g., when 2 antenna ports are set) for the PUCCH format 4 transmission, two PUCCH resource indices may be indicated through a TPC field as described above.

Also, in the embodiments of the present invention, a HARQ-ACK transmission that takes PUCCH format 1a/1b as a fallback, may be defined as follows.

The determination of a PUCCH format 1a/1b resource will be described. A region where a PDCCH is transmitted in each downlink subframe is formed of a plurality of control channel elements (CCE), and a PDCCH transmitted to a single UE in a subframe may be formed of one or a plurality of CCEs out of the CCEs forming the PDCCH region of the corresponding subframe. Also, in a region where a PUCCH is transmitted in each uplink subframe, resources that are capable of transmitting a plurality of PUCCHs may exist. In this instance, a UE may transmit a HARQ-ACK through PUCCH format 1a/1b using a PUCCH resource having an index that corresponds to the index of a predetermined CCE (that is, a first CCE) out of the CCEs forming a PDCCH that the UE receives.

In the case of a FDD PUCCH serving cell, when only a single PDSCH or an (E)PDCCH transmission indicating downlink SPS release is received by a UE on only the PCell at a subframe index n−4, the UE may transmit HARQ-ACK information at a subframe index n using a PUCCH format 1a/1b resource.

When two antenna ports are set for a PUCCH transmission, a PUCCH format 1a/1b resource index $n_{PUCCH}^{(1,\tilde{p}_0)}$ for a first antenna port and a PUCCH format 1a/1b resource index $n_{PUCCH}^{(1,\tilde{p}1)}$ for a second antenna port may be determined as follows.

$$n_{PUCCH}^{(1,\tilde{p}0)} = n_{CCE} + N_{PUCCH}^{(1)}$$

$$n_{PUCCH}^{(1,\tilde{p}1)} = n_{CCE} + 1 + N_{PUCCH}^{(1)} \quad \text{[Equation 3]}$$

Here, $n_{PUCCH}^{(1,\tilde{p}0)}$ and $n_{PUCCH}^{(1,\tilde{p}1)}$ indicate the resource indices of PUCCH format 1a/1b for transmitting a HARQ-ACK, and $n_{CCE}$ indicates the smallest value out of CCE indices used for an (E)PDCCH transmission. $N^{(1)}_{PUCCH}$ indicates a signaling value transferred from a higher layer, and corresponds to the total number of resources that are semi-statically set by a higher layer in a physical resource region where PUCCH format 1/1a/1b is transmitted. For example, an SR resource, a downlink SPS resource, or the like may be resources that an eNB semi-statically sets for a UE through RRC setup for a corresponding purpose. A cyclic shift, an orthogonal spreading code, and a PRB index for a PUCCH format 1a/1b transmission may be determined from $n_{PUCCH}^{(1,\tilde{p}0)}$ and $n_{PUCCH}^{(1,\tilde{p}1)}$. Subsequently, a HARQ-ACK transmission in TDD will be described in detail.

In the case of a TDD PUCCH serving cell, only a single PDSCH transmission is indicated by an (E)PDCCH at a subframe index $n-k_m$ (refer to Table 4). Also, in the case in which one of TDD UL-DL configuration 1, 2, 3, 4, 5, and 6 corresponds to a PCell, when a PDSCH indicated by an (E)PDCCH of which a downlink assignment index (DAI) value is 1 (that is, an (E)PDCCH having a DAI=1) or an (E)PDCCH indicating downlink SPS release exists, a UE may transmit HARQ-ACK information at a subframe index n using a PUCCH format 1a/1b resource that is determined based on an (E)PDCCH CCE index.

When a PDSCH transmission indicated by the (E)PDCCH having a DAI=1 or the (E)PDCCH indicating downlink SPS release exists in a subframe n−k (k∈K), the UE selects a c value that satisfies $N_c \leq n_{CCE,m} < N_{c+1}$ out of {0, 1, 2, 3}, first. A PUCCH resource index may be determined based on Equation 4 provided below.

$$n_{PUCCH}^{(1,\tilde{p}0)} = (M-m-1) \cdot N_c + m \cdot N_{c+1} + n_{CCE,m} + N_{PUCCH}^{(1)} \quad \text{[Equation 4]}$$

When two antenna ports are set for a PUCCH transmission, a PUCCH format 1a/1b resource index for a second antenna port may be $n_{PUCCH}^{(1,\tilde{p}1)} = n_{PUCCH}^{(1,\tilde{p}0)} + 1$.

Here, $n_{PUCCH}^{(1,\tilde{p}0)}$ indicates a resource index of PUCCH format 1a/1b for transmitting a HARQ-ACK, and $N^{(1)}$ PUCCH indicates a signaling value transferred from a higher layer. $n_{CCE,m}$ denotes the smallest value among CCE indices used for an associated PDCCH transmission at the subframe n−$k_m$ (here, $k_m$ denotes the smallest value in a set K). $N_c$ may be determined based on Equation 5 provided below.

$$N_c = \max\{0, \lfloor N_{RB}^{DL} \cdot (N_{sc}^{RB} \cdot c - 4)\rfloor / 36\} \quad \text{[Equation 5]}$$

Here, $N_{RB}^{DL}$ indicates a downlink bandwidth setting, and may be expressed based on a $N_{sc}^{RB}$ unit. $N_{sc}^{RB}$ denotes the size of a resource block in the frequency domain, and may be expressed by the number of sub-carriers.

In the case of a TDD PUCCH serving cell, a single PDSCH transmission may be transmitted in a PCell without an indication by an (E)PDCCH, and an additional PDSCH transmission is indicated by an (E)PDCCH having a DAI=1, or an (E)PDCCH indicating downlink SPS release has a DAI=1, a UE may transmit a HARQ-ACK through PUCCH format 1b with channel selection.

Particularly, the UE may transmit bits b(0)b(1) on a PUCCH resource at a subframe n using PUCCH format 1b. The value of b(0)b(1) and the PUCCH resource may be generated based on channel selection according to Table 5, Table 6, and Table 7, provided below. Table 7, Table 8, and Table 9 are related to HARQ-ACK multiplexed transmissions when M=2, M=3, and M=4, respectively, When b(0) b(1) is mapped to N/A, a UE may not transmit a HARQ-ACK response at a subframe n.

TABLE 7

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 8

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 9

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 7 to Table 9, HARQ-ACK(i) indicates a HARQ ACK/NACK/DTX result of an $i^{th}$ data unit (0≤i≤3). A discontinuous transmission (DTX) indicates the case in which the transmission of a data unit corresponding to HARQ-ACK(i) does not exist or the case in which a UE fails to detect the existence of a data unit corresponding to HARQ-ACK(i). In association with each data unit, a maximum of 4 PUCCH resources (that is, $n^{(1)}_{PUCCH,0} \sim n^{(1)}_{PUCCH,3}$) may be occupied. A multiplexed ACK/NACK may be transmitted through a single PUCCH resource that is selected from the occupied PUCCH resources. $n^{(1)}_{PUCCH,x}$ specified in Table 7 to Table 9 indicates a PUCCH resource that is actually used for transmitting a HARQ-ACK. b(0)b(1) denotes two bits transmitted through a selected PUCCH resource, and may be modulated based on a QPSK scheme. For example, as shown in Table 9, when a UE successfully decodes 4 data units, the UE transmits (1,1) to an eNB through a PUCCH resource that is connected to $n^{(1)}_{PUCCH,1}$. The combinations of a PUCCH resource and a QPSK symbol are insufficient to represent all possible ACK/NACK assumptions, and thus, NACK and DTX may be coupled (which may be expressed by NACK/DTX), except for some cases.

Figure 12:
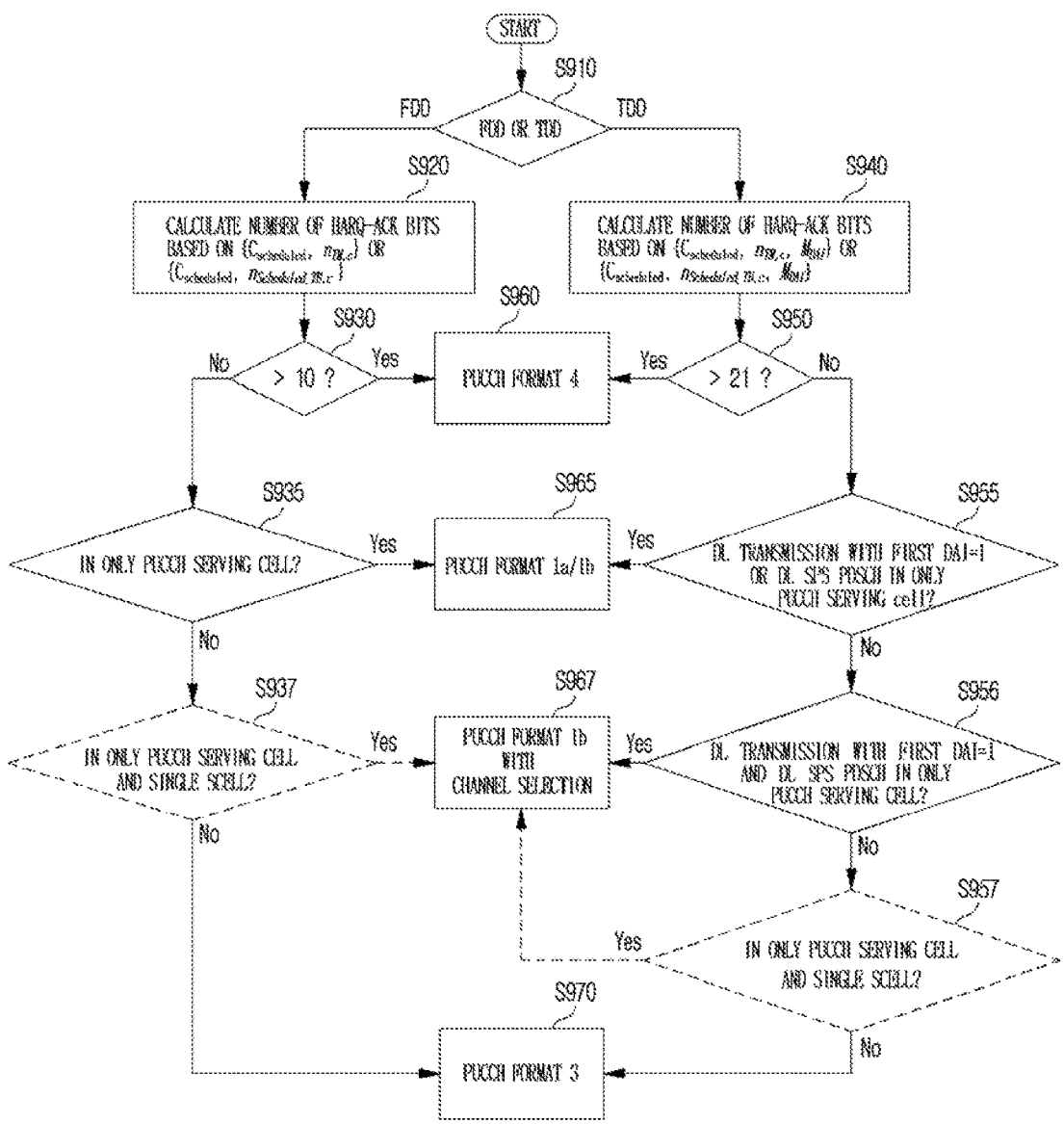
FIG. 12 is a flowchart illustrating dynamic PUCCH format determination according to an exemplary embodiment of the present invention.

FIG. 12 is a diagram illustrating dynamic PUCCH format determination according to an exemplary embodiment of the present invention.

The example of FIG. 12 is a scheme of dynamically switching a PUCCH format based on the number of HARQ-ACK bits, which is determined based on the number of DL transmissions that require a HARQ-ACK on one or more subframes in a single PUCCH serving cell group (e.g., the maximum number of DL transmissions that may be scheduled for a UE or the number of DL transmissions that are actually scheduled for a UE).

As described above, it is assumed that more than C serving cells may be configured for a UE, as a single PUCCH serving cell group, and PUCCH format 4 is set (for example, in the case of TDD UL-DL configuration 5 or DL reference UL-DL configuration 5, C=2. In the case of FDD-TDD, when the number of serving cells, of which the number of HARQ-ACK bits does not exceed 21 bits, is X, C=X. For the rest cases, C=5). When C or fewer serving cells exist in a single PUCCH serving cell group (for example, in the case of TDD UL-DL configuration 5 or DL reference UL-DL configuration 5, C=2. In the case of FDD-TDD, when the number of serving cells, of which the number of HARQ-ACK bits that does not exceed 21 bits, is X, C=X. For the rest cases, C=5), a HARQ-ACK transmission may be performed using PUCCH format 1a/1b or 3.

The UE may calculate the number of HARQ-ACK bits (or the number of HARQ-ACK bits to which spatial/time/frequency bundling is applied) by using at least one value out of following four parameters (or information)

$C_{scheduled}$: the number of serving cells including a DL transmission (e.g., a PDSCH or an (E)PDCCH indicating DL SPS release) that requires a HARQ-ACK exists.

$n_{TM,c}$: a transmission mode in a serving cell index c (e.g., the maximum number of transport blocks (TB) that are capable of being transmitted in a serving cell index c).

$n_{Scheduled\_TB,c}$: the number of TBs that are actually transmitted in a serving cell index c.

$M_{DAI}$: the number of sub-frames which include a DL transmission that requires a HARQ-ACK at each serving cell.

$M_{DAI}$ may be calculated by a first DAI, and when a new DAI (that is, a second DAI) which is different from the first DAI is defined in a downlink DCI format, $C_{scheduled}$ may be calculated using the same. That is, the first DAI indicates the number of downlink allocations accumulated in the time domain (or subframe domain) for a single serving cell. The second DAI indicates the number of downlink allocations accumulated in the frequency domain (or CC (or serving cell) domain), with respect to a single subframe in FDD, and with respect to a single HARQ-ACK bundling window in TDD.

Figure 13:
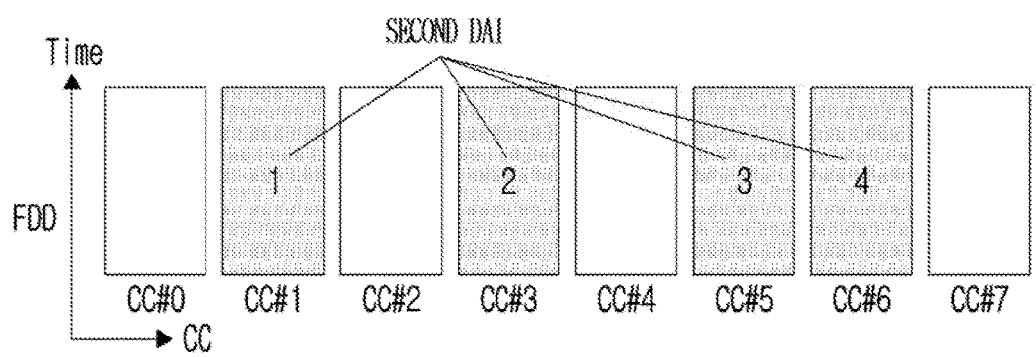
FIG. 13 is a diagram illustrating a second DAI according to an exemplary embodiment of the present invention.

FIG. 13 is a diagram illustrating a second DAI according to the present invention.

For example, the second DAI may be indicated by a value that is accumulated based on the number of serving cells where scheduling is performed (e.g., a PDSCH transmission or the transmission of an (E)PDCCH indicating downlink SPS release), in order from the lowest serving cell index to the highest serving cell index (or a reverse order) out of the serving cells configured for a UE. As illustrated in FIG. 10, when a PUCCH serving cell (PCell or P-SCell) is set to frame structure 1 in FDD or FDD-TDD, an eNB may provide, through a DAI field (that is, a second DAI value) in a downlink DCI format, a UE with a value (e.g., 4) that is finally obtained by accumulating the number of times that scheduling is performed (1 in CC#1, 2 in CC#3, 3 in CC#5, and 4 in CC#6) in order from a serving cell (CC#1 in the example of FIG. 10) having the lowest serving cell index with respect to all the scheduled serving cells out of 8 serving cells configured for the UE (that is CC#0 to CC#7). Therefore, the UE may be aware that the total number of serving cells scheduled for the UE itself is 4.

$n_{TM,c}$ may have a value based on a MIMO transmission mode setting in a single serving cell. When the value is 1, this may indicate the case in which a single codeword (CW) (or a transport block (TB)) is transmittable in a single PDSCH, or the case in which two CWs (or TBs) are transmittable in a single PDSCH of a single subframe and spatial bundling is applied to a HARQ-ACK (spatial bundling refers to bundling 2-bit information, which is HARQ-ACK information associated with two codewords (or TBs) in a single subframe, into 1-bit information through the AND operation.). When the value is 2, this may indicate the case in which two CWs (or TBs) are transmittable in a single PDSCH and spatial bundling of a HARQ-ACK is not applied. In the 3GPP LTE system, TM4, TM8, TM9, TM10, and the like are defined as a MIMO transmission mode (TM) that is capable of transmitting a maximum of 2 CWs (or TBs). Note that $n_{TM,c}$ is determined based on the maximum number of CWs (or TBs) that may be transmitted for each transmission mode, as opposed to the number of CWs (or TBs) that are actually transmitted.

$n_{Scheduled\_TB,c}$ indicates the number of CWs (or TBs) that are actually transmitted in a single PDSCH of a single subframe on a single serving cell. Although 2 CWs (or TBs) are actually transmitted in a single PDSCH of a single subframe, the value of $n_{Scheduled\_TB,c}$ is 1 when a HARQ-ACK spatial bundling is applied. The value of $n_{Scheduled\_TB,c}$ associated with a PDCCH indicating downlink SPS release is always 1

Referring again to FIG. 12, it is determined whether a PUCCH serving cell is set to FDD (or frame structure 1 in FDD-TDD) or TDD (or frame structure 2 in FDD-TDD) in operation S910. In the case of FDD, the operation proceeds with operation S920. In the case of TDD, the operation proceeds with operation S940.

In operation S920, a UE calculates the number of HARQ-ACK bits based on $C_{scheduled}$ and $n_{TM,c}$. Particularly, the number of HARQ-ACK bits may be calculated based on the following equation.

$$\sum_{c=0}^{C-1} n_{TM,c} \qquad \text{[Equation 6]}$$

Alternatively, in operation S920, the UE calculates the number of HARQ-ACK bits based on parameters $C_{scheduled}$ and $n_{Scheduled\_TB,c}$. Particularly, the number of HARQ-ACK bits may be calculated based on the following equation.

$$\sum_{c=0}^{C-1} n_{Scheduled\_TB,c} \qquad \text{[Equation 7]}$$

In operation S930, it is determined whether the number of HARQ-ACK bits calculated in operation S920 exceeds 10. When the number of HARQ-ACK bits exceeds 10, the operation proceeds with operation S960 and a HARQ-ACK transmission may be performed using PUCCH format 4. When the number of HARQ-ACK bits is less than or equal to 10, the operation proceeds with operation S935, so that the UE may determine whether a DL transmission that requires a HARQ-ACK exists in only a PUCCH serving cell.

When the result of the determination in operation S935 indicates YES (that is, when a DL transmission that requires a HARQ-ACK exists in only the PUCCH serving cell, (1 or 2 HARQ-ACK bits), the operation proceeds with operation S965, so that the UE may perform a HARQ-ACK transmission using PUCCH format 1a/1b.

When the result of the determination in operation S935 indicates NO (that is, when a DL transmission that requires a HARQ-ACK exists in at least one SCell), the operation proceeds with operation S970, so that a HARQ-ACK transmission may be performed using PUCCH format 3.

Alternatively, when the result of the determination in operation S935 indicates NO (that is, when a DL transmission that requires a HARQ-ACK exists in at least one SCell), the operation proceeds with operation S937, and determines whether a DL transmission that requires a HARQ-ACK exists in only the PUCCH serving cell and a single SCell, or whether the number of HARQ-ACK bits calculated in operation S920 is greater than or equal to 2 and less than or equal to 4.

When the result of the determination in operation S937 indicates YES (that is, when a DL transmission that requires a HARQ-ACK exists in the PUCCH serving cell, and additionally, a DL transmission that requires a HARQ-ACK exists in a single SCell, or when the number of HARQ-ACK bits calculated in operation S920 is greater than or equal to 2 and less than or equal to 4), the operation proceeds with operation S967, so that a HARQ-ACK transmission may be performed using PUCCH format 1b with channel selection.

When the result of the determination in operation S937 indicates NO (that is, when a DL transmission that requires a HARQ-ACK does not exist in the PUCCH serving cell and a DL transmission that requires a HARQ-ACK exists in at least one SCell, or when a DL transmission that requires a HARQ-ACK exists in the PUCCH serving cell and a DL transmission that requires a HARQ-ACK exists in a plurality of SCells, or when the number of HARQ-ACK bits calculated in operation S920 is greater than 4 and less than or equal to 10), the operation proceeds with operation S970, and a HARQ-ACK transmission may be performed using PUCCH format 3.

In operation S940, the UE calculates the number of HARQ-ACK bits based on parameters $C_{scheduled}$, $n_{TM,c}$, and $M_{DAI}$. Particularly, the number of HARQ-ACK bits may be calculated based on the following equation.

$$\sum_{c=0}^{C-1} n_{TM,c} * M_{DAI} \qquad \text{[Equation 8]}$$

Alternatively, in operation S940, the UE calculates the number of HARQ-ACK bits based on parameters $C_{scheduled}$, $n_{Scheduled\_TB,c}$, and $M_{DAI}$. Particularly, the number of HARQ-ACK bits may be calculated based on the following equation.

$$\sum_{c=0}^{C-1} n_{Scheduled\_TB,c} * M_{DAI} \qquad \text{[Equation 9]}$$

In operation S950, it is determined whether the number of HARQ-ACK bits calculated in operation S940 exceeds 21. When the number of HARQ-ACK bits exceeds 21, the operation proceeds with operation S960 and a HARQ-ACK transmission may be performed using PUCCH format 4. When the number of HARQ-ACK bits is less than or equal to 21, the operation proceeds with operation S955.

In operation S955, the UE determines whether a DL transmission that requires a HARQ-ACK and of which a first DAI value in a downlink DCI is 1 (e.g., a PDSCH transmission indicated by an (E)PDCCH or an (E)PDCCH transmission indicating downlink SPS release), or a PDSCH transmission without an indication by an (E)PDCCH (that is, DL SPS PDSCH) exists in only the PUCCH serving cell.

When the result of the determination in operation S955 indicates YES (that is, a DL transmission that requires a HARQ-ACK, and of which a first DAI value in the downlink DCI is 1 exists in only the PUCCH serving cell, or a DL transmission without the indication by an (E)PDCCH (that is, DL SPS PDSCH) exists in only the PUCCH serving cell), the operation proceeds with operation S965, so that a HARQ-ACK transmission may be performed using PUCCH format 1a/b.

When the result of the determination in operation S955 indicates NO (that is, when a DL transmission that requires a HARQ-ACK exists in the PUCCH serving cell other than a DL transmission that requires a HARQ-ACK and of which a first DAI value is 1 or a PDSCH transmission without an indication by an (E)PDCCH, or when a DL transmission that requires a HARQ-ACK exists in at least one SCell), the operation proceeds with operation S956, so that it is determined whether a DL transmission that requires a HARQ-ACK, and of which a first DAI value in the downlink DCI is 1 and a PDSCH transmission without an indication by an (E)PDCCH (that is, DL SPS PDSCH) exists in only the PUCCH serving cell.

When the result of the determination in operation S956 indicates YES (that is, a DL transmission that requires a HARQ-ACK, and of which a first DAI value in the downlink DCI is 1 and a PDSCH transmission without an indication by an (E)PDCCH (that is, DL SPS PDSCH) exist in only the PUCCH serving cell), the operation proceeds with operation S967, so that a HARQ-ACK transmission may be performed using PUCCH format 1b with channel selection.

When the result of the determination in operation S956 indicates NO (that is, when a DL transmission that requires a HARQ-ACK other than a DL transmission that requires a HARQ-ACK and of which a first DAI value in the downlink DCI is 1 and a PDSCH transmission without an indication by an (E)PDCCH (that is, DL SPS PDSCH), exists in the PUCCH serving cell, or when a DL transmission that requires a HARQ-ACK exists in at least one SCell), the operation proceeds with operation S970, so that a HARQ-ACK transmission may be performed using PUCCH format 3.

Alternatively, when the result of the determination in operation S956 indicates NO (that is, when a DL transmission that requires a HARQ-ACK other than a DL transmission that requires a HARQ-ACK and of which a first DAI value in the downlink DCI is 1 and a PDSCH transmission without an indication by an (E)PDCCH (that is, DL SPS PDSCH) exists in the PUCCH serving cell, or when a DL transmission that requires a HARQ-ACK exists in at least one SCell, the operation proceeds with operation S957, so that it is determined whether a DL transmission(s) that requires a HARQ-ACK exists in only the PUCCH serving cell and a single SCell, or whether the number of HARQ-ACK bits calculated (after bundling is applied when it is required) in operation S940 is greater than or equal to 2 and less than or equal to 4.

When the result of the determination in operation S957 indicates YES (that is, when a DL transmission(s) that requires a HARQ-ACK exists in the PUCCH serving cell, and additionally, a DL transmission(s) that requires a HARQ-ACK exists in a single SCell, or when the number of HARQ-ACK bits calculated (after bundling is applied when it is required) in operation S940 is greater than or equal to 2 and less than or equal to 4), the operation proceeds with operation S967, so that a HARQ-ACK transmission may be performed using PUCCH format 1b with channel selection. Here, although a DL transmission(s) that requires a HARQ-ACK exists in the PUCCH serving cell, and additionally, a DL transmission(s) that requires a HARQ-ACK exists in a single SCell, when TDD UL-DL configuration index 5 is applied to the PUCCH serving cell or downlink reference UL-DL configuration index 5 is applied in TDD CA or FDD-TDD CA, the operation may not proceed with operation S967 and may proceed with operation S970, so that a HARQ-ACK transmission may be performed using PUCCH format 3.

When the result of the determination in operation S957 indicates NO (that is, when a DL transmission that requires a HARQ-ACK does not exist in the PUCCH serving cell and a DL transmission that requires a HARQ-ACK exists in at least one SCell, or when a DL transmission that requires a HARQ-ACK exists in the PUCCH serving cell and a DL transmission that requires a HARQ-ACK exists in a plurality of SCells, or when the number of HARQ-ACK bits calculated (after bundling is applied when it is required) in operation S940 is greater than 4 and less than or equal to 21), the operation proceeds with operation S970, and a HARQ-ACK transmission may be performed using PUCCH format 3.

Figure 14:
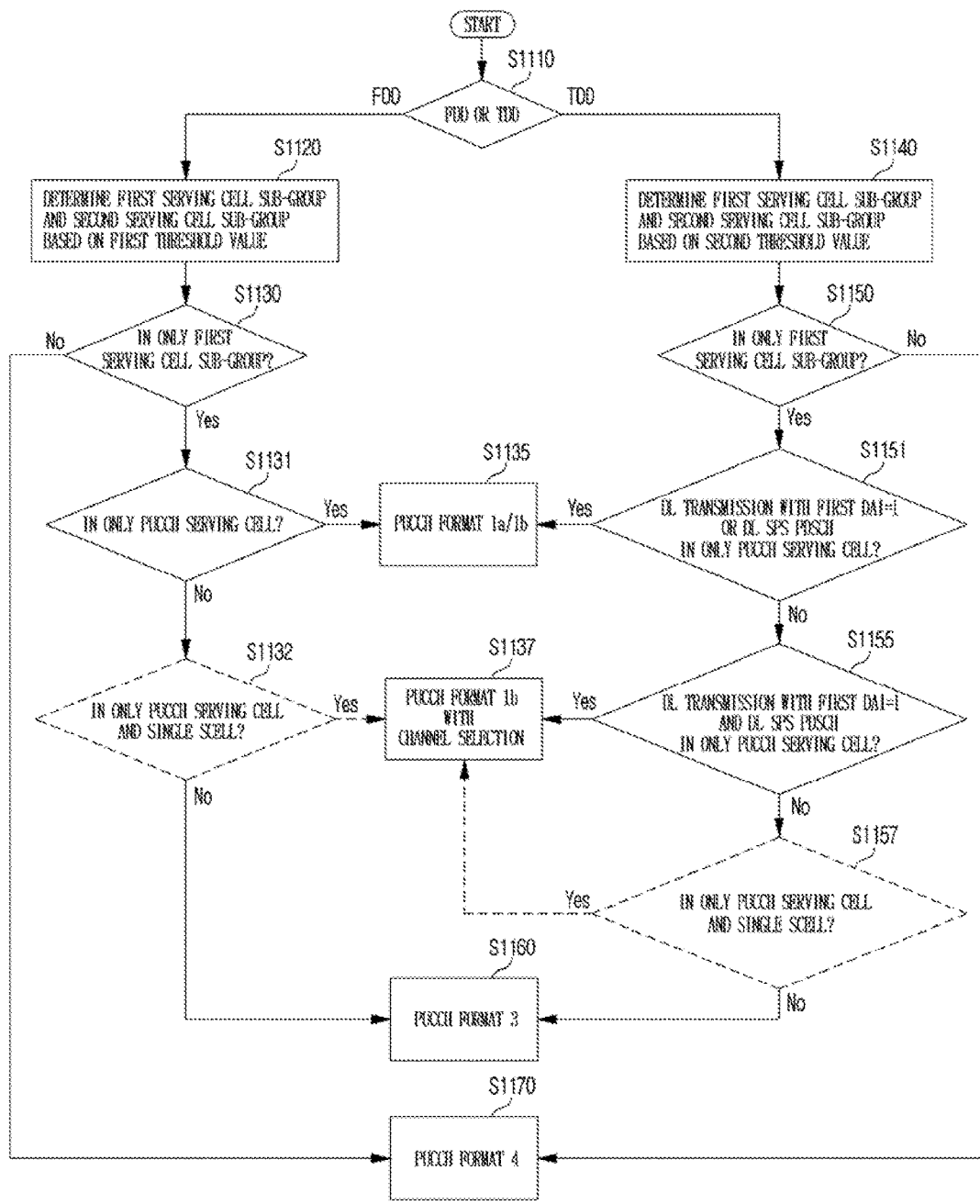
FIG. 14 is a flowchart illustrating dynamic PUCCH format determination according to another exemplary embodiment of the present invention.

FIG. 14 is a diagram illustrating dynamic PUCCH format determination according to another exemplary embodiment of the present invention.

As described above, it is assumed that more than C serving cells may be configured for a UE, as a single PUCCH serving cell group (for example, in the case of TDD UL-DL configuration 5 or DL reference UL-DL configuration 5, C=2. In the case of FDD-TDD, when the number of serving cells, of which the number of HARQ-ACK bits does not exceed 21 bits, is X, C=X. For the rest cases, C=5), and PUCCH format 4 is set. When C or fewer serving cells exist in a single PUCCH serving cell group (for example, in the case of TDD UL-DL configuration 5 or DL reference UL-DL configuration 5, C=2. In the case of FDD-TDD, when the number of serving cells, of which the number of HARQ-ACK bits does not exceed 21 bits, is X, C=X. For the rest cases, C=5), a HARQ-ACK transmission may be performed using PUCCH format 1a/1b, PUCCH format 1b with channel selection, or PUCCH format 3.

The example of FIG. 14 is a scheme of dynamically switching a PUCCH format based on a serving cell sub-group where a DL transmission that requires a HARQ-ACK exists. For example, when a first serving cell sub-group and a second serving cell sub-group are set for a single PUCCH serving cell group which is configured for a UE, and a DL transmission (that is, a PDSCH indicated by the detection of an (E)PDCCH or a PDSCH that is transmitted without the detection of an (E)PDCCH (they may be commonly designated as a PDSCH), or an (E)PDCCH indicating DL SPS release) that requires a HARQ-ACK exists in only the first serving cell sub-group, dynamic switching may be performed using PUCCH format 1a/1b, PUCCH format 1b with channel selection, or PUCCH format 3. Otherwise (that is, when a DL transmission that requires a HARQ-ACK exists even in the second serving cell sub-group), dynamic switching may be performed using PUCCH format 4.

The first serving cell sub-group and the second serving cell sub-group may be distinguished based on a predetermined threshold value $C_{threshold}$ in association with the number of serving cells in the single PUCCH serving cell group. For example, a serving cell(s) of which the number is less than or equal to the threshold value may be determined as the first serving cell sub-group in order of a serving cell index (in order from the lowest index to the higher index), and a serving cell(s) corresponding to an excess based on the threshold value may be determined as the second serving sub-group. Alternatively, the first serving cell sub-group and the second serving cell sub-group may be determined in order from the highest index to the lowest index. Here, a PUCCH serving cell may belong to the first serving cell sub-group. The first serving cell sub-group and the second serving cell sub-group may be defined in advance, or may be configured for a UE through a higher layer signaling.

In operation S1110, it is determined whether a PUCCH serving cell is set to FDD (or frame structure 1 in FDD-TDD) or TDD (or frame structure 2 in FDD-TDD). In the case of FDD, the operation proceeds with operation S1120. In the case of TDD, the operation proceeds with operation S1140.

In operation S1120, a first serving cell sub-group and a second serving cell sub-group are determined based on a first threshold value $C_{threshold1}$. For example, the first threshold value may be 5.

For example, as illustrated in FIGS. 12 and 13, when CC#0, CC#1, CC#2, CC#3, CC#4, CC#5, CC#6, and CC#7 are configured as a single PUCCH serving cell group with respect to a UE, and CC#0 corresponds to a PUCCH serving cell, it may be determined that CC#0, CC#1, CC#2, CC#3 and CC#4 belong to the first serving cell sub-group, and CC#5, CC#6, and CC#7 belong to the second serving cell sub-group. This is merely an example. The indices of the serving cells that belong to a single PUCCH serving cell group may not need to be consecutive, and a serving cell sub-group may be determined in order from the highest serving cell index to the lowest serving cell index.

In operation S1130, it is determined whether a DL transmission that requires a HARQ-ACK exists in only the first serving cell sub-group (that is, a PUCCH serving cell and one or more SCells).

When a DL transmission that requires a HARQ-ACK exists in only the first serving cell sub-group, the operation proceeds with operation S1131, and the UE determines whether a DL transmission that requires a HARQ-ACK exists in only the PUCCH serving cell in the first serving cell sub-group.

When the result of the determination in operation S1131 indicates YES (that is, when a DL transmission that requires a HARQ-ACK exists in only the PUCCH serving cell in the first serving cell sub-group (that is, 1 or 2 HARQ-ACK bits), the operation proceeds with operation S1135, so that the UE may perform a HARQ-ACK transmission using PUCCH format 1a/1b.

When the result of the determination in operation S1131 indicates NO (that is, when a DL transmission that requires a HARQ-ACK exists in at least one SCell in the first serving cell sub-group), the operation proceeds with operation S1160, so that a HARQ-ACK transmission may be performed using PUCCH format 3.

Alternatively, when the result of the determination in operation S1131 indicates NO (that is, when a DL transmission that requires a HARQ-ACK exists in at least one SCell in the first serving cell sub-group), the operation proceeds with operation S1132, so that it is determined whether a DL transmission that requires a HARQ-ACK exists in only the PUCCH serving cell and a single SCell.

When the determination in operation S1132 indicates YES (that is, when a DL transmission that requires a HARQ-ACK exists in the PUCCH serving cell in the first serving cell sub-group, and additionally, a DL transmission that requires a HARQ-ACK exists in a single SCell), the operation proceeds with operation S1137, and a HARQ-ACK transmission may be performed using PUCCH format 1b with channel selection.

Figure 15:
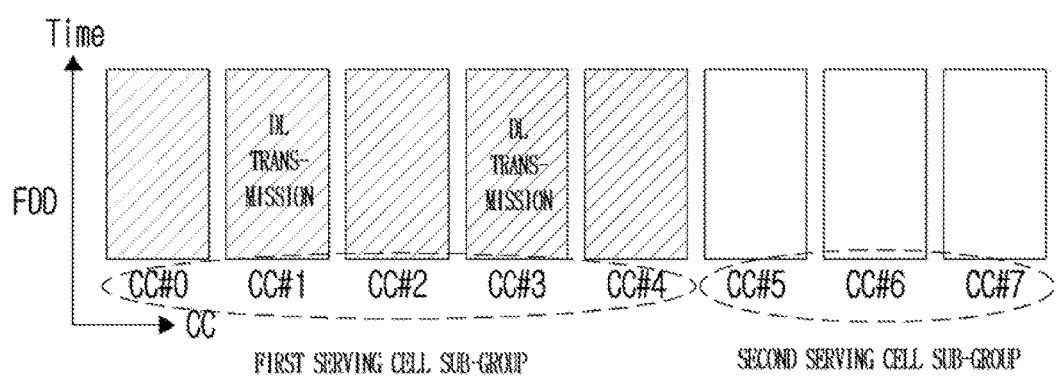
FIGS. 15 to 22 are diagrams illustrating various examples of dynamic PUCCH format determination according to an exemplary embodiment of the present invention.

When the determination in operation S1132 indicates NO (that is, when a DL transmission that requires a HARQ-ACK does not exist in the PUCCH serving cell in the first serving cell sub-group and a DL transmission that requires a HARQ-ACK exists in at least one SCell, or when a DL transmission that requires a HARQ-ACK exists in the PUCCH serving cell and a DL transmission that requires a HARQ-ACK exists in a plurality of SCells), the operation proceeds with operation S1160, and a HARQ-ACK transmission may be performed using PUCCH format 3. For example, as illustrated in FIG. 15, when a DL transmission (that is, DL transmission that requires a HARQ-ACK) exists in only a serving cell (that is, CC#1 and CC#3) in the first serving cell sub-group, and does not exist in the second serving cell sub-group, the operation proceeds with operation S1160, and a HARQ-ACK transmission may be performed using PUCCH format 3.

Figure 16:
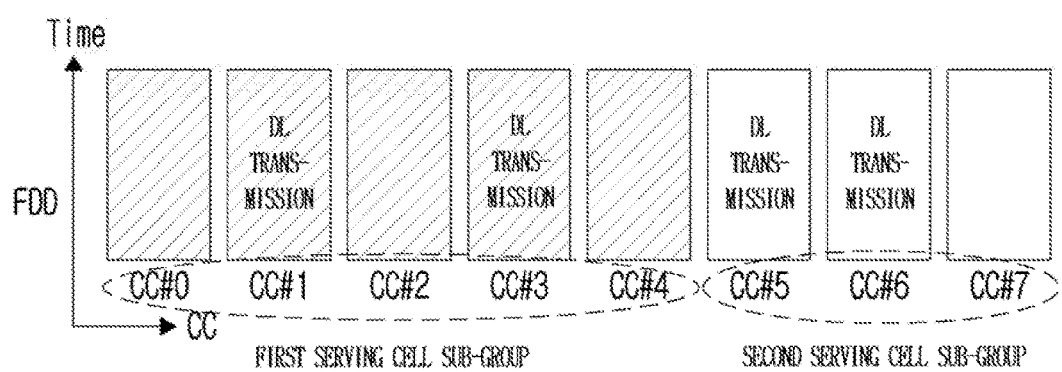

As illustrated in FIG. 16, when a DL transmission (that is, a DL transmission that requires a HARQ-ACK) exists in the first serving cell sub-group and the second serving cell sub-group (that is, CC#5 and CC#6), the operation proceeds with operation S1170, and a HARQ-ACK transmission may be performed using PUCCH format 4. That is, when at least one DL transmission exists in the second serving cell sub-group, a HARQ-ACK transmission may be performed using PUCCH format 4.

In operation S1140, a first serving cell sub-group and a second serving cell sub-group are determined based on a second threshold value $C_{threshold1}$.

Here, in the following cases, the second threshold value may be 5.
 a case in which TDD UL-DL configuration 0, 1, 2, 3, 4, or 6 is set for a PUCCH serving cell
 a case in which different TDD UL-DL configurations are set for two or more serving cells, and an available DL reference UL-DL configuration corresponds to DL reference UL-DL configuration 0, 1, 2, 3, 4, or 6
 a case in which different frame structures are set for two or more serving cells, and an available DL reference UL-DL configuration corresponds to DL reference UL-DL configuration 0, 1, 2, 3, 4, or 6

For example, in the case in which the second threshold value is 5, as illustrated in FIG. 17, 18, 19, 20, or 21, when CC#0, CC#1, CC#2, CC#3, CC#4, CC#5, CC#6, and CC#7 are configured as a single PUCCH serving cell group with respect to a UE, and CC#0 corresponds to a PUCCH serving cell, it may be determined that CC#0, CC#1, CC#2, CC#3 and CC#4 belong to the first serving cell sub-group, and CC#5, CC#6, and CC#7 belong to the second serving cell sub-group.

Figure 21:
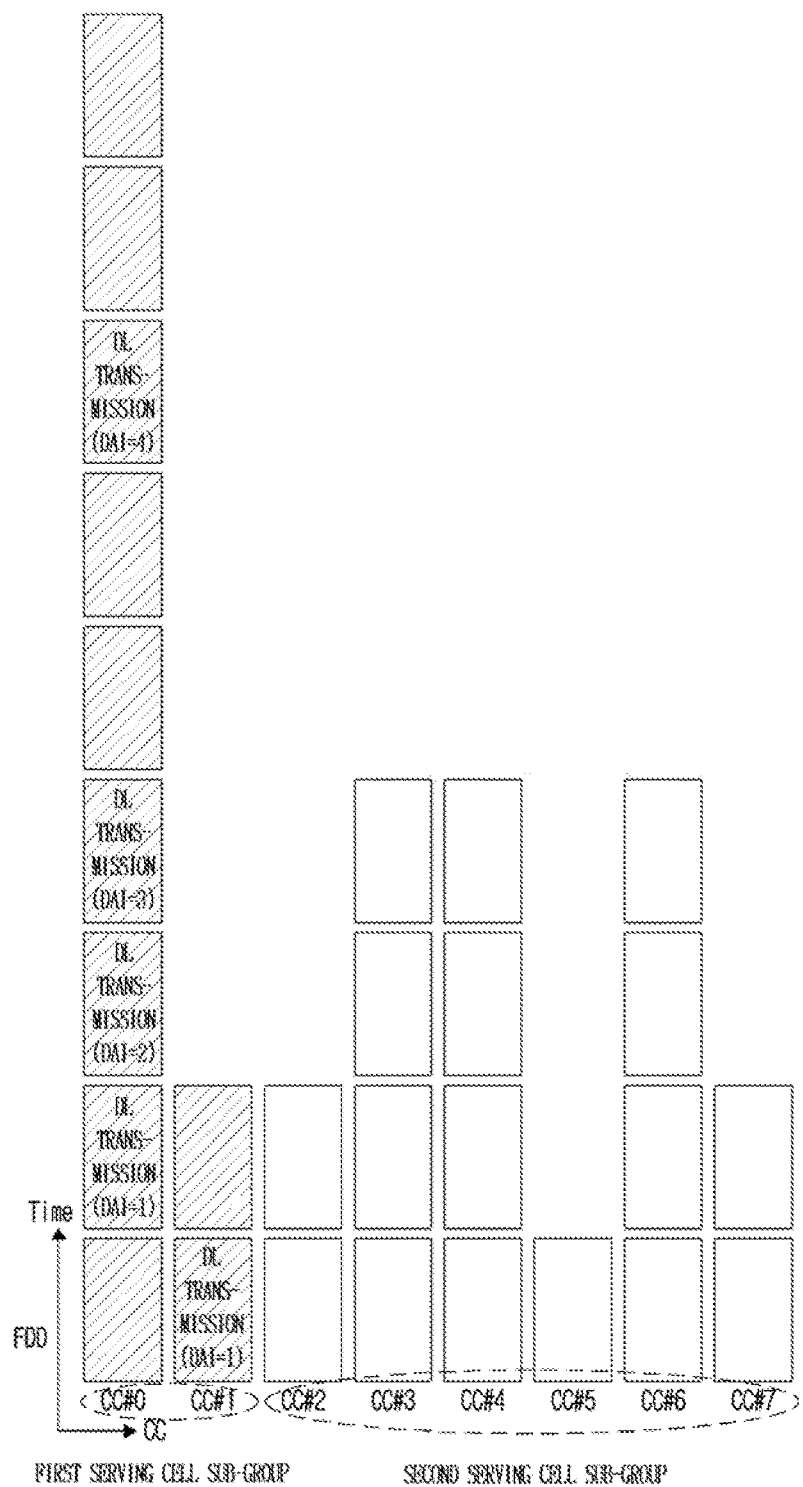

Alternatively, in the following cases, the second threshold value may be 2.
 a case in which TDD UL-DL configuration 5 is set for a PUCCH serving cell
 a case in which different TDD UL-DL configurations are set for two serving cells, and DL reference UL-DL configuration 5 is set for at least one serving cell
 a case in which different frame structures are set for two serving cells, and DL reference UL-DL configuration 5 is set for at least one serving cell For example, as illustrated in FIG. 21, when CC#0, CC#1, CC#2, CC#3, CC#4, CC#5, CC#6, and CC#7 are configured as a single PUCCH serving cell group with respect to a UE, and CC#0 corresponds to a PUCCH serving cell, it may be determined that CC#0 and CC#1 belong to the first serving cell sub-group, and CC#2, CC#3, CC#4, CC#5, CC#6, and CC#7 belong to the second serving cell sub-group.

In operation S1150, it is determined whether a DL transmission that requires a HARQ-ACK exists in only the first serving cell sub-group (that is, a PUCCH serving cell and one or more SCells). When a DL transmission that requires a HARQ-ACK exists in only the first serving cell sub-group, the operation may proceed with operation S1151.

In operation S1151, the UE determines whether a DL transmission that requires a HARQ-ACK and of which a first DAI value in a downlink DCI is 1 (e.g., a PDSCH transmission indicated by an (E)PDCCH or an (E)PDCCH transmission indicating downlink SPS release), or a PDSCH transmission without an indication by an (E)PDCCH (that is, DL SPS PDSCH) exists in only the PUCCH serving cell.

When the result of the determination in operation S1151 indicates YES (that is, a DL transmission that requires a HARQ-ACK, and of which a first DAI value in the downlink DCI is 1 exists in only a PUCCH serving cell, or a DL transmission without the indication by an (E)PDCCH (that is, DL SPS PDSCH) exists in only a PUCCH serving cell), the operation proceeds with operation S1135, so that a HARQ-ACK transmission may be performed using PUCCH format 1a/1b.

When the result of the determination in operation S1151 indicates NO (that is, when a DL transmission that requires a HARQ-ACK other than a DL transmission that requires a HARQ-ACK and of which the first DAI value is 1 or a PDSCH transmission (that is, DL SPS PDSCH) without an indication by an (E)PDCCH exists in the PUCCH serving cell in the first serving cell sub-group, or when a DL transmission that requires a HARQ-ACK exists in at least one SCell), the operation proceeds with operation S1155, so that it is determined whether a DL transmission that requires a HARQ-ACK, and of which the first DAI value in the downlink DCI is 1 and a PDSCH transmission without an indication by an (E)PDCCH (that is, DL SPS PDSCH) exists in only the PUCCH serving cell in the first serving cell sub-group.

When the result of the determination in operation S1155 indicates YES (that is, a DL transmission that requires a HARQ-ACK, and of which the first DAI value in the downlink DCI is 1 and a PDSCH transmission without an indication by an (E)PDCCH (that is, DL SPS PDSCH) exist in only a PUCCH serving cell in the first serving cell sub-group), the operation proceeds with operation S1137, so that a HARQ-ACK transmission may be performed using PUCCH format 1b with channel selection.

When the result of the determination in operation S1155 indicates NO (that is, when a DL transmission that requires a HARQ-ACK other than a DL transmission that requires a HARQ-ACK and of which the first DAI value in the downlink DCI is 1 and a PDSCH transmission without an indication by an (E)PDCCH (that is, DL SPS PDSCH) exists in the PUCCH serving cell in the first serving cell sub-group, or when a DL transmission that requires a HARQ-ACK exists in at least one SCell), the operation proceeds with operation S1160, so that a HARQ-ACK transmission may be performed using PUCCH format 3.

Alternatively, when the result of the determination in operation S1155 indicates NO (that is, when a DL transmission that requires a HARQ-ACK other than a DL transmission that requires a HARQ-ACK and of which the first DAI value in the downlink DCI is 1 and a PDSCH transmission without an indication by an (E)PDCCH (that is, DL SPS PDSCH), exists in a PUCCH serving cell in the first serving cell sub-group, or when a DL transmission that requires a HARQ-ACK exists in at least one SCell), the operation proceeds with operation S1157, so that it is determined whether a DL transmission(s) that requires a HARQ-ACK exists in only the PUCCH serving cell and a single SCell in the first serving cell sub-group.

When the determination in operation S1157 indicates YES (that is, when a DL transmission(s) that requires a HARQ-ACK exists in the PUCCH serving cell in the first serving cell sub-group, and additionally, a DL transmission(s) that requires a HARQ-ACK exists in a single SCell), the operation proceeds with operation S1137, and a HARQ-ACK transmission may be performed using PUCCH format 1b with channel selection. Here, although a DL transmission(s) that requires a HARQ-ACK exists in the PUCCH serving cell in the first serving cell sub-group, and additionally, a DL transmission(s) that requires a HARQ-ACK exists in a single SCell, when TDD UL-DL configuration index 5 is applied to the PUCCH serving cell or downlink reference UL-DL configuration index 5 is applied in TDD CA or FDD-TDD CA, the operation may not proceed with operation S1137 and may proceed with operation S1160, so that a HARQ-ACK transmission may be performed using PUCCH format 3.

When the result of the determination in operation S1157 indicates NO (that is, when a DL transmission that requires a HARQ-ACK does not exist in the PUCCH serving cell in the first serving cell sub-group and a DL transmission that requires a HARQ-ACK exists in at least one SCell, or when a DL transmission that requires a HARQ-ACK exists in the PUCCH serving cell and a DL transmission that requires a HARQ-ACK exists in a plurality of SCells), the operation proceeds with operation S1160, and a HARQ-ACK transmission may be performed using PUCCH format 3.

Referring again to operation S1150, when the determination indicates NO (that is, when a DL transmission that requires a HARQ-ACK exists even in the second serving cell sub-group), the operation proceeds with operation S1170, and a HARQ-ACK transmission may be performed using PUCCH format 4.

Figure 17:
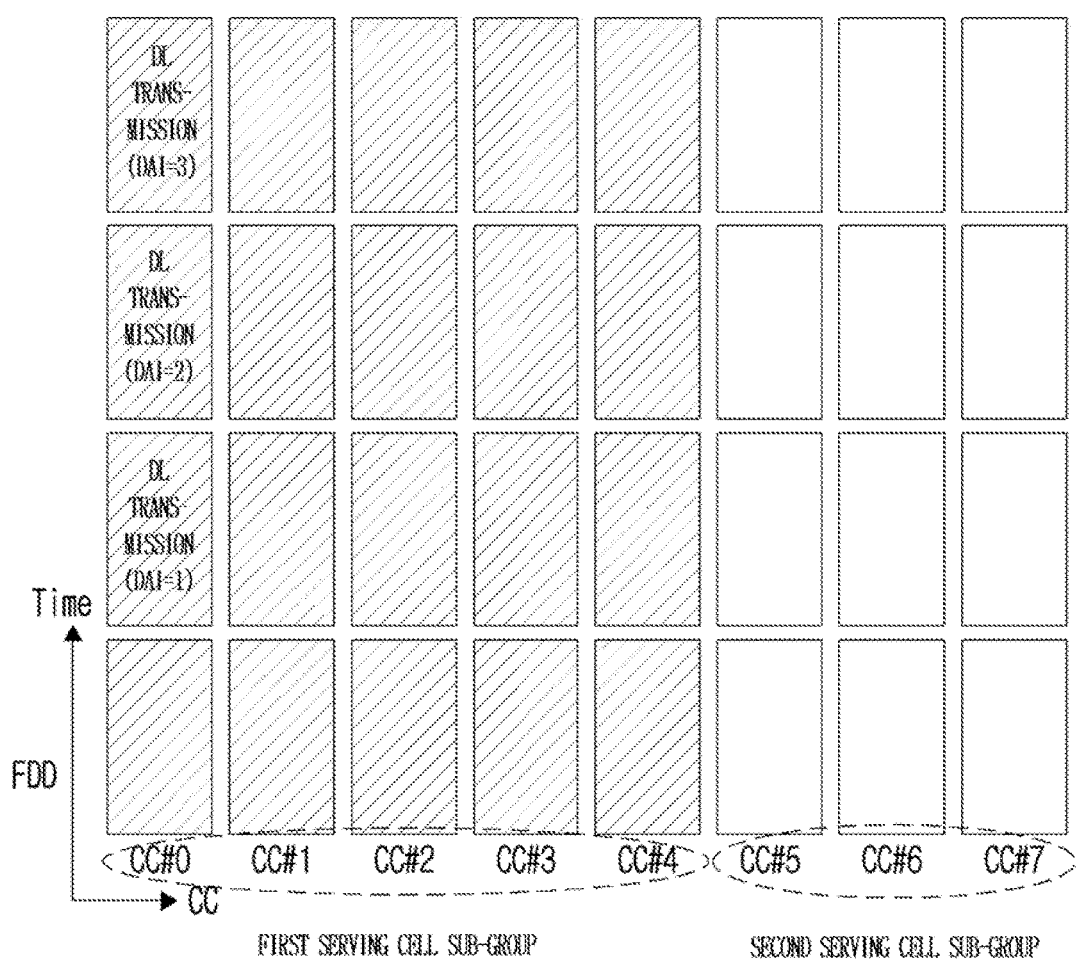

For example, as illustrated in FIG. 17, when a DL transmission that requires a HARQ-ACK, and of which a first DAI value exceeds 1 (that is, DAI=3) exists in only the PUCCH serving cell, a HARQ-ACK transmission may be performed using PUCCH format 3.

Figure 18:
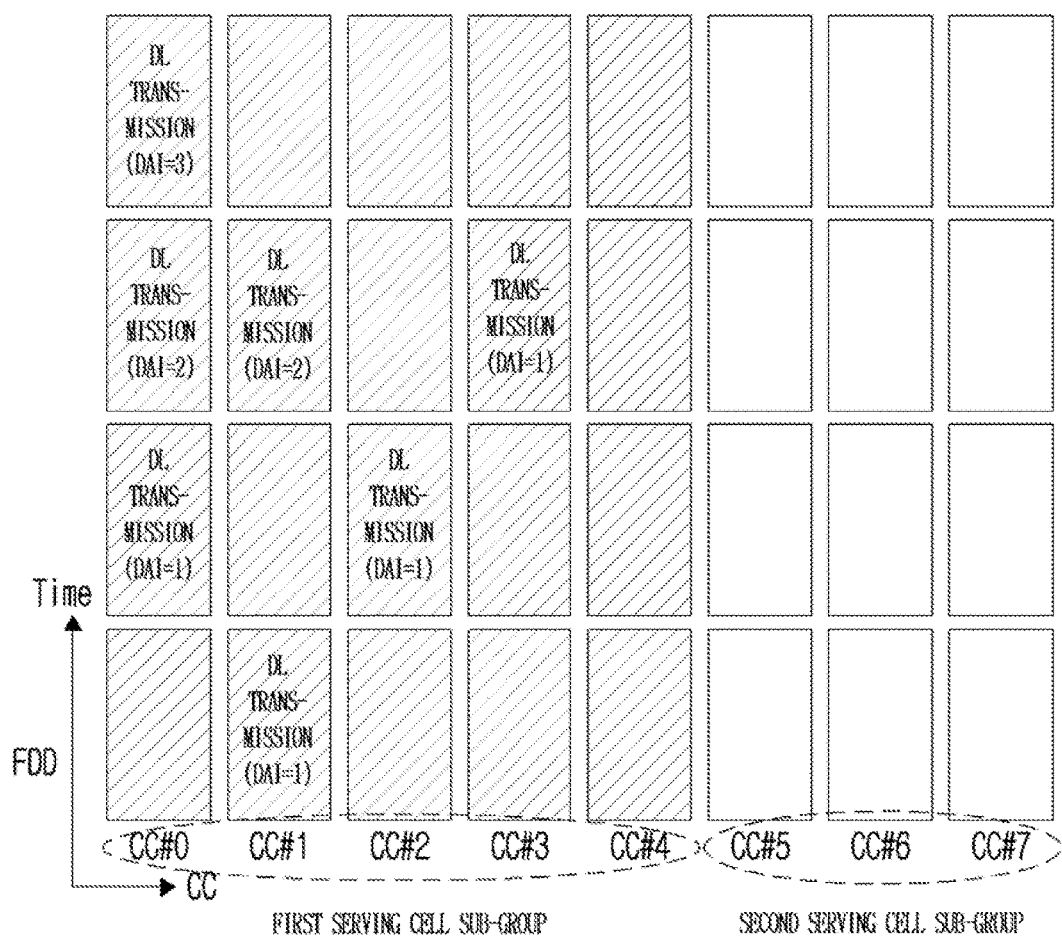

As illustrated in FIG. 18, when a DL transmission that requires a HARQ-ACK exists in at least one SCell (that is, CC#1, CC#2, and CC#3) in the first serving cell sub-group (in this instance, the first DAI value of each serving cell may be 1 or may be greater than 1), a HARQ-ACK transmission may be performed using PUCCH format 3.

Figure 19:
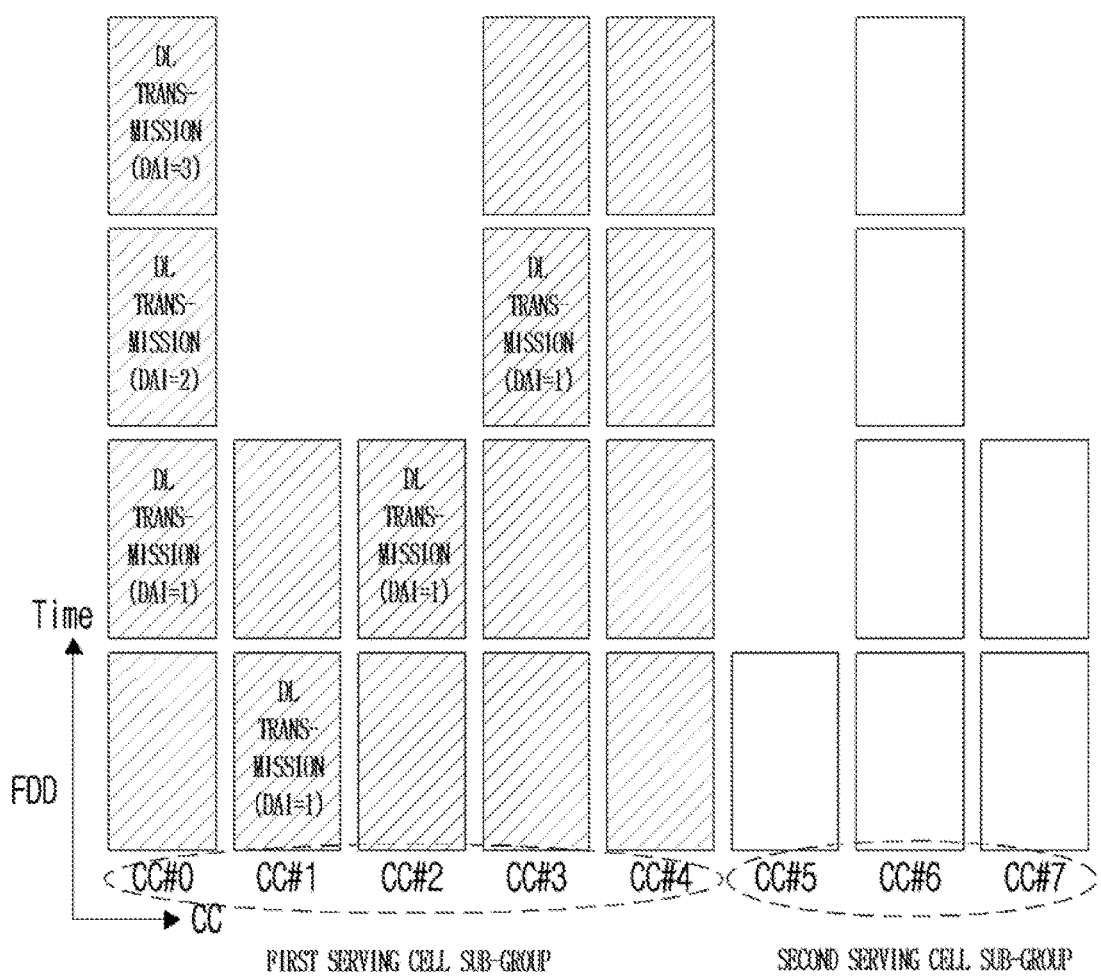

FIG. 19 illustrates the case in which different TDD UL-DL configurations are set for two or more serving cells in a PUCCH serving cell group, and an available DL reference UL-DL configuration belongs to DL reference UL-DL configuration 0, 1, 2, 3, 4, or 6, and it is determined that CC#0 to CC#4 belong to a first serving cell sub-group. In this instance, when a DL transmission (that is, a DL transmission that requires a HARQ-ACK) exists in at least one SCell (that is, CC#1, CC#2, and CC#3) in the first serving cell sub-group (in this instance, the first DAI value of each serving cell may be 1 or may be greater than 1), a HARQ-ACK transmission may be performed using PUCCH format 3.

Figure 20:
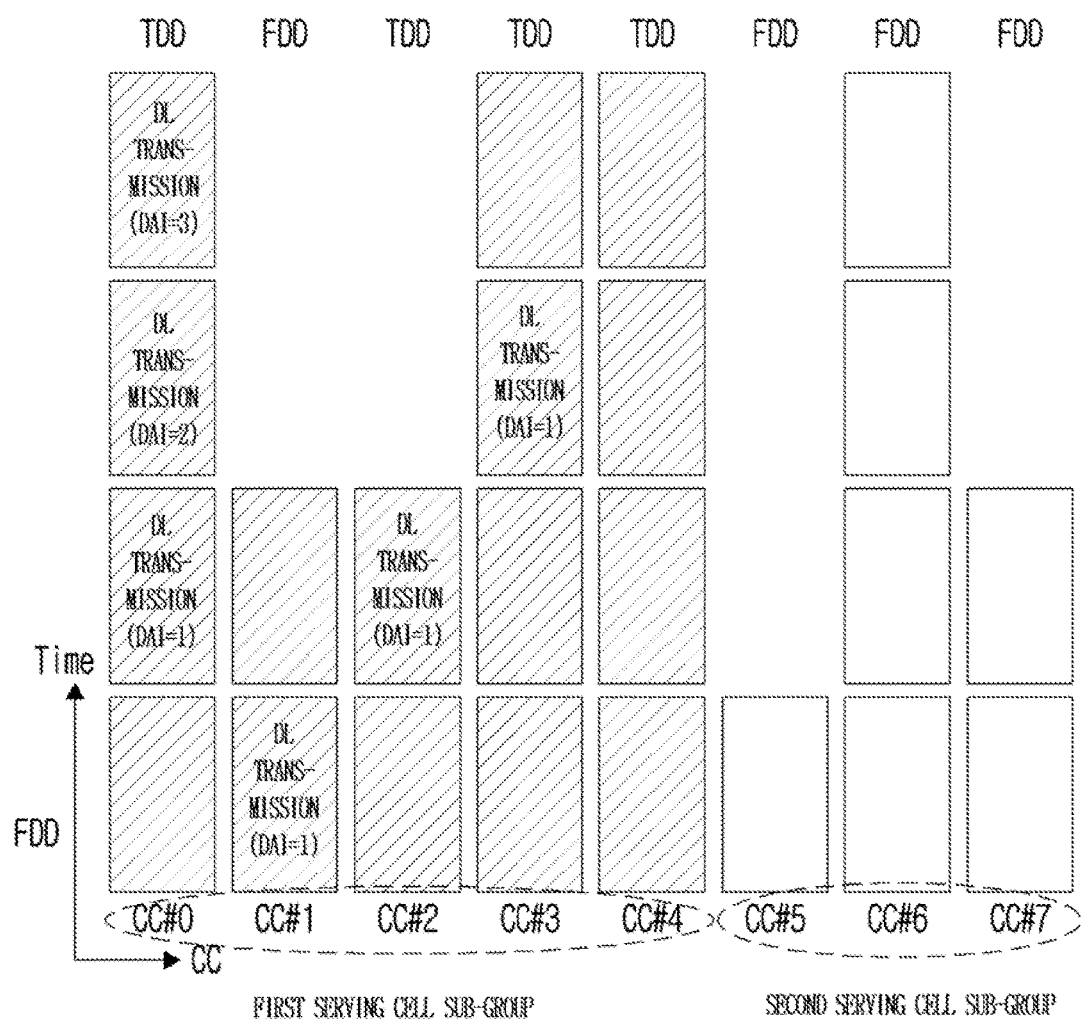

FIG. 20 illustrates the case in which different frame structures are set for two or more serving cells in a PUCCH serving cell group (that is, CC#0, CC#2, CC#3, and CC#4 are set to TDD and CC#1 is set to FDD), and an available DL reference UL-DL configuration belongs to DL reference UL-DL configuration 0, 1, 2, 3, 4, or 6, and it is determined that that CC#0 to CC#4 belong to a first serving cell sub-group. In this instance, when a DL transmission (that is, a DL transmission that requires a HARQ-ACK) exists in at least one SCell (that is, CC#1, CC#2, and CC#3) in the first serving cell sub-group (in this instance, the first DAI value of each serving cell may be 1 or may be greater than 1), a HARQ-ACK transmission may be performed using PUCCH format 3.

FIG. 21 illustrates the case in which different TDD UL-DL configurations are set for two or more serving cells, and DL reference UL-DL configuration 5 is set for at least one serving cell (that is, PUCCH serving cell), and it is determined that CC#0 and CC#1 belong to a first serving cell sub-group. In this instance, when a DL transmission (that is, a DL transmission that requires a HARQ-ACK) exists in at least one SCell (that is, CC#1) in the first serving cell sub-group (in this instance, the first DAI value of each serving cell may be 1 or may be greater than 1), a HARQ-ACK transmission may be performed using PUCCH format 3.

Figure 22:
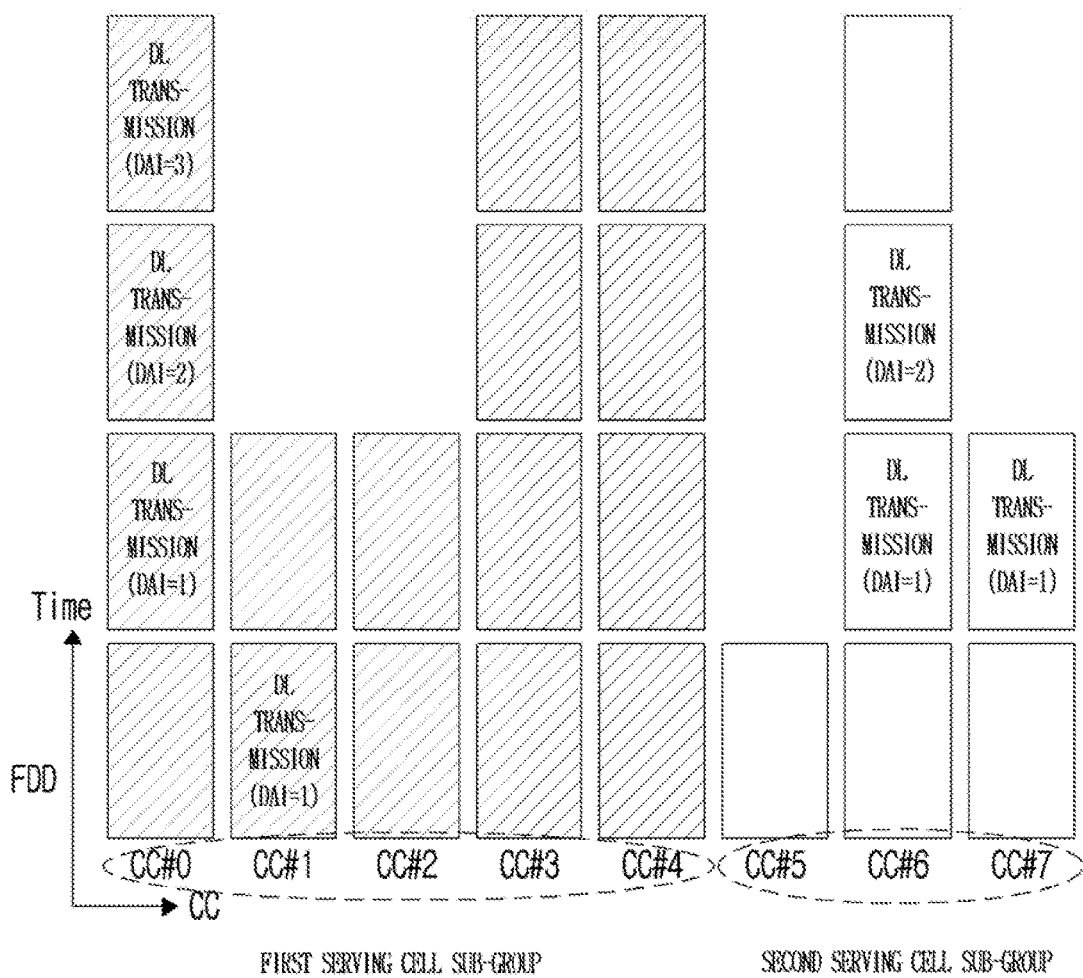

FIG. 22 illustrates the case in which different TDD UL-DL configurations are set for two or more serving cells in a PUCCH serving cell group, and an available DL reference UL-DL configuration belongs to DL reference UL-DL configuration 0, 1, 2, 3, 4, or 6, and it is determined that that CC#0 to CC#4 belong to a first serving cell sub-group. In this instance, at least one DL transmission (a DL transmission that requires a HARQ-ACK) exists in a second serving cell sub-group (that is, CC#6 and CC#7), and thus, a HARQ-ACK transmission may be performed using PUCCH format 4.

As illustrated in FIG. 14, when a DL transmission that requires a HARQ-ACK and includes the first DAI=1 in the downlink DCI (e.g., a PDSCH transmission indicated by an (E)PDCCH or an (E)PDCCH transmission indicating downlink SPS release) exists in only the PUCCH serving cell, fallback may be taken using PUCCH format 1a/1b.

As illustrated in FIG. 14, when a DL transmission that requires a HARQ-ACK and of which the first DAI value in the downlink DCI is 1 (e.g., a PDSCH transmission indicated by an (E)PDCCH or an (E)PDCCH transmission indicating downlink SPS release) and a PDSCH transmission without the indication by an (E)PDCCH exist only in a PUCCH serving cell, fallback may be taken using PUCCH format 1b with channel selection. Alternatively, when a DL transmission(s) that requires a HARQ-ACK exists in a PUCCH serving cell, and additionally, a DL transmission(s) that requires a HARQ-ACK exists in a single SCell, fallback may be taken using PUCCH format 1b with channel selection. Here, in the case in which a DL transmission(s) that requires a HARQ-ACK exists in the PUCCH serving cell, and additionally, a DL transmission(s) that requires a HARQ-ACK exists in a single SCell, when TDD UL-DL configuration index 5 is applied to the PUCCH serving cell or downlink reference UL-DL configuration index 5 is applied in TDD CA or FDD-TDD CA, fallback may be taken using PUCCH format 3 as opposed to PUCCH format 1b with channel selection.

As described above, when more than C serving cells are configured as a single serving cell group (e.g., in the case of TDD UL-DL configuration 5 or DL reference UL-DL configuration 5, C=2. In the case of FDD-TDD, when the number of serving cells, of which the number of HARQ-ACK bits does not exceed 21 bits, is X, C=X. For the rest cases, C=5), a UE may dynamically select PUCCH format 3 or 4, and may improve the efficiency of utilizing a PUCCH resource. As illustrated in FIG. 9, dynamical switching to PUCCH format 3 or 4 is performed based on the number of HARQ-ACK bits to be transmitted on one or more subframes in a single serving cell group (e.g., the number of HARQ-ACK bits determined based on the maximum number of DL transmissions that may be scheduled for a UE or the number of DL transmissions that are actually scheduled for a UE), and thus, a PUCCH resource of the most appropriate size may be used. Also, as illustrated in FIG. 14, a first serving cell sub-group and a second serving cell sub-group are determined in a single serving cell group, and dynamic switching to PUCCH format 3 or 4 may be performed based on a serving cell sub-group where a DL transmission that requires a HARQ-ACK exists. Although the efficiency of utilizing a PUCCH resource is not higher than the example of FIG. 9, the burden of calculation on a UE and the complexity of embodiment may be dramatically reduced and the stability of the entire system operations may be increased, and thus, beneficial effects may be acquired from the perspective of the capability of the whole system.

As the new structure of PUCCH format 4 and the new method of determining the size of a HARQ-ACK payload are applied, there is a desire for a new resource allocation scheme in association with PUCCH format 4. In the present invention, examples of the present invention will be described in association with an effective scheme that dynamically indicates a resource to which PUCCH format 4 is allocated, a scheme that derives a resource to which a UE allocates control information based on the resource allocation indication, and a scheme that maps control information on a physical resource based on the derived resource.

The examples of the present invention which are described below assume that a single resource set (that is, a plurality of PUCCH format 4 resources $n_{PUCCH}^{(4,\tilde{p})}$ are included) are semi-statically set through a higher layer (e.g., RRC). To provide a UE with indication of information associated with a PUCCH format 4 resource $n_{PUCCH}^{(4,\tilde{p})}$ that is allocated out of the single resource set and related information thereof, a predetermined 2-bit field in an (E)PDCCH downlink DCI (e.g., DCI format 1/1A/1B/1D/2/2A/ 2B/2C/2D) may be used. For example, a TPC command field in a PDCCH indicating downlink SPS release or a PDCCH that schedules a PDSCH on an SCell may be used. Alternatively, when a DCI is provided through an EPDCCH, a HARQ-ACK resource offset field in a downlink DCI format may be used. Hereinafter, although it is described that a TPC field or a HARQ-ACK resource offset field is used for conciseness of description, the scope of the present invention may not be limited thereto.

Also, in the examples of the present invention described below, a single set of resource indication values (RIV) (that is, a plurality of RIVs are included) for PUCCH format 4 may be semi-statically set through a higher layer (e.g., RRC). The RIV is information indicating the starting point $RB_{START}$ of RBs that are the target of resource allocation, and the number (or length) $L_{CRBs}$ of RBs that are successively allocated. Based on whether an RB corresponding to the RB starting point among the successively allocated RBs has the lowest index (that is, whether one or more RBs are allocated in ascending order from an RB with the lowest index) or the highest index (that is, whether one or more RBs are allocated in descending order from an RB with the highest index), the same RIV value may indicate different RB allocations, and thus, a clear standard for the RB starting point is required. In the present disclosure, an indication may be provided that RB allocation is performed in a direction from the both frequency edges of a system bandwidth to the center (or DC) (hereinafter, inward direction) based on an RB starting point, or RB allocation is performed in a direction from the center (or CD) of the system bandwidth to the both frequency edges (that is, outward direction). When the indication does not exist, it is assumed that RB allocation is performed in the inward direction (that is, a direction in which a frequency absolute value decreases) in the uplink resource structure. However, the scope of the present invention may not be limited thereto. Without an indication associated with an RB allocation direction for PUCCH format 4, the present invention may assume that RB allocation is performed in the outward direction (a direction in which a frequency absolute value increases) in the uplink resource structure of FIG. 5.

Figure 23:
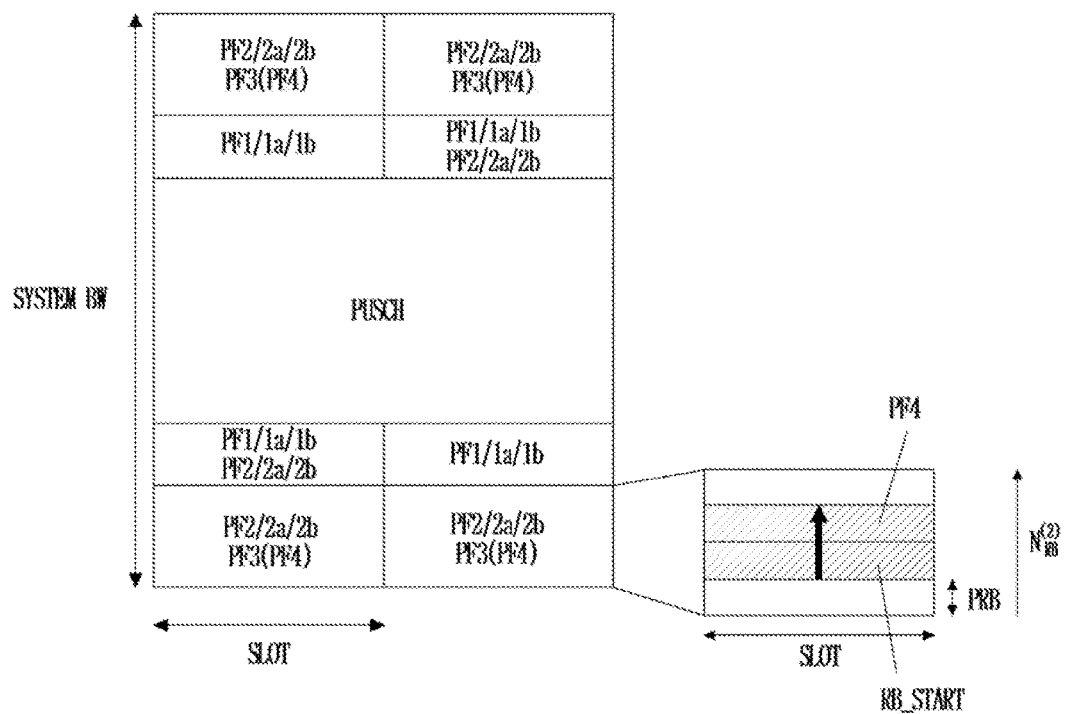
FIG. 23 is a diagram illustrating an example of PUCCH format 4 resource allocation according to an exemplary embodiment of the present invention.

FIG. 23 is a diagram illustrating an example of PUCCH format 4 resource allocation according to an exemplary embodiment of the present invention.

As information associated with resource allocation of PUCCH format 4 (hereinafter, PF4), a PF4 resource index $n_{PUCCH}^{(4,\tilde{p})}$ and an RIV may be provided. Here, when transmission diversity is set for PUCCH format 4 transmission (e.g., when two antenna ports are set), a PF4 resource index may be signaled with respect to each antenna port index (that is, $\tilde{p}$).

Table 10 provided below shows the mapping relationship among a TPC command field value (hereinafter, TPC) or HARQ-ACK resource offset field value (hereinafter, HRO) for PUCCH, a PUCCH format 4 resource index $n_{PUCCH}^{(4,\tilde{p})}$, and an RIV.

TABLE 10

| TPC or HRO | $n_{PUCCH}^{(3,\tilde{p})}$ or $n_{PUCCH}^{(4,\tilde{p})}$ | RIV |
|---|---|---|
| '00' | first PUCCH resource value set through higher layer | first PUCCH RIV value set through higher layer |
| '01' | second PUCCH resource value set through higher layer | second PUCCH RIV value set through higher layer |

TABLE 10-continued

| TPC or HRO $n_{PUCCH}^{(3,\tilde{p})}$ or $n_{PUCCH}^{(4,\tilde{p})}$ | | RIV |
|---|---|---|
| '10' | third PUCCH resource value set through higher layer | third PUCCH RIV value set through higher layer |
| '11' | fourth PUCCH resource value set through higher layer | fourth PUCCH RIV value set through higher layer |

As shown in Table 10, a PUCCH resource index and an RIV may be jointly encoded, and may be indicated by a TPC or HRO field value. As shown in Table 5, an RIV value indicated by a TPC or HRO value may correspond to one of RIV set that is set through a higher layer. Here, RIVs corresponding to all PF4 resource allocation pattern cases may be included in an RIV set, or RIVs corresponding to some of the cases may be included. For example, 4 RIVs may be set for a UE as a single RIV set through a higher layer, or one of the RIVs may be indicated through a TPC or HRO.

When PF4 is set for a UE and a PF4 resource set is set, a TPC or HRO field value indicates a PF4 resource that is to be used. When the structure of PF4 is type 1 (e.g., the extension of the structure of PF 3, please refer to FIG. 10), a resource set for PF3 may be used as a resource set for PF4 (that is, $n_{PUCCH}^{(3,\tilde{p})}=n_{PUCCH}^{(4,\tilde{p})}$). In this instance, parameter $n_{PUCCH}^{(4,\tilde{p})}$ may not be defined separately. When the structure of PF4 is type 1, an RIV indicates from which RB the RB allocation begins and how many RBs are allocated. That is, a TPC or HRO may indicate a predetermined RIV out of the RIV set which is set through a higher layer.

An RIV (that is, $RIV_{PUCCHformat4}$) for PF 4 may be defined as shown in Equation 10 provided below.

$$RIV_{PUCCH\,format4} = N_{RB}^{(2)}(L_{CRBs}-1) + RB_{START},$$
$$\text{if}(L_{CRBs}-1) \le \lfloor N_{RB}^{(2)}/2 \rfloor$$

$$RIV_{PUCCH\,format4} = N_{RB}^{(2)}(N_{RB}^{(2)} - L_{CRBs}+1) + (N_{RB}^{(2)} - 1 - RB_{START}),\ \text{otherwise}$$  [Equation 10]

Here, $N_{RB}^{(2)}$ may be set to be cell-specific through a higher layer signaling, may be an available bandwidth for use by PUCCH format 2/2a/2b (hereinafter, PF2/2a/2b), and may be expressed as an integer-multiple of $N_{sc}^{RB}$ (that is, the number of sub-carriers in a single RB). $RB_{START}$ denotes an RB starting point of RB allocation for PF4, and $L_{CRBs}$ denotes the number (or length) of RBs that are successively allocated. Also, $\lfloor \ \rfloor$ is a floor operation, and $\lfloor x \rfloor$ indicates the largest integer that does not exceed x (that is, the largest integer that is less than or equal to x). In the case of type 1 PF4, all of PF2/2a/2b, PF3, and type 1 PF4 may be allocated to RBs in $N_{RB}^{(2)}$ as illustrated in the example of FIG. 23. In this instance, an eNB may configure resources to enable the resources allocated for each PUCCH format to not collide.

That is, in the example of FIG. 23, a value (that is, $N_{RB}^{(2)}$) that indicates that a region where a PF2 or PF3 resource is allocated is cell-specific, may be reused or interpreted to indicate a resource region where PF4 may be allocated (that is, a PUCCH format that may be allocated to a resource region, which is indicated by $N_{RB}^{(2)}$, may include all of PF2/2a/2b, PF3, and PF4). An RIV value indicates a resource region (that is, a resource region where control information is actually mapped for PF4 transmission) to which PF4 is actually allocated in the corresponding resource region.

A UE that determines an RIV based on a TPC or HRO may derive $RB_{START}$ and $L_{CABs}$ through Equation 11 provided below. Here, it is assumed that RB allocation is performed in the inward direction (that is, a direction in which a frequency absolute value decreases).

$$a = \lfloor RIV/N_{RB}^{(2)} \rfloor + 1 \quad\quad \text{[Equation 11]}$$
$$b = RIV \bmod N_{RB}^{(2)}$$
$$\text{if } ((a+b) > N_{RB}^{(2)})$$
$$\{$$
$$L_{CRBs} = N_{RB}^{(2)} + 2 - a$$
$$RB_{START} = N_{RB}^{(2)} - 1 - b$$
$$\}$$
$$\text{else}$$
$$\{$$
$$L_{CRBs} = a,$$
$$RB_{START} = b$$
$$\}$$

As described above, $RB_{START}$ and $L_{CRBs}$ are determined from an RIV. Additionally, the accurate location of a slot needs to be determined for PF4 resource allocation.

Figure 24:
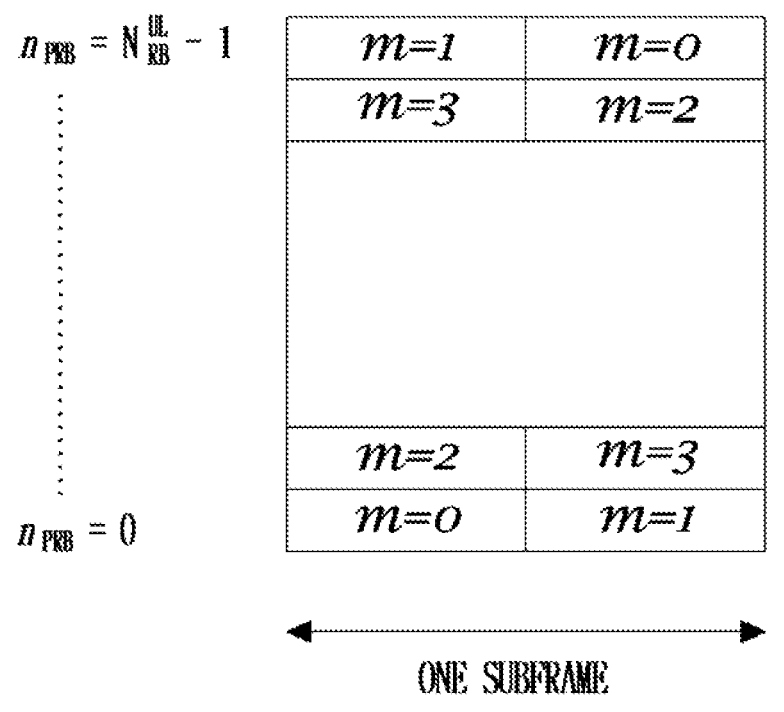

FIG. 24 is a diagram illustrating a scheme of determining a slot to which a PF4 resource is allocated according to an exemplary embodiment of the present invention.

The location of a slot to which a PF4 resource is allocated may be determined based on a PF4 resource index $n_{PUCCH}^{(4,\tilde{p})}$ as shown in Equation 12 provided below.

$$m = \lfloor n_{PUCCH}^{(4,\tilde{p})}/N_{SF,0}^{PUCCH} \rfloor \quad\quad \text{[Equation 12]}$$

Here, $N_{SF,0}^{PUCCH}$ is a value of a spreading factor that is applied to a first slot (an even-numbered slot when a slot index starts from 0) of a single subframe, and may indicate a multiplexing capacity in association with the application of an orthogonal cover code (OCC). In the case in which the structure of PF3 is used, such as the case of type-1 PF4, 5 may be given as the value of a spreading factor in a normal slot. When a short PF4 format is used due to a SPS transmission, 4 may be given as the value of a spreading factor.

Also, in the case of type-1 PF4, the resource set for PF3 may be used as the resource set for PF4, as described above, and thus, the parameter $n_{PUCCH}^{(4,\tilde{p})}$ may not be defined separately and m may be determined through Equation 5 based on $n_{PUCCH}^{(3,\tilde{p})}=n_{PUCCH}^{(4,\tilde{p})}$.

When m is derived as described above, the location of allocation of a PRB may be determined based on m as illustrated in FIG. 24. The m may indicate a PRB to which PF4 is allocated, in a frequency edge in each slot in a single subframe (that is, both ends of a system bandwidth).

In the case of type-2 PF4, PF4 is not allocated to a PUCCH region, and thus, m may not be required.

When the number $R_{RB}^{(2)}$ of RBs that may be used by PF4, the starting point $RB_{START}$ of RBs where PF4 is allocated in the RBs that may be used by PF4, the number (or length) $L_{CRBs}$ of successive RBs, and a factor (m) that determines a slot where the allocation is performed, are provided, a RPB index that is used for PF4 (that is, to which control information is actually mapped for a PF4 transmission) in a slot index ns may be determined based on Equation 13 provided below.

$$n_{PRB} = \begin{cases} \{RB_{START}, \ldots, RB_{START} + L_{CRBs} - 1\}, & \text{if } (m+n_s) \bmod 2) \\ & \bmod 2 = 0 \\ \{N_{RB}^{UL} - 1 - RB_{START}, \ldots, N_{RB}^{UL} - 1 - RB_{START} - (L_{CRBs} - 1)\}, & \text{if } (m+n_s) \bmod 2) \\ & \bmod 2 = 1 \end{cases}$$ [Equation 13]

Here, mod is a modulo operation, and A mod B indicates a remainder obtained after dividing A by B. A PRB index value n PRB that is determined based on Equation 13 may be successively determined as many times as $L_{CRBs}$. $L_{CRBs}$ $n_{PRB}$ values may indicate a plurality of physical resources that are allocated for PF4 (that is, a plurality of physical resources to which control information is actually mapped for PF4 transmission).

Although the above described illustrative methods are expressed as a series of operations for ease of description, they may not limit the order of operations executed, and the operations may be executed in parallel or in a different order. Also, all of the operations described above may not be always required to implement the method of the present invention.

Figure 25:
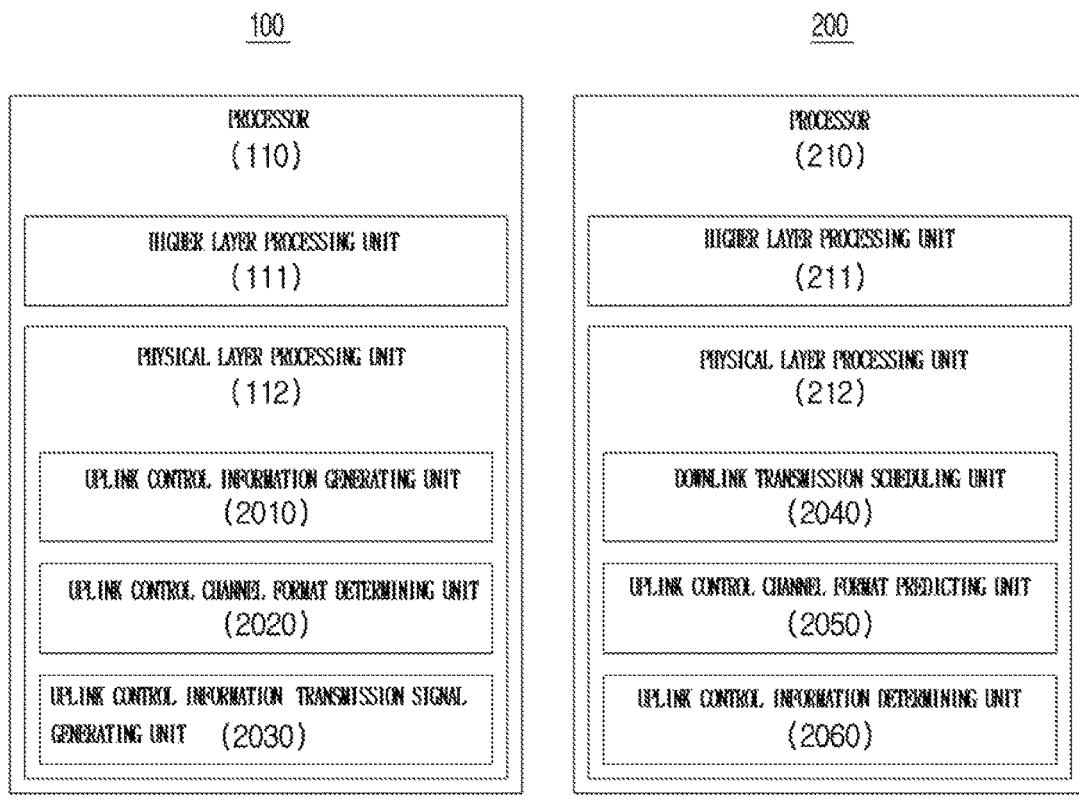
FIG. 25 is a diagram illustrating the configuration of a processor according to an exemplary embodiment of the present invention.
Figure 26:
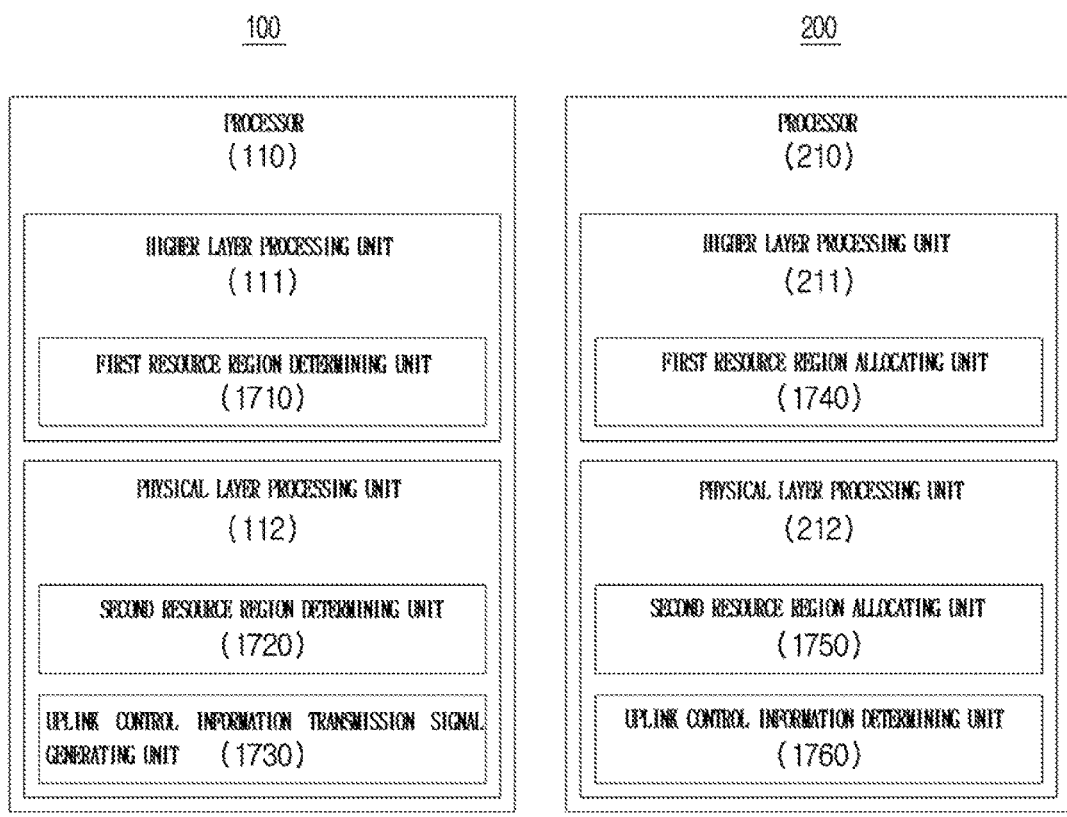
FIG. 26 is a diagram illustrating the configuration of a processor according to an exemplary embodiment of the present invention.

FIGS. 25 and 26 are diagrams illustrating a configuration of a processor according to an exemplary embodiment of the present invention.

Dynamic PUCCH format switching that has been described in various embodiments of the present invention may be processed by the physical layer processing unit 112 of the processor 110 of the UE 100.

Referring to FIG. 25, the physical layer processing unit 112 may include an uplink control information generating unit 2010, an uplink control channel format determining unit 2020, and an uplink control information transmission signal generating unit 2030.

The uplink control information generating unit 2010 may generate HARQ-ACK information with respect to a downlink transmission that is received from the eNB 200. Also, the uplink control information generating unit 2010 may generate channel state information (CSI) based on a reference signal or the like, which is received from the eNB 200.

An uplink control channel format determining unit 2020 may dynamically determine an uplink control channel format to be used for the transmission of HARQ-ACK information. For example, the uplink control channel format determining unit 2020 may include one or more out of a frame structure determining unit, a HARQ-ACK bit counting unit, and a downlink transmission detecting unit.

For example, the frame structure determining unit of the uplink control channel format determining unit 2020 may determine whether the frame structure of a PUCCH serving cell is set to FDD (or frame structure 1 in FDD-TDD) or TDD (or frame structure 2 in FDD-TDD). The HARQ-ACK bit counting unit of the uplink control channel format determining unit 2020 may calculate the number of HARQ-ACK bits based on one or more out of: the number of serving cells in which a downlink transmission is scheduled, a transmission mode of each serving cell, the number of TBs in each serving cell, and the number of subframes in which a downlink transmission is scheduled in each serving cell. The downlink transmission detecting unit of the uplink control channel format determining unit 2020 may identify a serving cell (e.g., a PUCCH serving cell, an SCell, a first or second serving cell sub-group) from which a downlink transmission that requires a HARQ-ACK is detected. The uplink control channel format determining unit 2020 may dynamically determine a PUCCH format to be used for an uplink control information transmission, by using a result determined or calculated by the frame structure determining unit, the HARQ-ACK bit counting unit, or the downlink transmission detecting unit.

According to another exemplary embodiment of the present invention as referring to FIG. 26, a higher layer processing unit 111 may include a first resource region determining unit 1710. The first resource region determining unit 1710 may determine a first resource region based on first information indicating the first resource region which is to be used by a PUCCH. The first information may be provided to a UE 100 through a higher layer signaling (e.g., an RRC signaling). The first information indicating the first resource region may be determined based on $B_{RB}^{(2)}$ or $N^{(4)}_{PCCH,RB}$ and $N^{(4)}_{RB,START}$. $N_{RB}^{(2)}$ denotes the number of resource blocks (RBs) to be used by PUCCH format 2, 2a, 2b, or 3. $N^{(4)}_{PUCCH,RB}$ denotes the number of RBs to be used by PUCCH format 4. $N^{(4)}_{RB,START}$ denotes the starting point of RBs to be used by PUCCH format 4.

A physical layer processing unit 112 may include a second resource region determining unit 1720 and an uplink control information transmission signal generating unit 1730.

The second resource region determining unit 1720 may determine a second resource region based on second information used for determining the second resource region to which a PUCCH is allocated within the first resource region (or by taking into consideration the first information) determined by the first resource region determining unit 1710 of the higher layer processing unit 111. The second information may be dynamically indicated through a PDCCH DCI.

Here, the second resource region may correspond to a plurality of PRB pairs in a single subframe. Particularly, information indicating the second resource region may include one or more out of: an RIV, a PUCCH format indicator, and a resource allocation direction indicator. From the RIV, $RB_{START}$ and $L_{CRBs}$ are derived. The $RB_{START}$ denotes the starting point of the second resource region, and $L_{CRBs}$ denotes the number of successive RBs of the second resource region. Alternatively, the information indicating the second resource region may include one or more out of: $N_{CRBs}$, $n^{(4)}_{PUCCH,RBmax}$, a PUCCH format indicator, and a resource allocation direction indicator. $n^{(4)}_{PUCCH,RBmax}$ denotes the maximum number of RBs that may be allocated to the second resource region, and $N_{CRBs}$ denotes the number of successive RBs of the second resource region. The number of successive RBs of the second resource region may be derived from a PUCCH resource index or an orthogonal cover code (OCC) index included in the DCI. The resource allocation direction indicator of the second resource region may be derived from a PUCCH resource index or an orthogonal cover code (OCC) index included in the DCI. Also, the information indicating the second resource region may be signaled through a transmission power control (TPC) command field of the DCI.

The uplink control information transmission signal generating unit 1730 may generate an uplink control information transmission signal based on mapping to the uplink control information transmission for the second resource region dynamically determined by the second resource region determining unit 1720. The generated signal may be transmitted to the eNB 200 through the transceiver 130.

The operation that supports dynamic PUCCH format switching of the UE 100, which has been described in various embodiments of the present invention, may be processed by the physical layer processing unit 212 of the processor 210 of the eNB 200.

The downlink transmission scheduling unit 2040 may determine a resource to be used for a downlink transmission from the eNB 200 to the UE 100, may provide the UE 100 with the downlink transmission scheduling control information, and may generate a signal for the downlink transmission.

Referring to FIG. 25, an uplink control channel format determining unit (can be called as uplink control channel format predicting unit) 2050 may dynamically determine an uplink control channel format to be used for the transmission of HARQ-ACK information. For example, the uplink control channel format determining unit 2050 may include one or more out of a frame structure determining unit, a HARQ-ACK bit counting unit, and a downlink transmission detecting unit.

For example, the frame structure determining unit of the uplink control channel format determining unit 2050 may determine whether the frame structure of a PUCCH serving cell is set to FDD (or frame structure 1 in FDD-TDD) or TDD (or frame structure 2 in FDD-TDD). The HARQ-ACK bit counting unit of the uplink control channel format determining unit 2020 may calculate the number of HARQ-ACK bits based on one or more out of: the number of serving cells in which a downlink transmission is scheduled, a transmission mode of each serving cell, the number of TBs in each serving cell, and the number of subframes in which a downlink transmission is scheduled in each serving cell. The downlink transmission detecting unit of the uplink control channel format determining unit 2020 may identify a serving cell (e.g., a PUCCH serving cell, an SCell, a first or second serving cell sub-group) from which a downlink transmission that requires a HARQ-ACK is detected. The uplink control channel format determining unit 2050 may dynamically determine a PUCCH format to be used for an uplink control information transmission, by using a result determined or calculated by the frame structure determining unit, the HARQ-ACK bit counting unit, or the downlink transmission detecting unit.

According to another exemplary embodiment of the present invention as referring to FIG. 26, a higher layer processing unit 211 may include a first resource region determining unit 1740. The first resource region determining unit 1740 may determine a first resource region based on first information indicating the first resource region which is to be used by a PUCCH. The first information may be provided to a UE 100 through a higher layer signaling (e.g., an RRC signaling). The first information indicating the first resource region may be determined based on $N_{RB}^{(2)}$ or $N^{(4)}_{PUCCH,RB}$ and $N^{(4)}_{RB,START}$. $N_{RB}^{(2)}$ denotes the number of resource blocks (RBs) to be used by PUCCH format 2, 2a, 2b, or 3. $N^{(4)}_{PUCCH,RB}$ denotes the number of RBs to be used by PUCCH format 4. $N^{(4)}_{RB,START}$ denotes the starting point of RBs to be used by PUCCH format 4.

A physical layer processing unit 212 may include a second resource region determining unit 1750 and an uplink control information determining unit 1760.

The second resource region determining unit 1750 may determine a second resource region based on second information used for determining the second resource region to which a PUCCH is allocated within the first resource region (or by taking into consideration the first information) determined by the first resource region determining unit 1740 of the higher layer processing unit 211. The second information may be dynamically indicated through a PDCCH DCI.

Here, the second resource region may correspond to a plurality of PRB pairs in a single subframe. Particularly, information indicating the second resource region may include one or more out of: an RIV, a PUCCH format indicator, and a resource allocation direction indicator. From the RIV, $RB_{START}$ and $L_{CRBs}$ are derived. The $RB_{START}$ denotes the starting point of the second resource region, and $L_{CRBS}$ denotes the number of successive RBs of the second resource region. Alternatively, the information indicating the second resource region may include one or more out of: $N_{CRBs}$, $n^{(4)}_{PUCCH,RBmax}$, a PUCCH format indicator, and a resource allocation direction indicator. $n^{(4)}_{PUCCH,RBmax}$ denotes the maximum number of RBs that may be allocated to the second resource region, and $N_{CRBs}$ denotes the number of successive RBs of the second resource region. The number of successive RBs of the second resource region may be derived from a PUCCH resource index or an orthogonal cover code (OCC) index included in the DCI. The resource allocation direction indicator of the second resource region may be derived from a PUCCH resource index or an orthogonal cover code (OCC) index included in the DCI. Also, the information indicating the second resource region may be signaled through a transmission power control (TPC) command field of the DCI.

An uplink control information determining unit 1760 may attempt to receive an uplink control information transmission signal through a PUCCH in the second resource region that is dynamically allocated by a second resource region allocating unit 1750. In the present invention, a processor 210 may predict that a UE will map the uplink control information to the second resource region that is determined based on the first resource information and the second resource information allocated for the UE, may transmit the same to the eNB, and may attempt to receive an uplink control information transmission signal in the second resource region.

Also, the uplink control information determining unit 1760 may determine the received uplink control information. For example, the processor 210 of the eNB 200 that determines HARQ-ACK information may determine whether to perform retransmission of a corresponding downlink transmission. The processor 210 of the eNB 200 that determines SR information may perform uplink transmission scheduling with respect to the corresponding UE 100. The processor 210 of the eNB 200 that determines CSI information may use fed back channel state information to perform scheduling with respect to the corresponding UE 100.

Exemplary embodiments of the present invention may be implemented by hardware, software or a combination thereof. In a hardware configuration, the above-described functions and operations may be performed by one or more processors, such as a microprocessor, a controller, a microcontroller, or an ASIC (Application Specific Integrated Circuit), a DSP (Digital Signal Processor), a PLD (Programmable logic device), a FPGA (Field Programmable Gate Array), and/or combinations thereof configured to perform the functions and operations. In a software configuration, software or program codes to perform the functions and operations may be implemented as modules. Software may be stored in one or more memory units and may be executed by the one or more processors. It will be apparent to those of ordinary skill in the art from the description of the present invention to design, develop and implement the memory units or the processors.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A User Equipment (UE) for transmitting uplink control information through a Physical Uplink Control Channel (PUCCH), the UE comprising:
   a transceiver; and
   a processor operationally coupled to the transceiver and configured to;
   configure serving cells for the UE, the serving cells comprising at least six serving cells configurable for the UE;
   receive PUCCH format configuration information for transmitting uplink control information associated with the configured serving cells, the PUCCH format configuration information comprising configuration information of PUCCH format 4 indicated by a Radio Resource Control (RRC) message;
   determine a total number of Hybrid Automatic Repeat Request-Acknowledgement (HARQ-ACK) bits, scheduling request (SR) bits, and periodic Channel State Information (CSI) bits to be transmitted in a subframe;
   select, at least based on the determined total number, a PUCCH format to transmit at least one of HARQ-ACK, SR, and periodic CSI in the subframe, the selected PUCCH format being one of PUCCH formats comprising the PUCCH format 4 and PUCCH format 3, wherein the selecting the PUCCH format comprises:
   determine that simultaneousAckNackAndCQI-Format4-r13 is set true and determining that the total number of HARQ-ACK bits, SR bits, and periodic CSI bits to be transmitted in the subframe is less than or equal to a threshold value; and
   determine to use the PUCCH format 4 without dropping the periodic CSI; and
   transmit the uplink control information associated with the configured serving cells in the subframe using the selected PUCCH format, the uplink control information associated with the configured serving cells comprising the at least one of HARQ-ACK, SR, and periodic CSI,
   wherein the processor is further configured to determine whether the total number of HARQ-ACK bits, SR bits, and periodic CSI bits to be transmitted in a subframe is greater than 22; and select the PUCCH format 4 when the determined total number is greater than 22.

2. The UE of claim 1, wherein the processor is further configured to determine resource sets of the PUCCH format 3 and the PUCCH format 4; and determine a resource of the selected PUCCH format indicated by a value of Transmission Power Control (TPC) field in downlink control information (DCI) of a Physical Downlink Control Channel (PDCCH).

3. The UE of claim 1, wherein the HARQ-ACK, the SR, and the periodic CSI are multiplexed and transmitted in the subframe.

4. The UE of claim 1, wherein the uplink control information associated with the configured serving cells is transmitted in the subframe through a primary serving cell (PCell) or a PUCCH serving cell.

5. The UE of claim 1, wherein the processor is further configured to set the PUCCH serving cell among secondary serving cells (SCells), wherein the uplink control information associated with the configured serving cells is transmitted in the subframe through the PUCCH serving cell.

6. The UE of claim 1, wherein the processor is further configured to receive configuration information of the PUCCH serving cell through an RRC signaling.

7. The UE of claim 1, wherein the processor is further configured to determine a priority for the periodic CSI based on at least one of a PUCCH report type, a process ID, a CSI subframe index, a serving cell index, and a serving cell group; and to drop at least one periodic CSI based on the determined priority for the periodic CSI when the total number of HARQ-ACK bits, SR bits, and periodic CSI bits to be transmitted in the subframe is greater than the threshold value.

8. The UE of claim 1, wherein the processor is further configured to transmit one HARQ-ACK multiplexed with one periodic CSI report in a subframe using PUCCH format 2/2a/2b if simultaneousAckNackAndCQI-Format4-r13 is set TRUE and if the one HARQ-ACK correspond to a PDSCH transmission or Physical Downlink Control Channel (PDCCH)/Enhanced PDCCH indicating downlink Semi-Persistent Scheduling (SPS) release on a primary serving cell.

* * * * *